Dec. 10, 1946.  A. W. MILLS ET AL  2,412,527
ADDRESSING MACHINE
Filed May 12, 1942    19 Sheets-Sheet 1

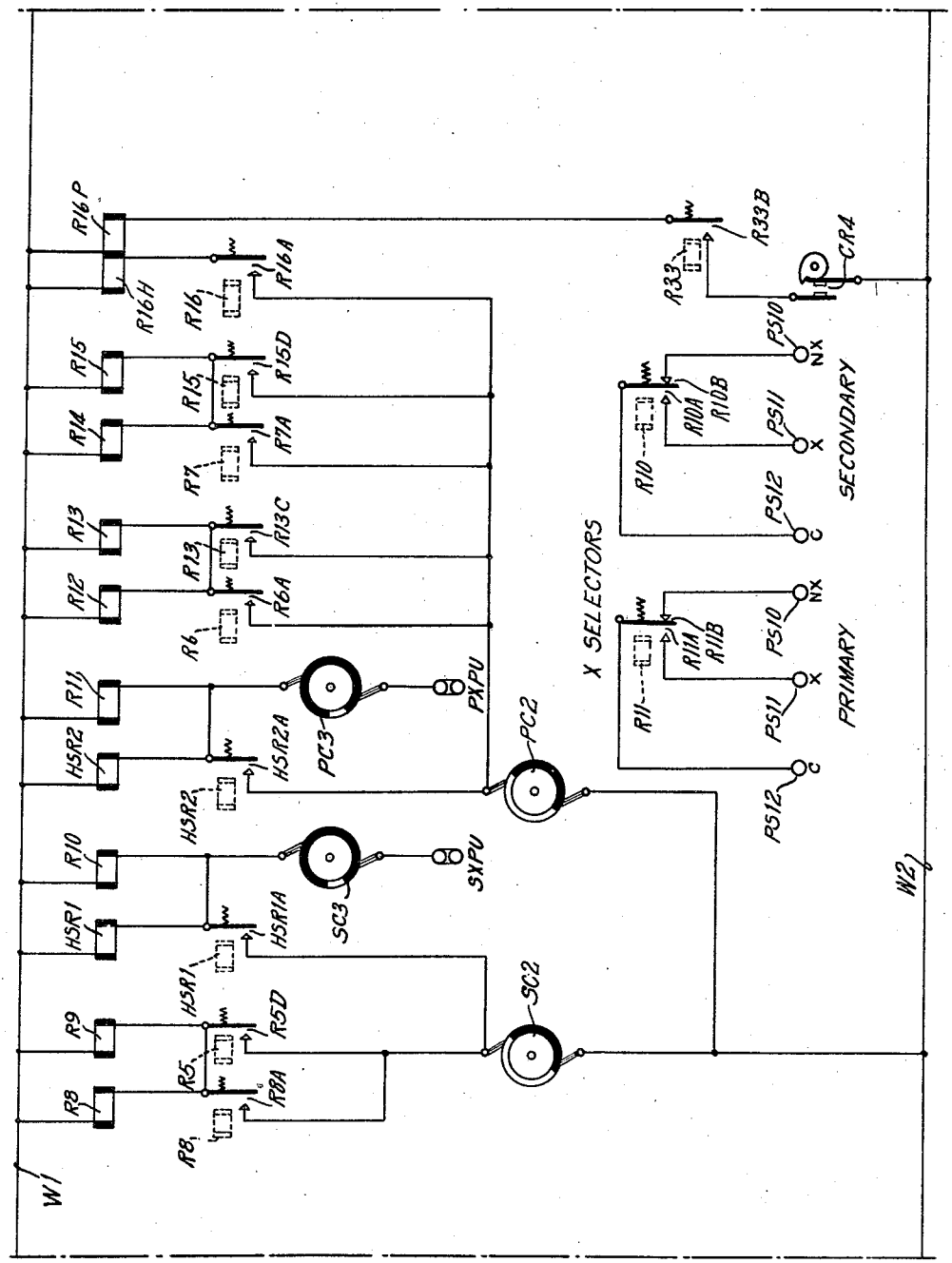

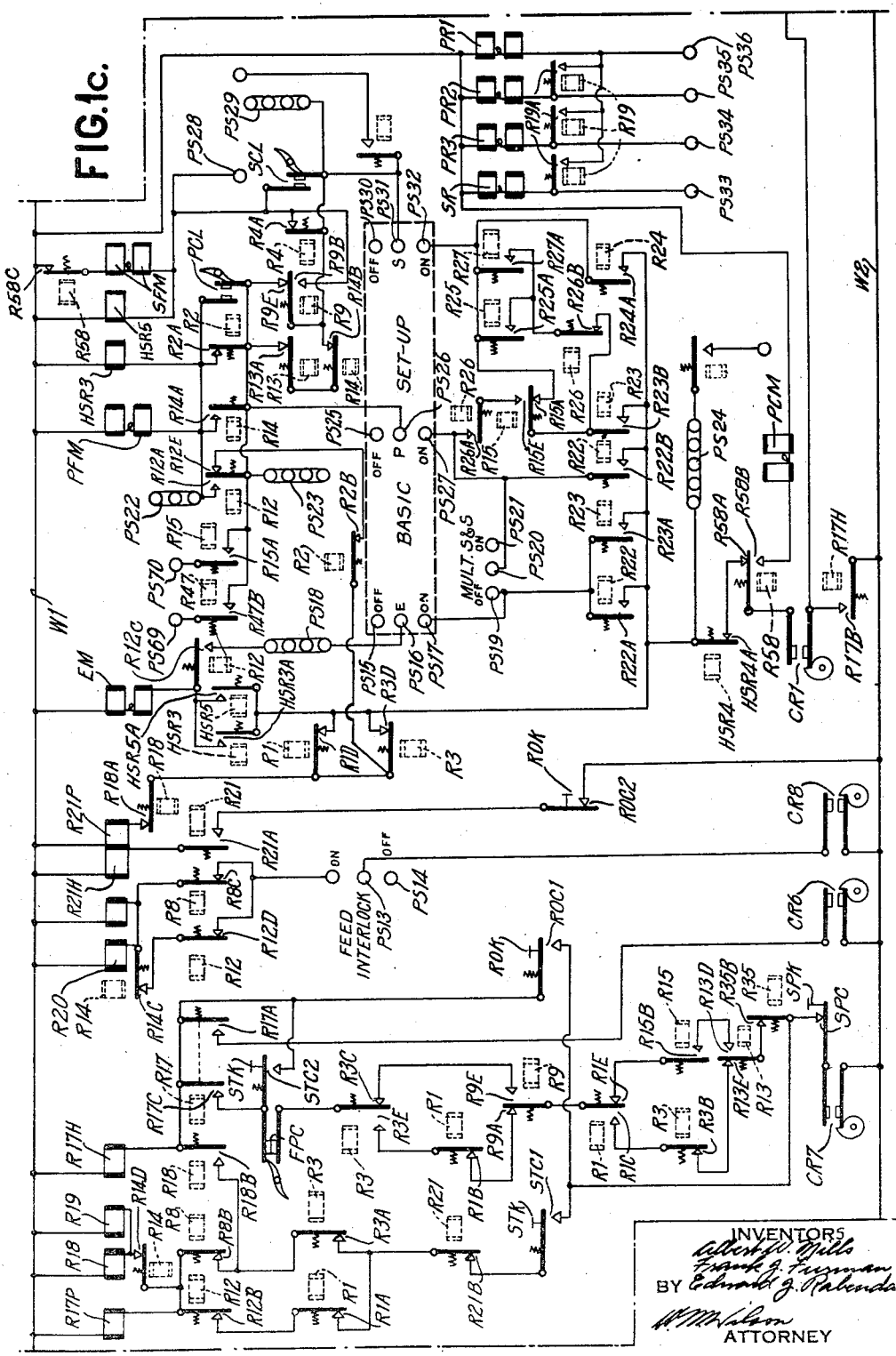

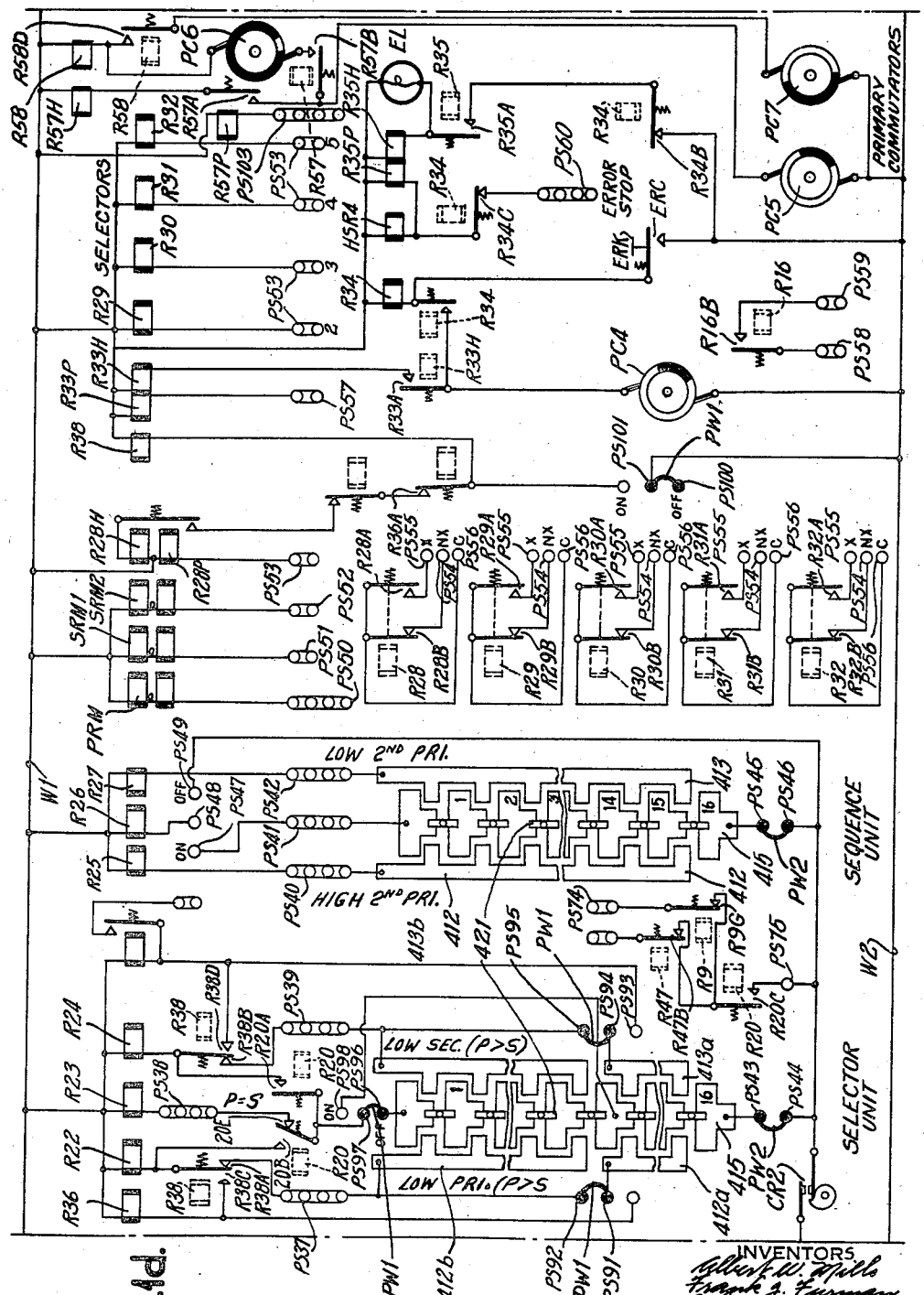

Dec. 10, 1946.     A. W. MILLS ET AL     2,412,527
ADDRESSING MACHINE
Filed May 12, 1942     19 Sheets-Sheet 5
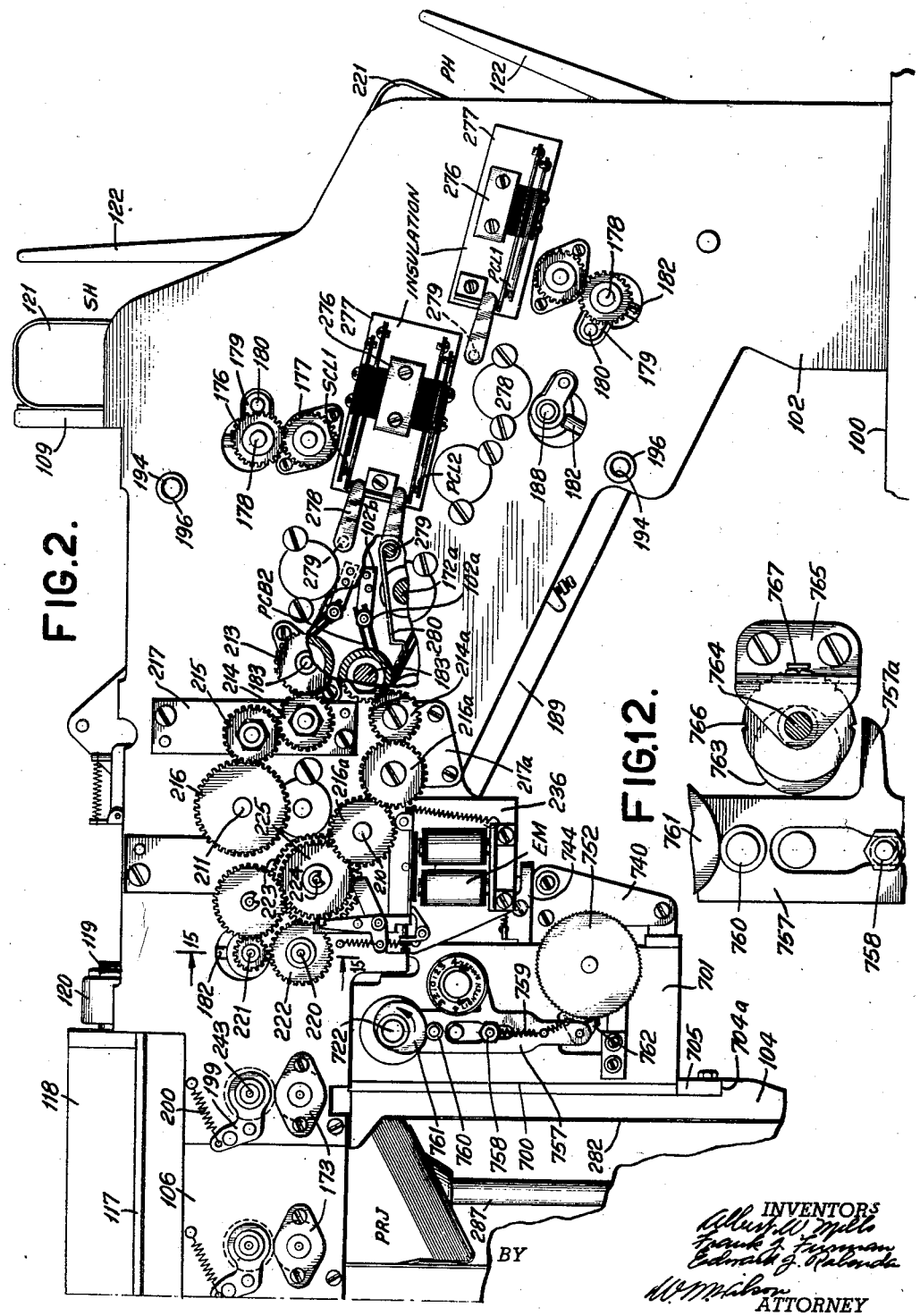
INVENTORS
Albert W. Mills
Frank L. Furman
Edward J. Valenta
BY
W. Mason
ATTORNEY

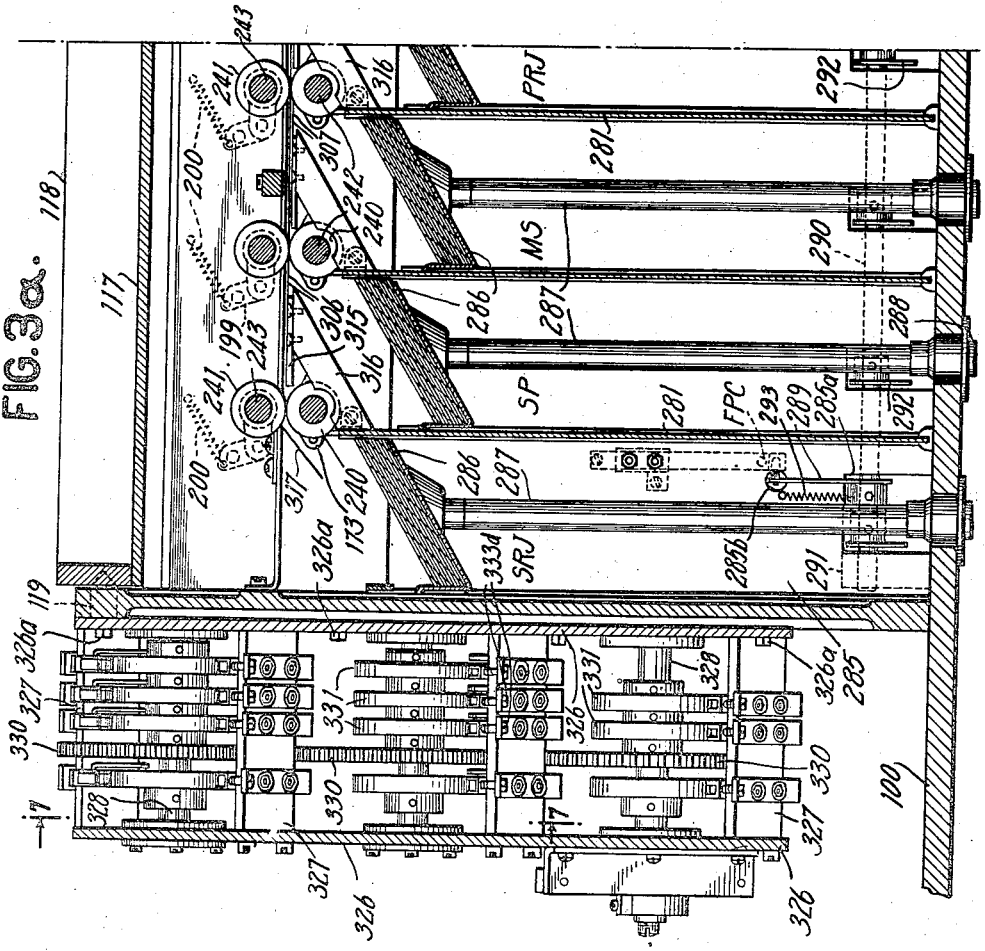

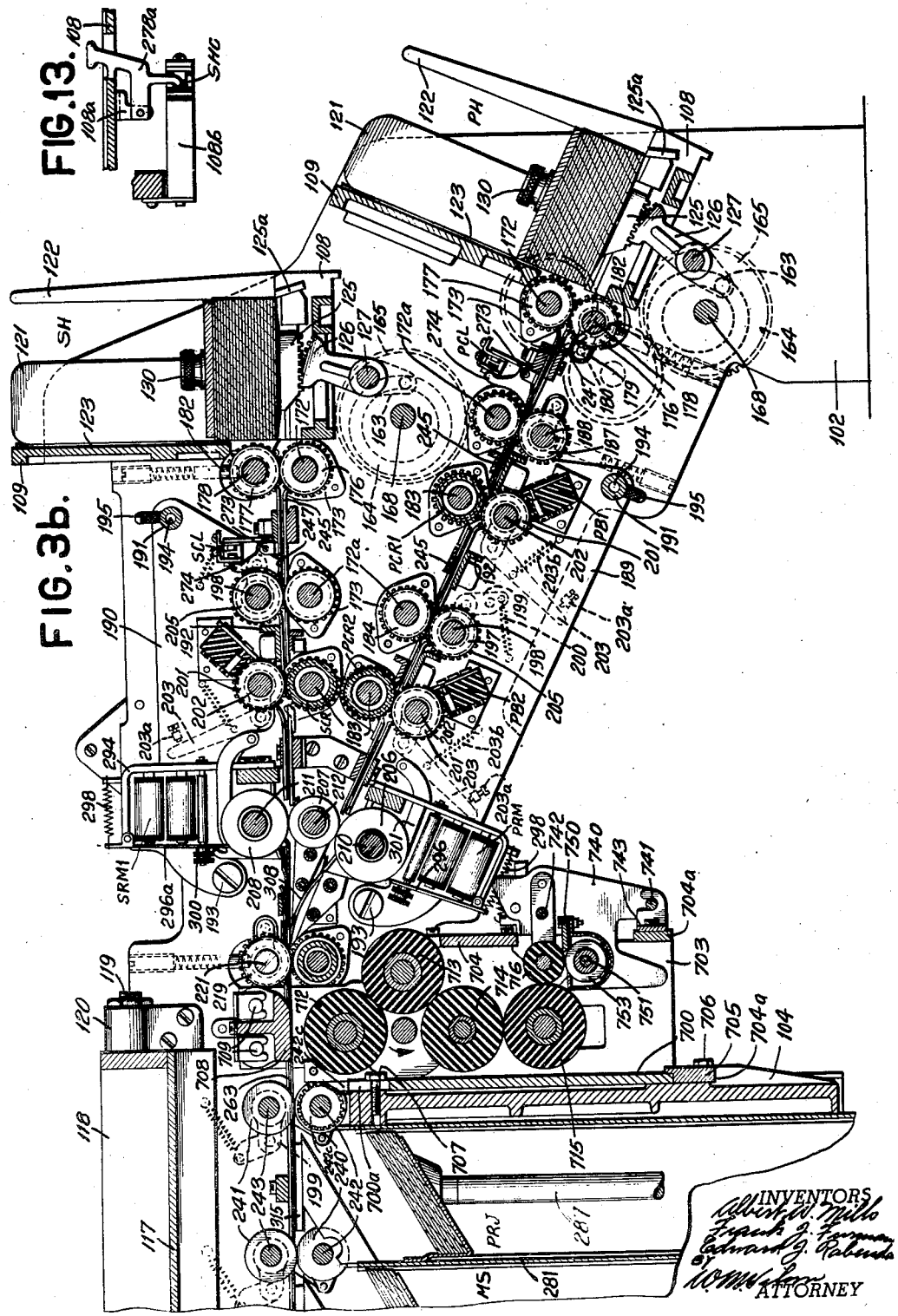

Dec. 10, 1946. A. W. MILLS ET AL 2,412,527
ADDRESSING MACHINE
Filed May 12, 1942 19 Sheets-Sheet 9
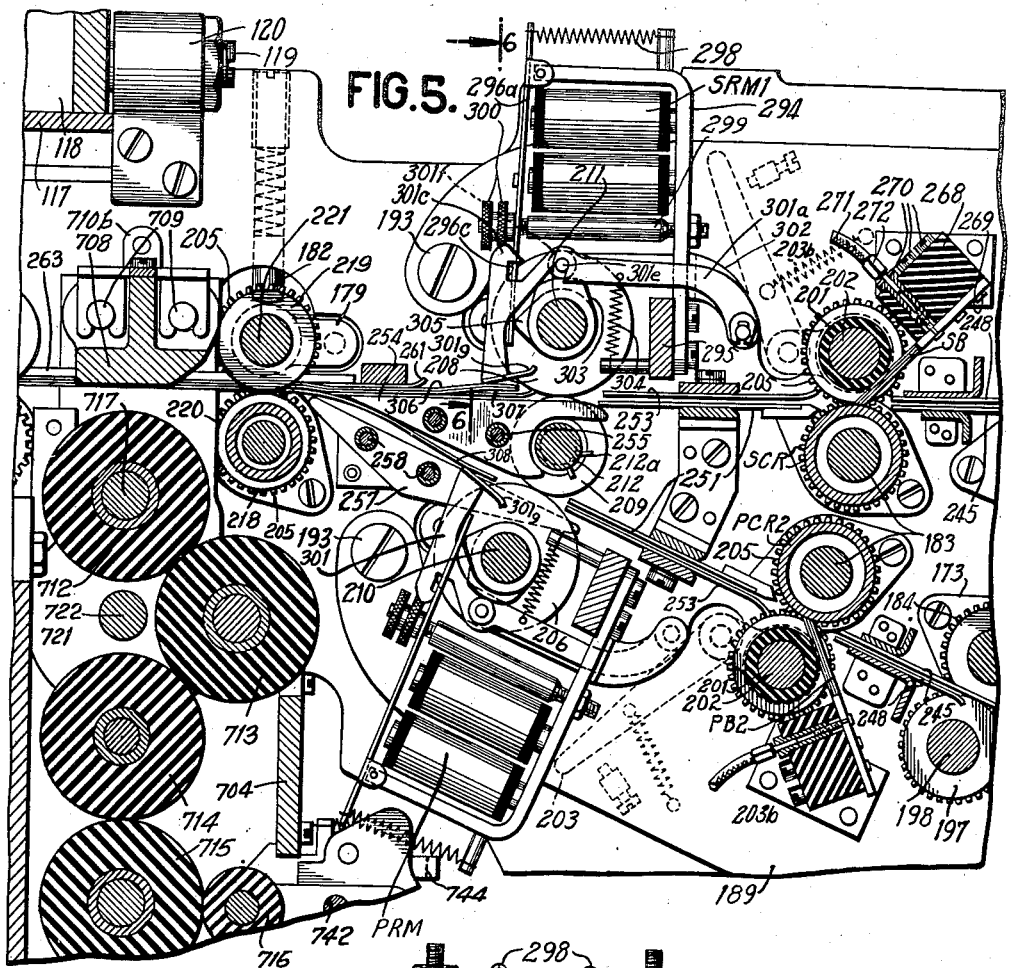
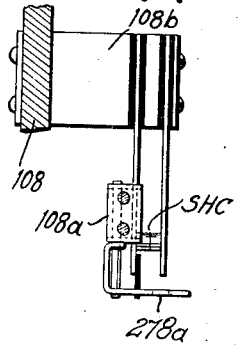
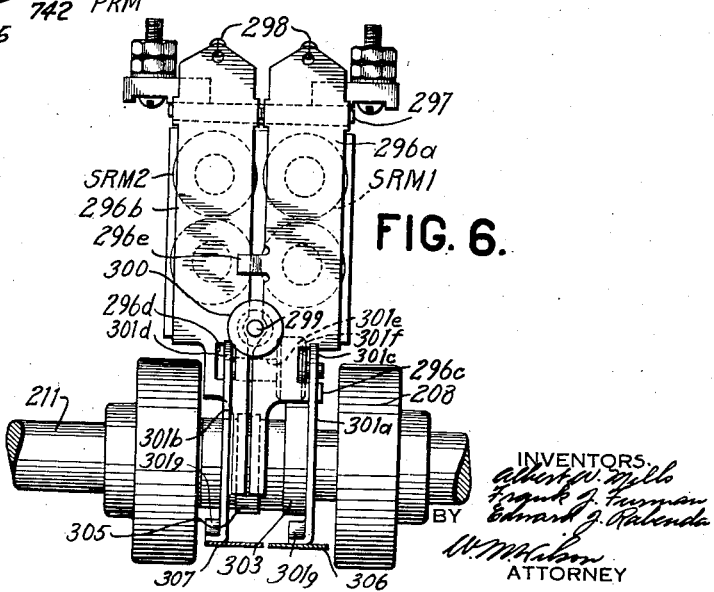

Dec. 10, 1946. A. W. MILLS ET AL 2,412,527
ADDRESSING MACHINE
Filed May 12, 1942 19 Sheets-Sheet 11

Dec. 10, 1946.  A. W. MILLS ET AL  2,412,527
ADDRESSING MACHINE
Filed May 12, 1942  19 Sheets-Sheet 13

Dec. 10, 1946.    A. W. MILLS ET AL    2,412,527
ADDRESSING MACHINE
Filed May 12, 1942    19 Sheets-Sheet 14
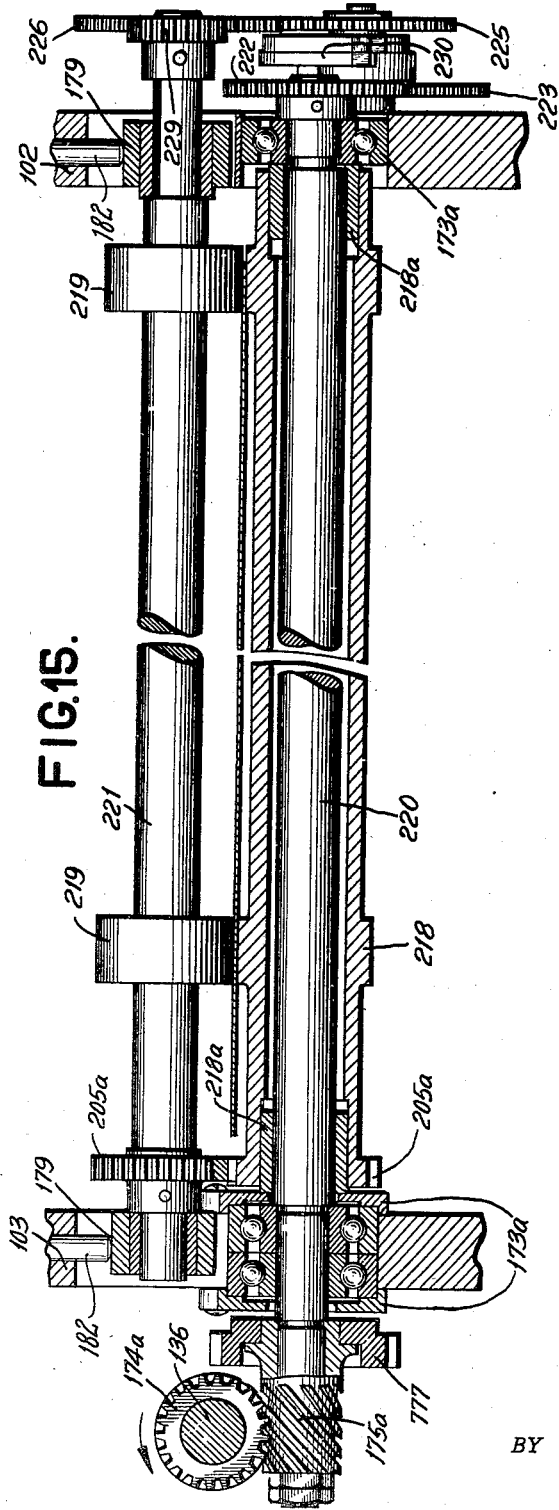

Dec. 10, 1946.   A. W. MILLS ET AL   2,412,527
ADDRESSING MACHINE
Filed May 12, 1942   19 Sheets-Sheet 15

INVENTORS
BY
ATTORNEY.

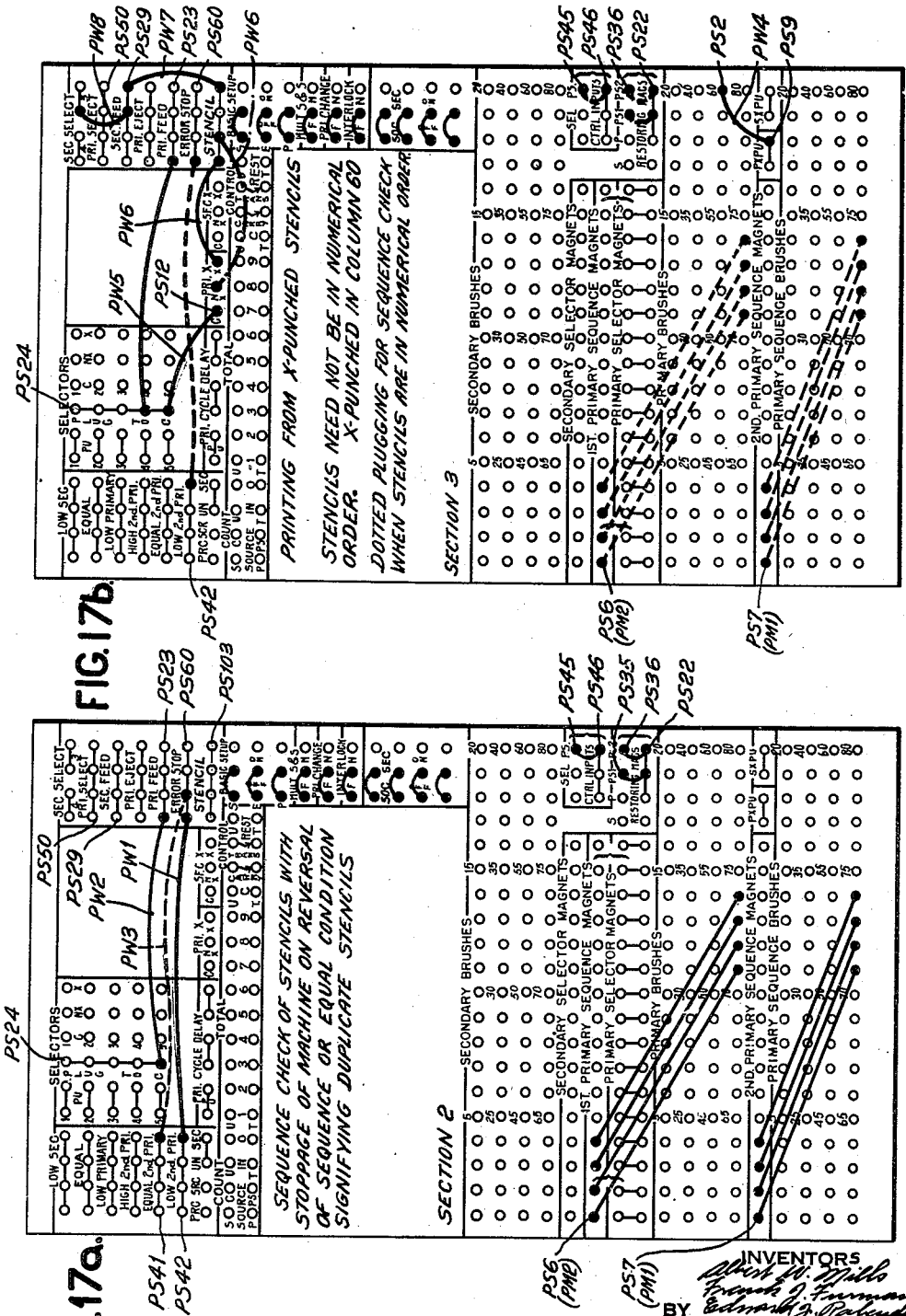

Dec. 10, 1946.  A. W. MILLS ET AL  2,412,527
ADDRESSING MACHINE
Filed May 12, 1942  19 Sheets-Sheet 17

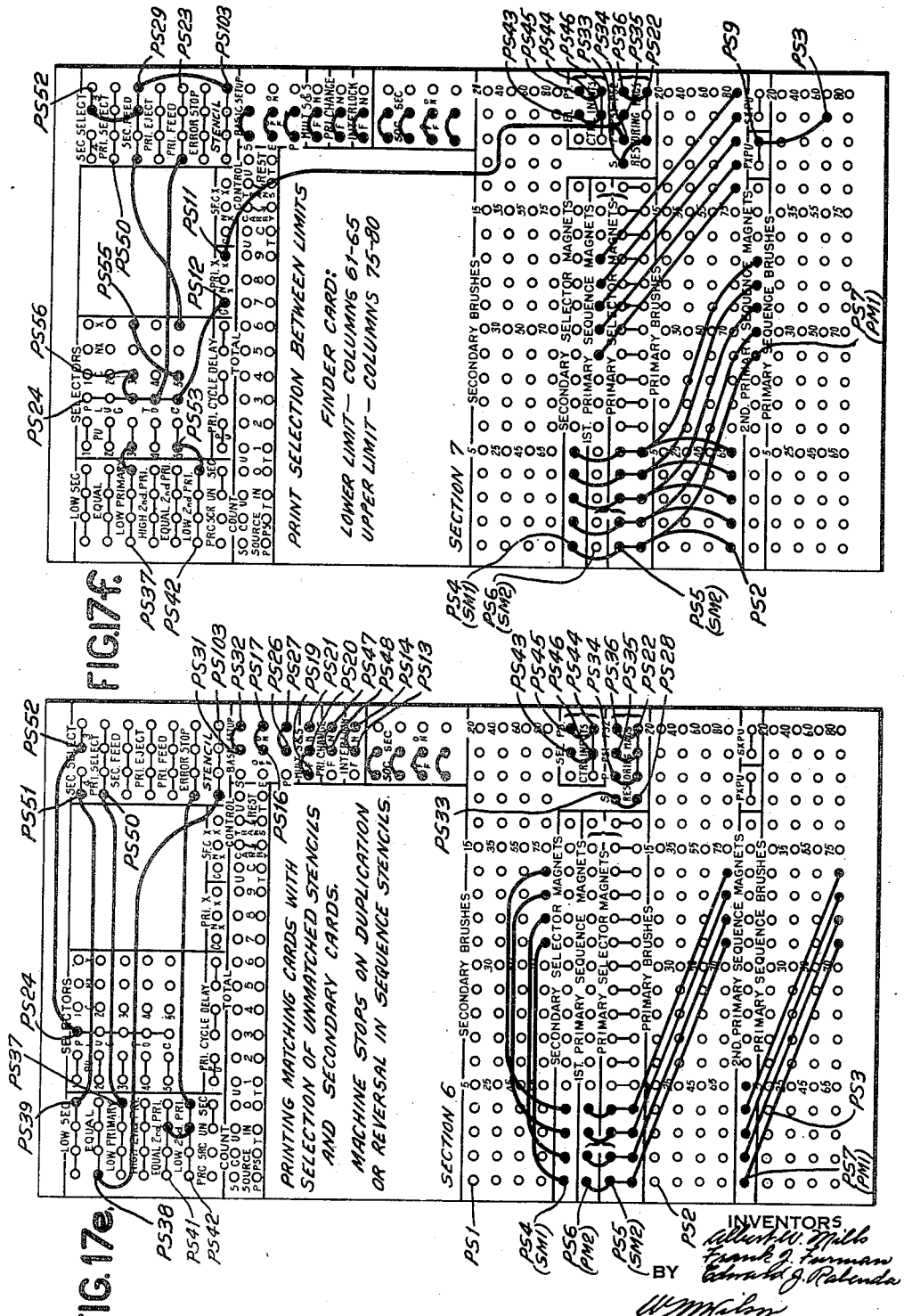

Dec. 10, 1946.    A. W. MILLS ET AL    2,412,527
ADDRESSING MACHINE
Filed May 12, 1942    19 Sheets-Sheet 19
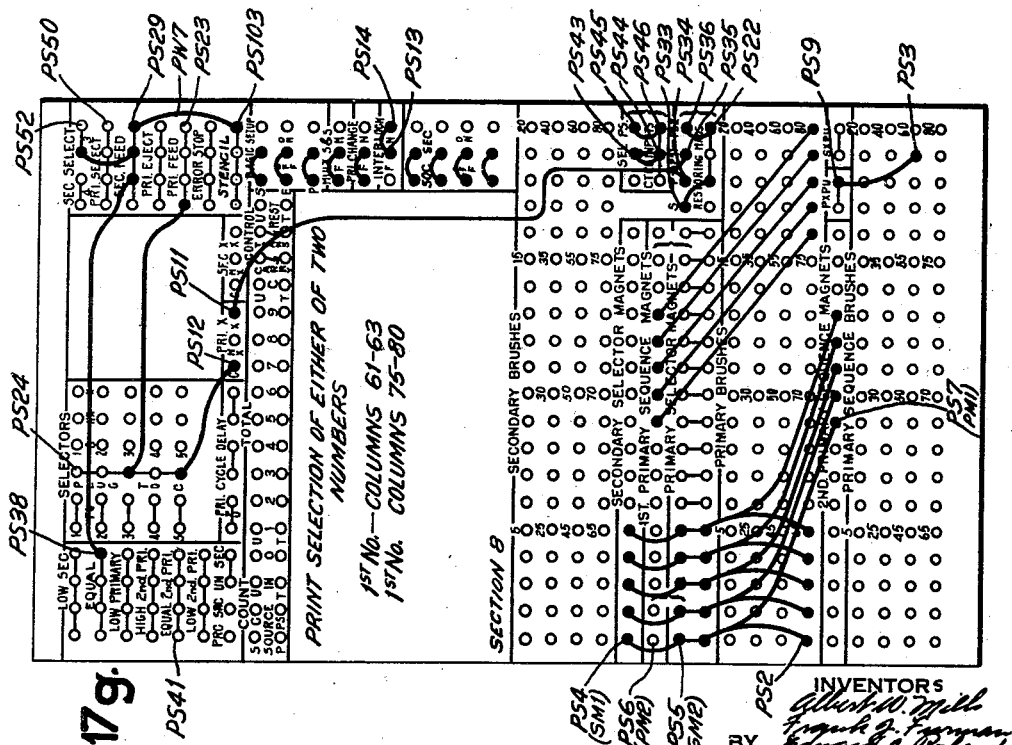

Patented Dec. 10, 1946

2,412,527

UNITED STATES PATENT OFFICE 2,412,527

ADDRESSING MACHINE

Albert W. Mills and Frank J. Furman, Endicott, and Edward J. Rabenda, Binghamton, N. Y., assignors to International Business Machines Corporation, New York, N. Y., a corporation of New York Application May 12, 1942, Serial No. 442,642

12 Claims. (Cl. 101—48)

This invention relates to record controlled printing machines and more particularly to that class of machines known as addressing machines.

An object of the present invention is to provide an addressing machine capable of printing upon articles such as cards.

A further object is to provide an addressing machine which is more flexible than prior machines in respect to the number of different types of operation which the machine can accomplish.

Another object is to provide a record controlled addressing machine in which the article printed upon, such as a card, controls the printing mechanism to select a printing member which may take the form of a stencil.

An object is to provide a record-controlled comparing and printing machine which is jointly controlled by the printing member, which may be a stencil, and the article printed upon, which may be a perforated record card.

Another object is to provide an addressing machine capable of printing addresses upon perforated accounting and statistical cards such as those used in the well known Hollerith and Powers systems of accounting.

An object is to provide a machine capable of matching the stencils or similar address printing members with the articles printed upon through control media placed on the article printed upon and on the printing member, respectively.

An object is to provide a stencil printing machine with control means for selecting the stencil which is to be active in printing upon an article.

An object is to provide a stencil or similar type of addressing machine with flexible means for selecting the printing member for operation and controlling printing operations by the printing member.

Another object is to provide an improved stencil printing mechanism.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a to 1d together comprise a wiring diagram of the machine.

Fig. 2 is a front view of the right hand half of the machine with the enclosing cabinet removed.

Figs. 3a and 3b together comprise a vertical longitudinal section.

Fig. 5 is a large scale vertical section of the eject rollers and card distributing mechanism.

Fig. 6 is a vertical section on the line 6—6 in Fig. 5.

Fig. 7 is a vertical section on the line 7—7 in Fig. 3a.

Figure 11A:
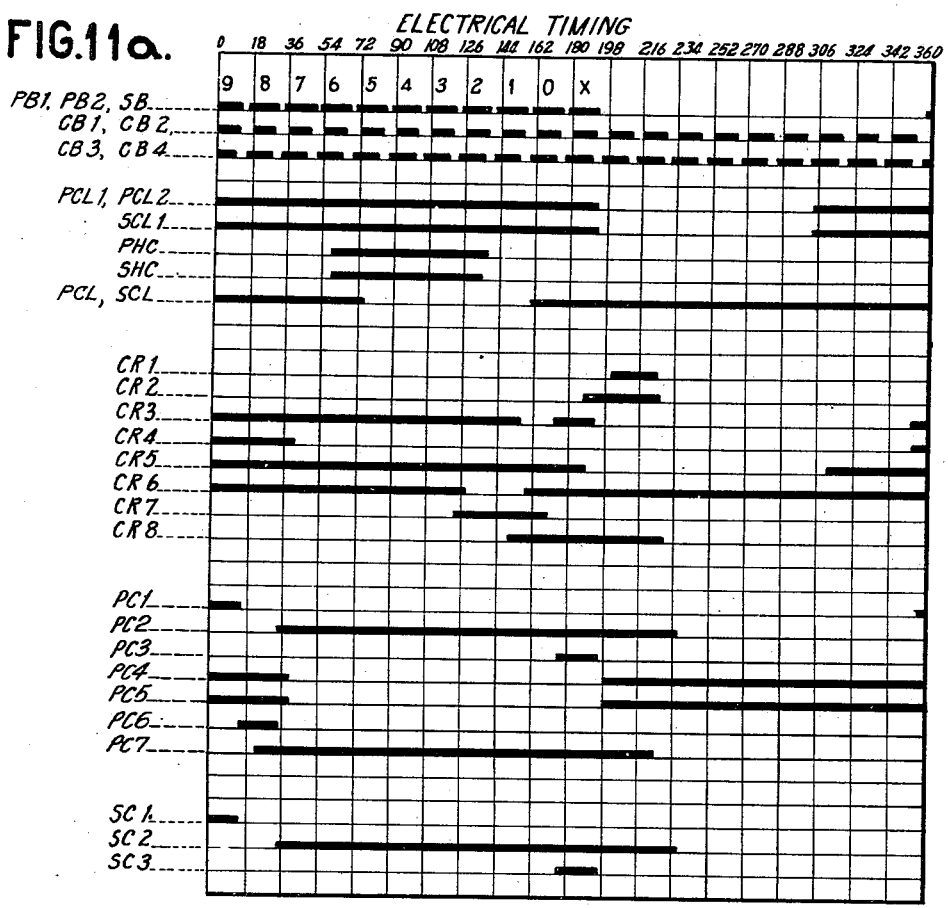
Figure 11B:
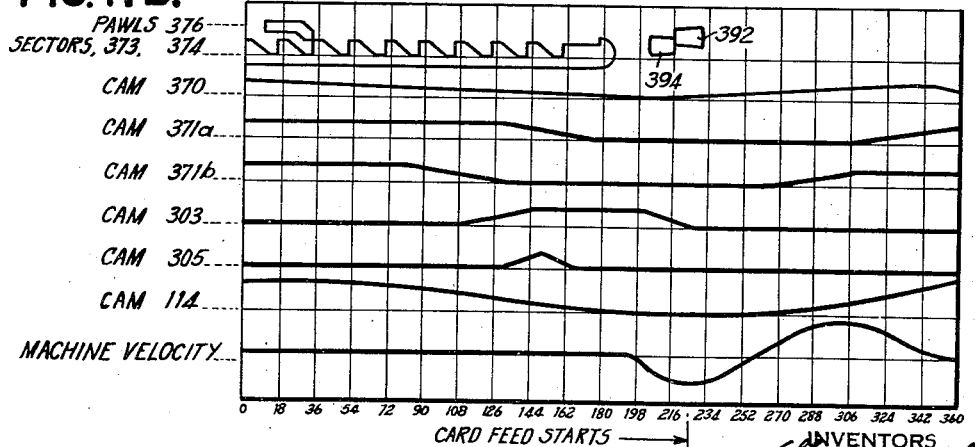

Figs. 11a and 11b comprise electrical and mechanical timing charts, respectively.

Fig. 12 is a detail view of the ink control mechanism.

Fig. 13 is a vertical section through one of the secondary card hoppers showing the secondary hopper contacts.

Fig. 14 is a plan view of the secondary hopper contacts.

Fig. 15 is a vertical section on the line 15—15 in Fig. 2.

Figure 16A:
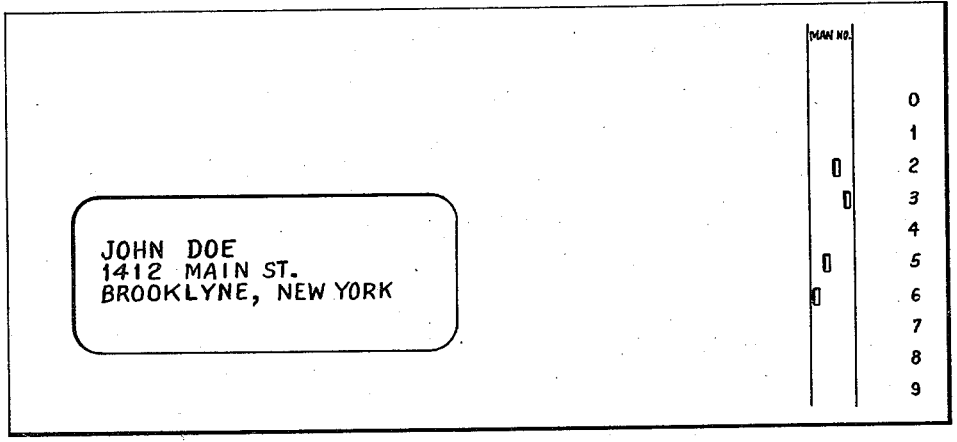
Figure 16B:
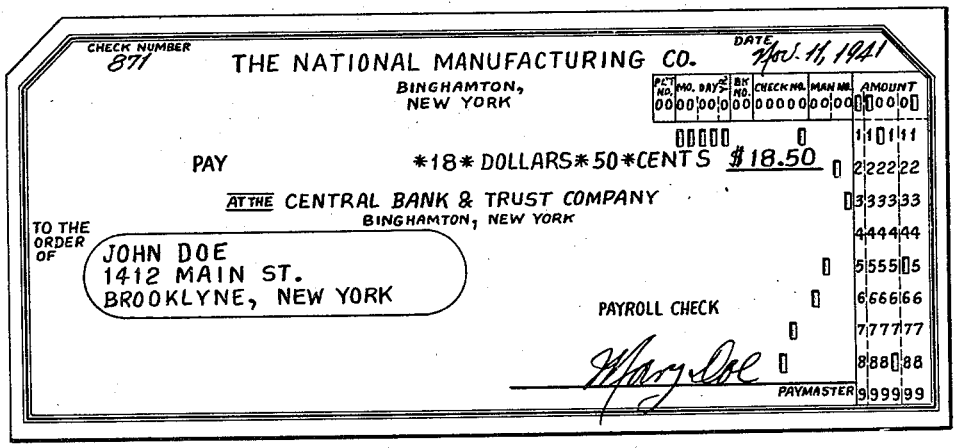

Figs. 16a and 16b show specimen stencil and perforated cards, respectively.

Figs. 17a to 17g are plugboard diagrams.

The present invention comprises a machine constructed similarly to the ones disclosed in British Patent 523,709 and application Serial No. 347,226, filed July 24, 1940, by D. W. Rubidge et al. in respect to the card feeding, analyzing, comparing, and distributing mechanisms, with such further modifications and additional structure as may be necessary to coordinate such mechanism with stencil printing mechanism in a new manner. It will be understood that the present invention relates largely to new combinations of elements of structure of an address printing machine, some of which may be old per se, producing new results, and these new combinations and results will be clearly set forth in the appended claims which differentiate the new from the old.

I. SYSTEM OF DESIGNATING ELECTRICAL PARTS OF MACHINE

In describing the invention it will be found convenient, and will make the drawings more nearly self-explanatory, to designate the various controlling magnets, contacts, relays, and other electrical elements by means of capital letters derived as far as possible by taking the initial letters of the name of the magnet or other element; and where more than one of a kind is present, to distinguish them by means of numerical suffixes. Thus, the relays are designated R1, R2, etc. Other illustrations of this system of designation are the letters EM (eject magnet), PFM (primary card feed magnet), and SFM (secondary card feed magnet). The same reference numerals used in Patent No. 2,379,828.

Due to the complexity of the wiring of the machine, the wiring diagram would become a maze of crossing wires difficult to follow if it were attempted to show each relay magnet opposite the contacts it controls. Accordingly, the circuits in Figs. 1a to 1d have been laid out so as to extend as directly as possible from one line wire to the other with the relay magnets separated from their contacts. In order to avoid confusion, the contacts associated with each magnet will be designated with the same letters and numbers as the magnets plus the letters a, b, c, etc. Thus the contacts of relay R1 are designated R1a. In addition, the relay magnets will be shown in dotted lines adjacent the contacts wherever the latter appear in solid lines.

II. FRAMEWORK

The main framework comprises a heavy oblong base casting 100 (Figs. 2, 3a, 3b and 4) supported by four legs (not shown) secured to the base. Two frame castings 102, 103 are secured to the top surface of the base 100 along the front and rear edges nearest the right hand end of the base (Figs. 2 and 3b). The frame castings 102, 103, which are more or less alike but irregular in outline, extend upwardly and to the left. The left hand ends of both frame castings 102, 103 are secured to the upper corners of a vertical plate 104 (Figs. 2, 3b, 4 and 5) which are secured to base 100. An end plate 105 (Fig. 3a) is secured to base 100 near the left hand end thereof and extends at right angles to the planes of frame castings 102, 103. Front and rear plates 106, 107 (Figs. 2, 3a and 3b) are secured to the front and rear vertical edges of plate 105, respectively, and to the frame castings 102, 103. Two pairs of frame castings 108, 109 (Fig. 3b) join the frame castings 102, 103 and form part of the two card hoppers which will be described hereinafter.

The framework mounted on base 100 just described supports the card feeding, sensing, comparing, distributing, analyzing and stencil printing mechanisms, and the card pockets and hoppers.

The legs attached to the base support a framework (not shown) on which are mounted the driving motor and, where direct current is not available, a suitable motor generator. The plugboard relays, fuse box, a terminal board and other usual appurtenances of an electrically controlled machine are also wholly or partly supported by this framework or partly by the base.

The usual hinged glass shelf 117, with which sorting machines and other record controlled machines are commonly equipped, is provided above the card pockets. This consists of a sheet of plate glass secured in a frame 118 (Figs. 2, 3a and 3b) pivoted on conical studs 119, one of which is threaded into a hole in plate 105 (Fig. 3a) while the other is similarly mounted on a bracket 120 secured to rear frame casting 103 (Figs. 3b and 5). The shelf 117 thus can be swung upwardly and rearwardly to remove cards which may become jammed above the pockets.

III. CARD HOPPERS

The machine is provided with two separate card sensing and feeding mechanisms for control by two separate batches of perforated record cards, consequently two card hoppers are provided. The record cards used in this machine in respect to size and disposition of data designations, may be of the well known type now used in the Hollerith system of perforated card accounting. The size of the card and the number of columns available for recording data is unimportant but the machine will be described herein as designed for control by eighty column cards like the one described and claimed in Patent No. 1,772,492. The machine is easily adapted for control by other cards, for example, either 34 or 45 column cards, this requiring merely a change in the spacing of the card sensing brushes, in the case of 45 column cards, and in addition, a change in the dimensions of the card hoppers in the case of 34 column cards.

As a convenient means of distinguishing them, the hoppers will be termed the primary and secondary hoppers, and the adjectives "primary" and "secondary" will also be used in naming the cards placed in these hoppers, and in designating the card feeding, sensing, and comparing mechanisms, and other parts associated with the hoppers or controlled by the respective cards. It will be understood that the words "primary" and "secondary" as used herein are employed purely as a convenience in description for the purposes of identifying the parts of the machine and the records and have no special significance.

Figure 4:
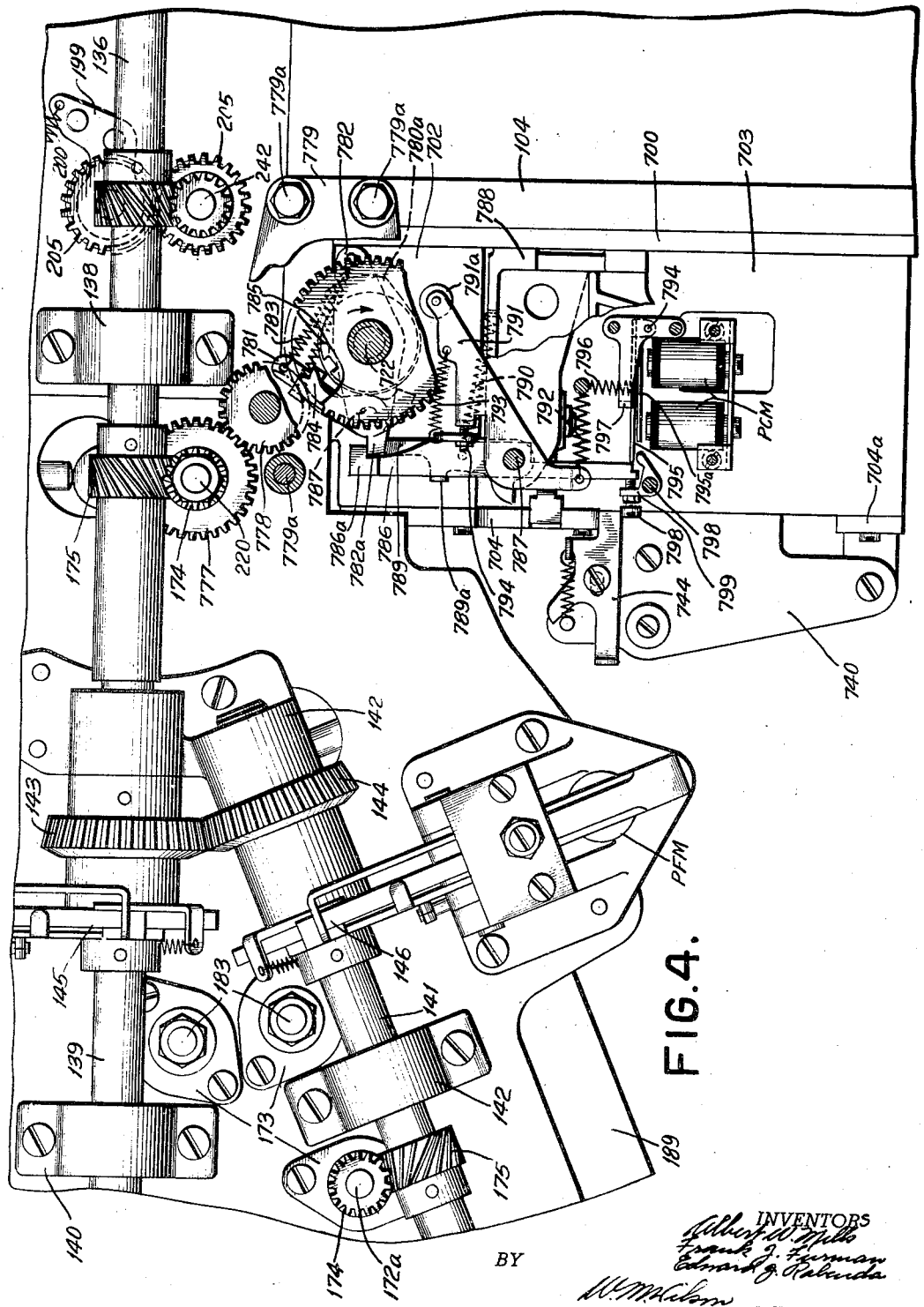
Fig. 4 is a rear view on a larger scale showing the card feeding clutches and the printing clutch.

The primary hopper is generally designated PH while the secondary hopper is designated SH in Figs. 2, 3b and 4. These hoppers and the card picker mechanisms associated therewith are constructed in a well known way, having been used for a number of years in "International" record controlled machines, such as sorting machines, reproducers, and multiplying punches. Consequently, only a very brief description of the hoppers will be given herein. Both hoppers are alike in details of construction and differ only in that the primary hopper PH is inclined owing to the fact that the cards from the two hoppers are fed in converging paths to a common point for distribution to the card pockets.

Each pair of frame plates 108, 109 forms the bottom and one side of one of the hoppers. Two sheet metal card guides 121 (Figs. 2 and 3b) are secured to the top of each frame casting 108 adjacent frame castings 102, 103 and serve to guide the ends of the cards. Two posts 122 are also secured to the edges of each frame casting 108 opposite the frame castings 109 and guide the right hand or trailing edges of the cards, while two metal strips 123, secured to the right hand face of each frame casting 109, guide the leading edges of the cards.

Card pickers 125 (Fig. 3b) of well known construction are provided having the usual picker knife 125a and are guided for reciprocatory movement by suitable guides. Each picker 125 is provided with rack teeth meshing with gear segments 126 secured to shafts 127 journaled in frame castings 102, 103 there being two pickers 125, two segments 126, and one shaft 127 associated with each hopper. The usual adjustable throat knife and throat block (not shown) are provided to prevent feeding more than one card at a time from each hopper. In order to keep the cards flat in the hoppers, the latter are provided with the usual follower weights 139 (Fig. 3b). One or both shafts 127 are oscillated at regular intervals to push one card from the associated hopper to the left in Fig. 3b into position to be gripped by feed rollers to be described later. The means for oscillating the shafts 127 will be briefly described in Part IV dealing with the driving mechanism.

IV. DRIVING MECHANISM

Figure 7:
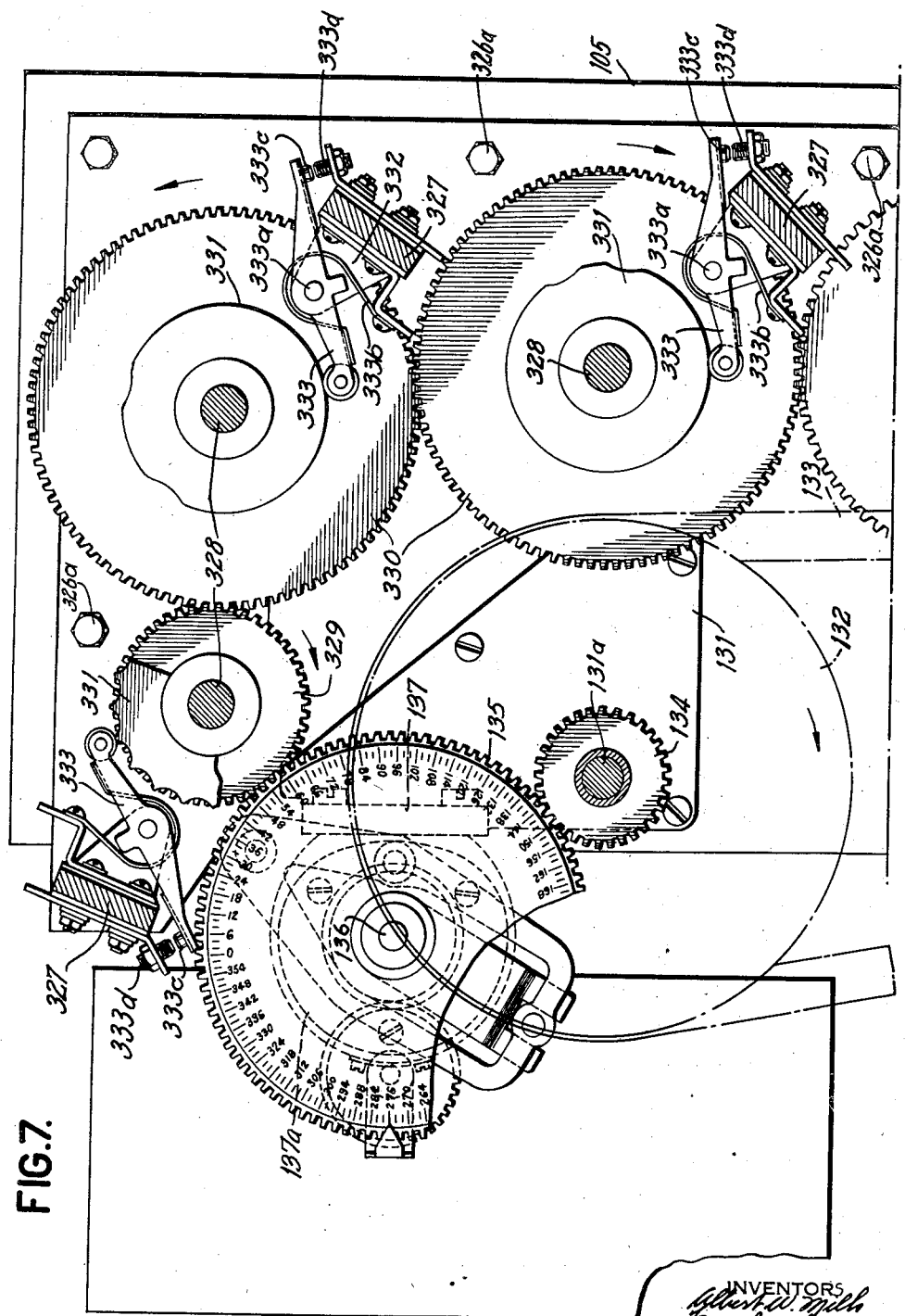

The driving mechanism is shown in Figs. 4 and 7. A bracket in the form of a casting 131 is secured to the left hand face of frame plate 105 (Fig. 7) and mounted on this casting is a stud 131a on which is journaled a driven pulley 132 connected to the main driving motor (not shown) by a belt 133. When the machine is in use, the pulley 132 is continually driven by the motor in the direction of the arrow. Secured to pulley 132 is a pinion 134 meshing with a gear 135 which is loose on the main drive shaft 136. The latter is journaled in a bearing 137 (Fig. 7) and bearings similar to 138 (Fig. 4) secured to the casting 131 and plate 103, respectively. Gear 135 and shaft 136 are coupled by mechanism disclosed in Patent No. 2,174,705, which causes the speed of the drive shaft 136 to vary between maximum and minimum limits. Bearing 137 has a cam groove 138a designed for controlling the speed as in said patent.

Coaxial with shaft 136 (Fig. 4) is the secondary feed shaft 139 journaled in two bearings 140, only one of which appears in Fig. 4, secured to the rear face of frame casting 103. The primary feed shaft 141 is journaled in three bearings 142, only two being shown in Fig. 4, also secured to frame casting 103. Shaft 141 makes an angle of approximately 24° with shafts 136, 139, and the extreme right hand bearings 142 (Fig. 4) are located so that the right hand end of shaft 141 extends quite close to the left hand end of shaft 136. Secured to the left hand end of shaft 136 (Fig. 4) is a bevel gear 143 meshing with a bevel gear 144 loosely mounted on shaft 141.

V. CARD FEED CLUTCH MECHANISM

The feed shafts 139, 141 may be selectively clutched to shaft 136 by means of two one-revolution clutches generally designated 145 and 146 (Fig. 4) termed the primary and secondary feed clutches respectively. The clutches 145, 146 are controlled by two magnets designated PFM and SFM in Fig. 1c, and called the primary and secondary feed magnets, respectively. Only magnet PFM is shown in Fig. 4. The lower of these clutches in Fig. 4 is the primary feed clutch while the secondary feed clutch is located directly above the primary feed clutch and are of a form now well known in the art. The mechanism of the two clutches and the clutches are identical except that the parts of the primary clutch are reversed in location and direction of movement relative to the secondary clutch due to the fact that gears 143, 144 rotate in opposite directions and due to limitations of space which preclude mounting the magnets and other parts in the same relative positions with respect to the associated feed shafts. Thus, the corresponding parts of the clutch mechanisms are symmetrically located with respect to the bisector of the angle between shafts 139, 141. Since the specific construction of the clutches is not material to the present disclosure, they will not be described in detail but are described in detail in Patent No. 2,359,670. It will suffice to state here that each time the magnet SFM or PFM is energized, shaft 139 or 141 is clutched to the main drive shaft 136 and will continue to rotate as long as the magnet is kept energized or is repeatedly energized at the right time.

VI. CARD FEED ROLLERS

Two independent feed mechanisms are provided for feeding the cards from the hoppers to the point where the distribution of the cards to the pockets is determined and, in addition to these feed mechanisms, a common feed mechanism for conveying the cards to the pockets is provided. The first two feed mechanisms are driven by shafts 139, 141 and will be termed the secondary feed mechanism and primary feed mechanism, respectively, while the third feed mechanism is driven by shaft 136 and will be called the pocket feed mechanism. These feed mechanisms are conventional in details of structure.

The primary and secondary feed mechanisms are essentially the same in direction of feed, details of construction and general arrangement, but there are more feed rollers in the primary card feed mechanism than in the secondary feed mechanism since the primary cards sometimes must be sensed twice whereas the secondary cards are only sensed once prior to their distribution to the pockets. The primary and secondary feed mechanisms first will be briefly described and are shown in Figs. 2, 3b, 4, and 5. The description will begin with the hoppers and follow the paths of the cards to the point of distribution to the pockets.

Secured to each shaft 127, which it will be recalled are rockable to actuate the card pickers 125, is an arm 163 (Fig. 3b) having a roller in a cam groove 164 formed in a gear 165. Gears 165 may be journaled on frame casting 103 in any suitable way as by means of studs 168 or long shafts supported by both frames 102, 103. The gear lowest or primary 165 meshes with an idler gear 169 journaled on a stud 170 carried by frame casting 103. Gear 169 meshes with a gear 171 secured to a feed roller shaft 172 journaled in anti-friction bearings 173 carried by the frame castings 102, 103 adjacent the primary hopper PH (see Figs. 2 and 3b). The secondary gear 165 meshes directly with a gear 171 secured to a similar feed roller shaft 172 journaled in bearings 173 adjacent the secondary hopper SH. Secured to the respective shafts 172 are spiral gear pinions, like the ones designated 174 in Fig. 4 meshing with spiral gears 175 fixed to the shafts 139, 141, respectively. Thus the feed roll shafts 172 may be driven in unison but in opposite directions while pickers 125 are driven in unison but in the same direction by shafts 139, 141 through the two trains of gearing just described.

Each feed roll shaft 172 is provided with card feeding rollers 176 cooperating with similar rollers 177 secured to a shaft 178 (Fig. 3b). The shafts 178 are journaled in arms 179 (see Fig. 2 also) pivoted at 180 in suitable recesses formed in the front faces of the castings 102, 103. Shafts 178 project through large openings 180 in the frames 102, 103.

Housed in holes in the frame castings 102, 103, at an angle to the bore of openings 181, are spring pressed plungers 182 (Figs. 2 and 3b) which, by engagement with the ends of arms 179, press rollers 177 into firm contact with rollers 176. This general scheme of mounting one feed roll shaft in fixed bearings and the other on spring actuated arms has been used for all the feed rollers. Due to limitations of space and other reasons, the means whereby the spring pressure is applied will vary in details of construction. The two sets of feed rollers 176, 177 rotate whenever the respective feed shafts 139, 141 turn and grip the cards advanced from the hoppers PH, SH and convey said cards toward the left (Fig. 3b) to a position to be gripped by the next set of feed rollers associated with the respective hoppers.

Certain of the remaining feed rollers of the primary and secondary feed mechanisms are journaled in fixed bearings carried by the frame castings 102, 103 in the same general fashion as the rollers 176 but the coacting rollers of each feed mechanism are mounted on a pivoted frame to permit removal of cards which fail to feed properly or jam in the feed mechanism. There is one of these pivoted frames for each feed mechanism, the one for the secondary feed mechanism being arranged to swing upwardly while the other swings downwardly. The two frames are substantially alike in details but the one for the primary feed mechanism is longer due to the greater number of feed rollers required for feeding the primary cards PC.

Journaled in fixed anti-friction bearings 173 (Figs. 2, 3b, and 4) in the frame castings 102, 103 are two pairs of feed roller shafts 172a, 183, for the primary feed mechanism and one pair similarly designated for the secondary feed mechanism. Feed rollers 184, like the feed rollers 176 are secured to shafts 172a, while to the feed roller shafts 183 are secured metallic contact rollers which are insulated from the shafts 183 (see Fig. 5 also). The contact rollers for the primary feed mechanism are designated PCR1, PCR2 while the one for the secondary feed mechanism is designated SCR. The contact rollers PCR1, PCR2, SCR, and feed rollers 184 are driven from the respective feed shafts 139, 141 by spiral gears 185 (Fig. 4) secured to said shafts and meshing with spiral gear pinions 186 secured to the shafts 182, 183.

Cooperating with the feed rollers 184 on the shaft 172a nearest the primary hopper PH (Fig. 3b) are feed rollers 187 on a shaft 188 which is mounted on frame castings 102, 103 in the same fashion as the feed roller shafts 178 by means of arms 179 actuated by spring pressed plungers 182. The feed rollers cooperating with the contact rolls PCR1, PCR2, SCR and with the remaining feed rollers 184 are all mounted on the pivoted frames mentioned above.

These frames are shown in Figs. 3b and 5. They include a pair of side plates 189, in the case of the primary feed mechanism, and a pair of side plates 190 in the case of the secondary feed mechanism. These pairs of plates are rigidly joined together, in each case, at the ends nearest the hoppers, by means of tubes 191, and along the edges of the plates by a number of angle strips 192. At the ends opposite the hoppers, the plates 189, 190 are pivoted to the confronting faces of frame castings 102, 103 by means of screw studs 193. The ends of tubes 191 are provided with spring pressed bolts 194 (Fig. 3b) having knurled finger pieces 195 working in slots in the tubes 191 which bolts enter the bore of bushings 196 pressed into holes (Fig. 2) in the frame castings 102, 103. The right hand end of the frame of which plates 189 are part can be lowered by pressing the finger pieces 195 of the bolts 194 associated with these plates toward each other to release the bolts. Similarly the right hand end of the frame including plates 190 may be raised.

Cooperating with the feed rollers 184 immediately to the right of the contact rollers PCR2, SCR are feed rollers 197 (Fig. 3b) secured to shafts 198. The ends of shafts 198 extend through large holes in the respective plates 189, 190 and are journaled in bearings carried by the arms of bell cranks 199 pivoted on plates 189, 190. Springs 200, attached to the other arms of bell cranks 199 and to pins carried by plates 189, 190, respectively, urge the feed rollers 197 into contact with feed rollers 184. The holes in plates 189, 190 through which shafts 198 project, permit a small amount of movement of feed rollers 197 away from rollers 184 to allow for the thickness of the cards and the walls of said holes act as stops to prevent the rollers 197 from becoming displaced from their proper positions more than a small amount when the frame units of which plates 189, 190 form part are lowered or raised, respectively. Cooperating with the contact rollers PCR1, PCR2, SCR are feed rollers 201, most clearly shown in Fig. 5, which are made of some form of insulating material, such as "Bakelite," mounted on shafts 202. These shafts are mounted in bearings on the short arms of bell cranks 203 pivoted in the plates 189, 190 and operated by springs 203b which urge rollers 201 into engagement with the contact rollers PCR1, PCR2, SCR. The shafts 202 for the feed rollers 201 work in open slots in the plates 189, 190 to permit removal of the feed rollers when desired. In order to prevent the feed rollers 201 from moving far enough to damage the card sensing brushes or unhook the springs 203b when the frames including plates 189, 190 are lowered or raised, respectively, adjustable stops 203a are provided to limit movement of the arms 203 supporting the feed rollers to an amount a little more than is sufficient to compensate for the thickness of the cards and allow for reasonable wear.

Cooperating with each contact roller PCR1, PCR2, SCR is a pair of contact roll brushes, these pairs of brushes being designated PCB1, PCB2, SCB for the respective contact rollers. As shown in Fig. 2, each pair of brushes is mounted in the end of a metallic terminal post 102a, the latter having two parallel slots in which the brushes are clamped. The posts 102a extend through large holes in the frame casting 102 and are secured in the ends of short bars 102b of insulating material mounted on the frame casting 102.

The various feed rollers described above, including the contact rollers, all have the same diameter whereby the primary and secondary cards will be fed at a uniform speed and in exact synchronism. Shafts 139, 141 drive these feed rollers by means of spiral gears 175 and spiral pinions 174 as in the case of the feed rollers 176, 177 (Figs. 3b and 4). Dependence is not placed on friction between the cards and the feed rollers to feed the cards accurately but each coacting pair of feed rollers is geared together for driving purposes by a pair of spur gears 205 (Figs. 3b and 5) secured to the feed roller shafts.

The distribution of the cards to the pockets is determined at the point where the primary and secondary lines of feed meet. The space between this point and brushes SB, PB2 may be termed the eject station. Here the primary and secondary cards are gripped by the eject feed rollers, designated 206, 207 in the case of the primary feed mechanism, and 208, 209 in the case of the secondary feed mechanism. These feed rollers are most clearly shown in Figs. 5 and 6 while their driving connections are best shown in Figs. 2 and 4. The feed rollers 206 and 208 are mounted in the frame castings 102, 103 on shaft 210 which are mounted like the feed rollers 177 in arms 179 actuated by spring pressed plungers 182. The feed rollers 207, 209 are mounted on anti-friction bearings supported by a shaft or rod 212 carried by frame castings 102, 103 intermediate shafts 210, 211, the anti-friction bearings being prevented from moving axially of shaft 212 by some simple means such as wire snap rings or spring clips 212a (Fig. 5) sprung into grooves in the shaft 212, there being a pair of spring clips for each roller 107, 109. Rollers 206, 207, and 208, 209 are not geared together as at this point in the feed of the primary and secondary cards it is not necessary that they be fed exactly in synchronism hence frictional contact of the eject feed rollers with the cards is sufficient properly to feed the cards.

The secondary eject feed rollers 208, 209 are driven by the secondary feed shaft 139 through a train of gears designated 213, 214, 215, 216 in Fig. 2. In this train, gear 213 is secured to the secondary contact roller shaft 183 driven by shaft 139; gears 214, 215 are idler gears mounted on studs carried by a plate 217 secured to frame casting 102; while gear 216 is secured to the shaft 211. Thus eject feed rollers 208, 209 rotate when the secondary feed shaft 139 turns.

The primary eject feed rollers 206, 207 are similarly driven by the shaft 183 carrying the contact roller PCS2 through gears designated 213a to 216a, the latter being secured to the shaft 210 while the gears 214a, 215a are rotatably mounted on a plate 217a. With this arrangement, the primary eject feed rollers 206, 207 rotate whenever the other primary feed rollers rotate.

At about the point where the lines of feed of the primary and secondary cards converge, there is located a pair of feed rollers designated 218, 219, the construction and driving connections for which are most clearly shown in Fig. 15. The lower feed roller 218 is provided with bearing bushings 218a, pressed into the ends of such roller, by means of which roller 218 is loosely rotatably mounted upon the shaft 200. This shaft is journaled in the frame plates 102, 103 by means of suitable anti-friction bearings 173a of which the left hand ones are similar to those used in mounting the primary and secondary feed rollers. This shaft 220 is driven by the main shaft 136 through spiral pinions 174a, 175a, whereby the shaft 220 rotates continually while the machine is in use. The upper feed rollers 219 are carried by a shaft 221 which is rotatably supported on spring urged arms 179 as in the case of the primary and secondary feed rollers. The feed rollers 218, 219 rotate slightly faster than the primary and secondary feed rollers and the spring tension on the arms 179 is lightly adjusted so that the rollers 218, 219 can slip on a card which is being fed by the rollers 206, 207 and 208, 209.

Provision is made for stopping the feed rollers 218, 219 to permit a printing operation to be effected on a secondary card by means of a stencil card which matches it. This is obtained by providing a clutch mechanism which prevents the feed rollers 218, 219 from turning while a printing operation is in progress. Secured to the front end of shaft 220 (Fig. 2) or the right hand end (Fig. 15) is a gear 222 which meshes with a gear 223 rotatably mounted on a stud 224 carried by the framework. Also rotatably mounted on the stud 224 is a gear 225 which meshes with a gear 226 carried by a stud 227 on a plate 228 fixed to the front frame plate 102. The gear 226 meshes with a gear 229 secured to the upper feed roller shaft 221. The gears 223 to 225 are interconnected by means of a one revolution clutch generally designated 230 in Figs. 2 and 15 which is controlled by a magnet EM (Fig. 2) hereinafter to be termed the "eject magnet" because it causes the ejection of the stencil card and the matching secondary card from the printing station. The one revolution clutch controlled by the magnet EM is of conventional form and quite similar to the ones controlled by the magnets SFM, PFM.

While the machine is in operation, the magnet EM is energized once for each cycle in which either the primary or the secondary feed mechanisms or both operate. This is effected by means of a relay designated HSR5 in Fig. 1c which is in parallel with the secondary feed magnet SFM and a similar relay designated HSR3 in parallel with the primary feed magnet PFM. When either of these feed magnets is energized, the coil of the associated relay HSR3 or HSR5 is energized, thereby causing one or the other of the contacts HSR3A, HSR5A to close. This has the effect of connecting the eject magnet EM in parallel with one or both of the magnets PFM, SFM. A circuit for this magnet is traced as follows: with reference to Fig. 1c: Line wire W1, contacts HSR3A or HSR5A, HSR4A, R58B, CR1, and R17B to line wire W2. The energization of the magnet EM causes the clutch 230 to be engaged, thereby causing the feed rollers 218, 219 to be driven through the train of gearing described above.

Four pairs of pocket feed rollers are provided to the left of the feed rollers 218, 219 and are designated 240, 241 in Figs. 3a and 3b. Feed rollers 240 are secured to shafts 242 mounted in fixed bearings 173 carried by the plates 106, 107 which shafts are provided with spiral gear pinions similar to pinions 172 in Fig. 4 meshing with spiral gears 175 on shaft 136. The feed rollers 241 may be made of rubber and are secured to shafts 243 journaled in the arms of bell cranks 199 actuated by springs 220 (see Fig. 4 also) as in the case of the feed rollers 197. The pocket feed rollers 240, 241 are not geared together as extreme accuracy of feed is not necessary after the cards have passed the printing station. The printing station is located between feed rollers 218, 219 and the right hand feed rollers 240, 241, in Fig. 3b.

VII. CARD GUIDES

The cards are supported and guided from one pair of feed rollers to the next by means of card guides which are shown in Figs. 3a, 3b, and 5. These guides consist of substantially flat bars or strips extending in the line of travel of the cards but may be bent slightly at one or both of their ends to prevent catching the cards. The guides are designated 245, 247, 248, 251, 253, 261, 263, and are mounted in various ways. The guides 245, 247, 251 253, 261 are secured to crossbars mounted in plates 189, 190. The guide 263 consists of a long bar extending lengthwise of plates 106, 107 above the card pockets. The bar 263 is secured to the plates 106, 107 by suitable crossbars and is located half way between the plates. At its left hand end, bar 263 is secured to plate 105 (Fig. 3a).

At the point where the cards from the primary and secondary cards meet there is provided a set of card guides consisting of four plates 254 (Fig.

5) mounted on two rods 255 carried by plates 102, 103. The plates 254 are shaped like an arrowhead to accommodate shaft 212 and their edges guide the cards over and under said shaft. The edges of a set of triangular plates 257 similarly mounted on cross rods 258 support the primary cards between the pairs of feed rollers 206, 207 and 218, 219.

VIII. CARD SENSING BRUSHES

The holes in the cards are sensed by three groups of card sensing brushes as the cards pass the contact rollers. The primary cards are first sensed by the group of primary brushes designated PB1 and then by the group of primary brushes PB2, while the secondary brushes are sensed only by the group of secondary brushes SB. The brushes SB, PB1, and PB2 cooperate with the contact rollers SCR, PCR1, PCR2, respectively, and are so spaced that the corresponding index-point positions on one secondary card and two successive primary cards are all sensed together as the respective cards are fed in unison past the respective brushes, assuming that both card feed shafts 139 and 141 are rotating. There are eighty brushes in each group since the machine as shown in the drawings is designed for control by cards having eighty columns of index-point positions.

Fig. 5 shows the brushes SB and PB2 on a larger scale than Fig. 3b. The brushes SB for example, are secured in transverse slots in a bar 268 made of insulating material, such as "Bakelite," secured in the frames 189, 190. Eyebolts 269, through the "eyes" of which the shanks of the brushes SB project, are threaded into holes in headed sleeves or thimbles 270 located in holes in the bar 268 at right angles to the slots in which the brushes are laid. The heads of the sleeves may be slotted, as shown, or provided with square or hexagonal heads for turning the sleeves to draw up the eye-bolts tight and thereby clamp the brushes in their slots. The electrical connections are made by attaching the circuit wires 271 to plugs 272 which are pushed into the bores of thimbles 270. Due to the closeness of the spacing of the brushes, the holes for thimbles 270 and eye-bolts 269 are staggered to ensure that neither the thimbles 270 nor plugs 272 can make electrical contact with each other. The feed rollers 201 are provided with eighty deep circumferential slots through which the brushes extend into contact with the contact rollers. The brushes PB1 and PB2 are similarly mounted.

In conjunction with the comparing units, the brushes may compare data on two successive primary cards and, if desired, the data on the first of the two primary cards can at the same time be compared with the data on a secondary card. Thus a dual comparison of data on three different cards can be made simultaneously in a single card feeding cycle.

IX. CARD LEVERS

The primary and secondary cards actuate card levers when placed in the hoppers and in the course of their feeding movement from the hoppers to the eject rollers 206, 207 and 208, 209. These card levers in turn actuate certain card lever contacts for controlling the operation of the machine and are shown in Figs. 2, 3b, 13 and 14.

The central card guide strip 247 (Fig. 3b) located between the pairs of secondary feed rollers 176, 177 and 184, 197 and between the central guide strip 245 extending between the primary contact rollers PCR1 and rollers 176, 177 (Fig. 3b) each have mounted thereon brackets 273. Pivoted on brackets 273 are card levers 274 which are made of stiff insulating material such as "Bakelite." One arm of each card lever extends downwardly and to the left (Fig. 3b) close to the line of contact of feed rollers 184, 197 and into the paths of cards fed by feed rollers 176, 177. The other arm of each card lever 274 engages the longer of two spring contact members 274a carrying contacts designated SCL in the case of the secondary feed mechanism. The spring contact members 274a are insulated from each other and brackets 275 by means of which the contact members are mounted on the crossbars 246. The contacts SCL, PCL are engaged by and rocked clockwise (Fig. 3b) to force the contacts closed.

Figure 1A:
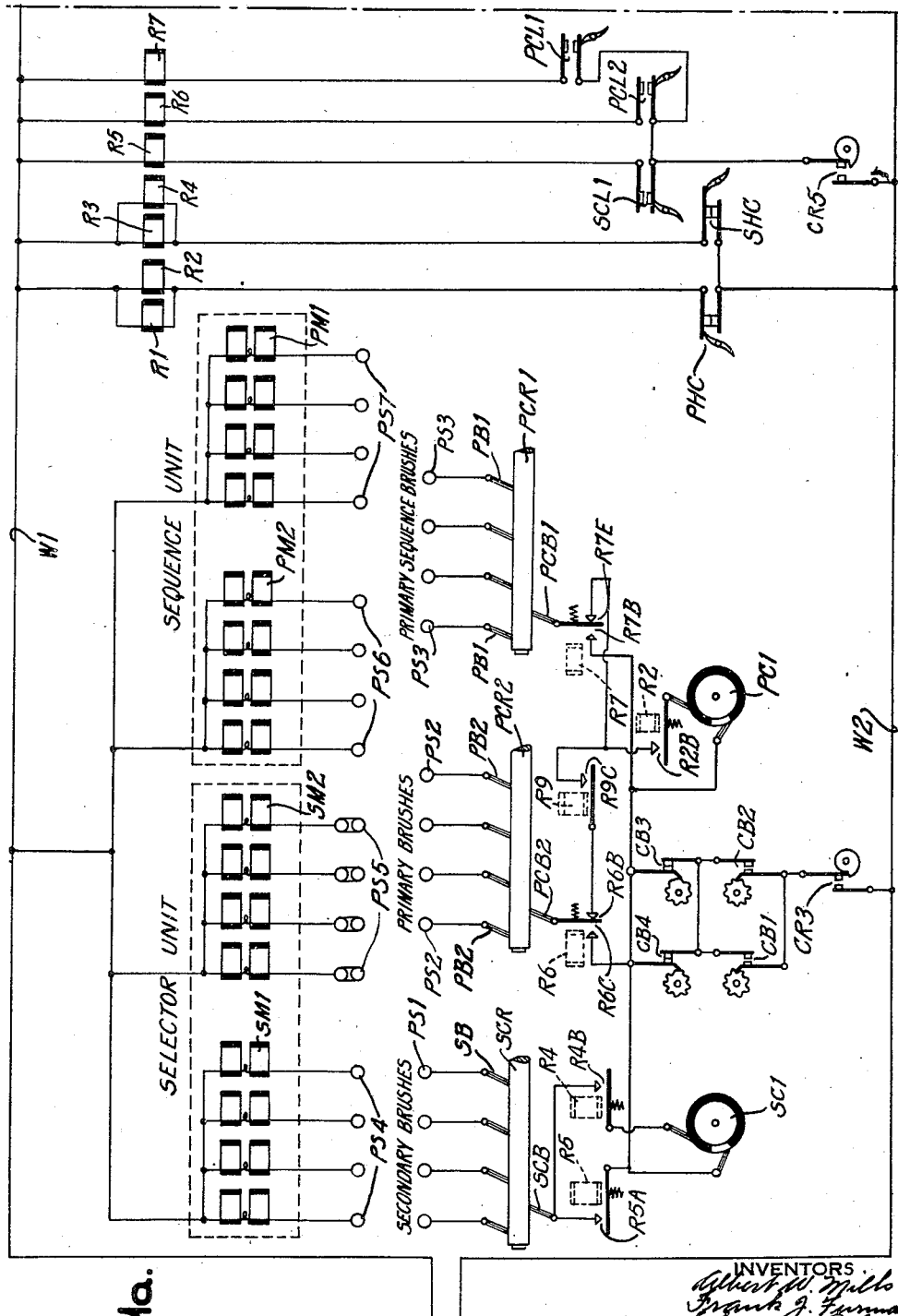

When the leading edges of the cards are about to pass between the brushes PB1, PB2, SB and the coacting contact rollers PCR1, PCR2, SCR, further card levers are actuated. The contacts controlled by these card levers are shown in Figs. 1a and 2 and are designated PCL1, PCL2, SCL1. The spring contact members carrying these contacts are insulated from each other and brackets 276 by means of which these members are mounted on the front face of frame casting 102. Since these contacts are mounted quite close to the frame casting 102, thin sheets of fibre insulation or "Bakelite" 277 are interposed between blocks 276 and frame casting 102 and are large enough to prevent possible accidental grounds between the contact members and the frame casting 102.

Each pair of contact members is actuated by an arm 278 (Fig. 2) secured to a stub shaft 279 journaled in a tube secured in a hole in the frame casting 102. Behind the frame casting 102 card lever arms 280 are secured to stub shafts 279 and project into the paths of the cards quite close to the respective contact rollers. The arm 280 for operating contacts SCL1 is shown in Fig. 6b in plan view and is arranged to be depressed by a passing card thereby rocking the stub shaft 279 and the arm 278 operating contacts SCL1 in a counterclockwise direction (Fig. 2) to close contacts SCL1. Similarly contacts PCL1, PCL2 are closed when a card is about to pass between brushes PB1, PB2 and contact rollers PCR1, PCR2, respectively, but in this case the arms 278 are rocked clockwise, since their associated arms 280 are located above the line of feed of the primary cards instead of below and consequently are lifted by the primary cards. The card levers associated with contacts PCL1, PCL2, SCL1 thus operate to close these contacts only when a card is very close to the position where sensing of the holes is about to commence.

The primary and secondary hoppers are provided with contacts designated SHC, PHC in Fig. 1a which are opened whenever cards are placed in the hoppers and are closed whenever the hoppers become exhausted of cards. The construction of these contacts is shown in Figs. 13 and 14. The underside of each casting 108 is provided with a bracket 108a on which is pivotally mounted a lever 278a. One arm of each lever 278a extends upwardly through a slot in the casting 108, whereby the lever will be rocked clockwise (Fig. 13) whenever cards are placed in the secondary hopper, for example. One arm of the lever 278a engages one of the members supporting the contacts SHC and presses such contacts apart whenever the lever is rocked clockwise. The members carrying the contacts SHC are supported on a bracket 108b which is secured to casting 108.

These contacts are used for two purposes; one to automatically condition the machine for operation under control of cards from either one or both feeds and second to stop the machine when cards become exhausted before the last card which leaves the exhausting hopper can enter the brushes SBI, PBI in order to enable the operator to replenish the cards. The temporary exhaustion of cards from either hopper does not, as was formerly the case, cause a hiatus in the operation of the machine, since the operator can now place more cards in the hoppers and the machine will resume feeding cards without leaving a gap other than the normal short gap which always exists between two successive cards. Were it not for the provision of the contacts SHC, PHC and circuits controlled thereby, the machine would continue to run until the card levers SCLI, PCLI open and, when more cards are placed in the hopper, the new cards would be unable to close the one cycle gap which would exist between the first of the new cards in the hopper and the last card which left the hopper.

X. Card Pockets

Four card pockets are provided to which the cards are selectively distributed by the card distributing mechanism in accordance with the comparison of data on the cards. The pockets are shown in Figs. 2, 3a, 3b and 5 and are designated as follows: SRJ the secondary reject pocket; SP split pair pocket; MS merged sets pocket; and PRJ primary card reject pocket. The pockets PRJ and SRJ receive the rejected primary and secondary cards. The split pair pocket SP receives the secondary cards which are paired or matched with primary cards having the same data but which are to be kept separate from the associated primary cards, hence the convenient short name. Pocket MS receives the matched or paired primary and secondary cards when they are to be kept together and not split between the pockets SP and MS. Pocket MS also receives the primary cards which are paired or matched with cards in pocket SP and it is desired to keep the secondary cards separate from the corresponding primary cards. Pocket MS will also receive all cards when one set of cards is to be filed with another set in numerical sequence.

It is desired to point out that the names given the pockets is purely for convenience in description because, as will be shown later, the cards which fall in primary reject pocket PR, in certain types of operation of the machine may be the ones it is desired to select for use in preparing a statement on a tabulating machine and the ones that fall in pockets MS or SP may or may not be used after the operations are finished. In other words, the term "reject pocket" for pockets SR and PR does not necessarily mean that the cards falling in these pockets are not used for any purpose.

The construction of the pockets is old and well known, having been used in "International" record controlled machines for some time, for this reason the pockets will not be described in minute detail.

The side walls of the pockets consist of the end plate 105 (Figs. 2, 3a and 3b) three partition plates 281, and an end plate 282. The back walls of the pockets are formed of a plate 285 secured to the back of the machine. Associated with each card pocket is a card platform 286 secured to a tube 287 which slides in a tube 288 secured in a hole in base 100. A long coil spring in each tube 288 exerts an upward force on tube 287 sufficient to balance the weight of tube 287 and card platform 286. As the cards accumulate on the tops of the card platforms their weight causes the platforms and tubes to descend until the pocket eventually becomes full.

When any pocket becomes full, it operates the usual full pocket stop contacts designated FPC in Fig. 3a. These contacts are carried by spring contact members insulated from each other and the plate 285 on the rear face of which they are mounted just behind the secondary reject pocket SRJ. The contacts are closed when no pocket is full but are opened by means of an arm 289 secured to a shaft 290 journaled in bearings 291 mounted on base 100 behind plate 285. Arm 289 is curved forwardly through an opening 285a in plate 285, upwardly, and thence rearwardly through a hole 285b in plate 285 and is provided with an insulating pin engaging the rear side of the rear contact member of contacts FPC. Secured to the shaft 290 behind each pocket are arms 292 which extend forwardly into the path of the associated card platforms 286. A spring 293 (Fig. 3a), attached to a pin on arm 289 in front of plate 285 and to a pin secured to said plate, holds said arm against plate 285 so as to keep contacts FPC open, the rear spring contact member being biased so as to tend to move forwardly to close the contacts.

When a pocket becomes nearly full, its platform engages the associated arm 292 and, with the addition of a few more cards, the platform moves arm 292 downwardly. This causes arm 289 to move forwardly permitting contacts FPC to open.

XI. Card Distributing Mechanism

The disposition of the cards to the pockets SRJ, SP, MS, PRJ is effected by card distributing mechanism. This mechanism is shown in detail in Figs. 3a, 3b, 5, 6, and is controlled by three magnets designated PRM and SRM1, SRM2, hereinafter termed the primary and secondary reject magnets, respectively. The mechanism directly associated with these magnets is most clearly shown in Fig. 5. The construction of the magnets and the mechanism individual to each are practically identical but the location and direction of movement of the corresponding parts is reversed as these magnets are located on opposite sides of the lines of feed of the cards in the respective feed mechanisms. The parts of the two magnets SRM1, SRM2 and magnet PRM, as well as the mechanism individual to them, are symmetrically located with respect to the bisector of the angle between the lines of feed of the primary and secondary cards as is clearly shown in Fig. 5. Consequently a description of the secondary reject magnets SRM1, SRM2 and the mechanism individual to them will suffice for the primary reject magnet PRM and the mechanism individual to the primary reject magnet, the corresponding parts being identically designated except for one or two exceptions.

The magnets SRM1, SRM2 are mounted on a bracket 294 (Figs. 3b, 5, and 6) which is secured to a bar 295 mounted on the frame castings 102, 103. The armatures 296a, 296b of magnets SRM1, SRM2 are pivoted at 297 to bracket 294 and are normally held away from the poles of the magnets by means of springs 298. Movement of the armatures toward the poles of the magnet is limited by a shoulder formed in a long stud 299 screwed into member 294. The left hand end of stud 299 adjacent the shoulder is threaded and reduced in diameter and extends loosely through confronting notches (Fig. 6) in the armatures, the radius of the notches being smaller in diameter than the smooth part of stud 299 but larger than the threaded end. Thumb screws 300 screwed on the threaded portion just mentioned limit movement of both armatures 296 away from the poles of the magnet in response to the tension of springs 298.

The armatures 296a, 296b are shaped to provide a lug 296c and an opening 296d (Fig. 5) which are engaged by hook-shaped portions 301c, 301d of curved blade operating arms 301a, 301b pivoted on a bracket 302 secured to the bracket 294. Thus armature 296a of magnet SRM1 holds the arm 301a in raised position and armature 296b holds arm 301b in raised position. The blade operating arm 301b has a pin 301e carrying a roller 301f cooperating with a cam 303 secured to shaft 211 and a spring like 304 normally tends to draw the arm 301b downwardly to cause roller 301f to follow the periphery of cam 303. This cam is so proportioned that the arm 301b is raised a slight amount during each revolution of shaft 211 so as to free the hook-shaped portion 301a from the edge of opening 296d and relieve magnet SRM2 from the frictional load caused by the contact of such edge with the hook-shaped portion 301a. This enables the armature 296b to move faster and the impulses of current through magnet SRM2 are timed to occur only when arm 301b is being held up by cam 303.

The pin 301e on which roller 301f is mounted is provided with a reduced portion (Fig. 6) cooperating with a notch in arm 301a to hold said arm up against the tension of its spring 304 as shown in Fig. 5. Thus both arms 301a, 301b are controlled by a common cam. Armature 296a is provided with a lug 296e (Fig. 6) extending over the adjacent armature 296b whereby the latter is always operated when magnet SM1 is energized.

The arms 301a, 301b are roughly L-shaped in general outline with the portion below hook portions 301a, 301b extending downwardly to a point just above the line of feed of the secondary cards and slightly to the left of shaft 211 (Fig. 5). At this point these members are formed with lugs 301g (see Fig. 6 also) which are at right angles to the plane of the bulk of members 301a, 301b. Lugs 301g slope upwardly from left to right and at their extreme right hand ends are also bent upwardly. Armatures 296a, 296b, extend downwardly into a position to be engaged by a common cam 305 fixed to shaft 211, but the thumb screws 300 are so adjusted that springs 298 normally hold the armatures 296a, 296b clear of the cam.

The magnet PRM controls similar mechanism which differs only in that the threaded end of pin 299 projects through a hole in the armature 296 of this magnet and the cams 303, 305 are secured to shaft 210.

The distribution of the cards to the respective pockets is effected by means of three guide blades designated 306, 307, 308 in Fig. 5. These blades vary in length and are located in superposed relation beneath the bar 263. The two top blades 306, 307 (Fig. 3a) lead to the pockets SP and MS respectively, while the blade 308 leads to the pocket PRJ.

The blades 306, 307 extend horizontally under the lug 301g of the arms 301a, 301b associated with magnets SRM1, SRM2 while the blade 308 is curved downwardly toward the right into cooperation with the lug 301g of the arm 301 associated with the magnet PRM. All of the blades are of greater width than bar 263 throughout substantially the entire length of the latter but the extreme right hand ends (Fig. 5) of blades 306, 307 are narrowed and cut away to form two tongues which clear each other and press side-by-side upwardly against the underside of lugs 301g of arms 301a, 301b whereby the free end of blade 307 may be depressed by member 301b, independently of blade 306, below the line of feed of the secondary cards without affecting the blade 306. However, since both arms 301a, 301b are released when magnet SRM1 is energized, in consequence of lug 296e, both blades 306, 307 will be depressed together whenever magnet SRM1 is energized.

With magnets SRM1, SRM2 in deenergized condition, the blades 306, 307 are held above the line of feed of the secondary cards which permits the secondary cards to pass underneath both these blades and over the blade 308 to the pocket MS. The energization of magnet SRM1 causes armature 296a of this magnet and the armature 296b of magnet SRM2 to move to the right (Fig. 5) disengaging lug 296c and opening 296d from the hook-shaped portions 301c of arms 301a, 301b. This allows springs 304 to draw the arms 301a, 301b downwardly as the cam 303 rotates thereby depressing both blades 306, 307 below the line of feed of the secondary cards. In this case the secondary cards will pass over both blades 306, 307, under bar 263, and be guided to the secondary reject pocket SRJ. The energization of magnet SRM2, however, causes only the blade 307 to be depressed and secondary cards will be guided between blades 306, 307 to the pocket SP.

The blade 308 normally occupies a position below the line of feed of the primary cards as shown in Fig. 5 whereby the primary cards may pass over said blade and underneath blade 307 into the pocket MS. When magnet PRM is energized the blade 308 is pushed upwardly above the line of feed of the primary cards and the primary cards will then pass beneath all the blades into the primary reject pocket PRJ. When any magnet SRM1, SRM2, PRM is operative to cause the associated blades to move inwardly, that is, between the card guides 254, the cards affected travel between the lugs 301g and the operative blade. The lugs 301g are inclined away from the lines of feed of the cards and bent at their right hand ends as shown in Fig. 5 in order to prevent the cards from being caught by the arms 301, 301a, 301b.

The blades 306, 307, 308 are secured, as by welding, at their left hand ends to blocks 315 (Figs. 3a and 3b). The latter are secured by suitable screws to the beveled surface of card deflector blocks 316 which are secured to the partition plates 281 directly beneath bar 263. The deflector blocks 316 extend upwardly and to the right at an angle to the partition plates 281, being beveled for that purpose, and the planes of the bevels are at right angles to each other so that blocks 316 are horizontal. The heads of the screws securing blocks 315 are countersunk to avoid catching the edges of the cards as they pass over the left hand ends of the blades. Tongues 316a (best shown in Fig. 5), pierced out of the blades 306, 307, 308 extend downwardly and to the left to deflect cards away from the space between blocks 315 and deflectors 316. Over pocket SR (Fig. 3a) a deflector 317 is secured to the top of bar 236 and extends downwardly and to the left, being bent around the edges of a large hole in bar 263.

XII. CIRCUIT TIMING DEVICES

A number of devices such as commutators and impulse distributors are provided for the purpose of controlling the times of closure and duration of various circuits and to prevent arcing between the sensing brushes and contact rolls. These devices will be described in this section.

There are two main groups of these timing devices designated CB1 to CB4 and CR1 to CR8 in Figs. 1a to 1d of which CB1 to CB4 rotate twice per cycle while CR1 to CR8 rotate once per card cycle. The variable speed driving mechanism disclosed in Patent No. 2,174,705, causes all of the shafts to be driven at a variable speed which at one point in the cycle is approximately 40% below, and at another point in the cycle is a similar amount above, the average speed. As shown in Fig. 11b, the speed is constant during substantially the first half of the cycle but is reduced by the variable speed driving mechanism at the point where the card feed clutches controlled by magnets PFM, SFM are engaged in order to reduce the shock of engagement. It is desirable that the timing devices designated CB1 to CB4 and CR1 to CR8 be always driven at a constant speed and for this reason they are driven directly by pulley 132, instead of by shaft 136 as was the case in the machine disclosed in the Page application.

Figs. 3a and 7 show the timing devices CB1 to CB4 and CR1 to CR8. These devices are mounted in a supplemental frame comprising two plates 326, and short crossbar 327 one of which plates is secured to the left side of plate 105 by means of bolts 326a (Fig. 7). Rotatably mounted in suitable anti-friction bearings, on the plates 326 are four shafts 328 to which are secured gears 329, 330. The gear 329 meshes with the gear 135 which, it will be recalled, is driven by the pulley 132 through the pinion 134. The gear 329 is one half the diameter of the gear 135, whereby the upper left hand shaft 328 (Fig. 7) is driven at twice the speed of gear 135. Gears 330 are of the same diameter as gear 135 whereby the other three shafts 328, of which only two are shown at the right in Fig. 7, are driven at the rate of one revolution per card cycle.

Secured to the shafts 328, are fourteen cams 331 made of non-metallic composition such as "Bakelite" or material of similar characteristics in order to make the operation of the timing devices as quiet as possible. Secured to the bars 327, are fourteen brackets 332, each of which supports a cam follower lever 333, pivoted on a stud 333a. Each cam follower lever is actuated into contact with the adjacent cam 331 by means of a spring 333b and the cam follower lever is provided with a suitable roller cooperating with the cam. Each lever 333 is provided with a contact element 333c cooperating with a contact element 333d. The brackets 332 and the contact elements 333d are separated from the bars 327 by means of strips of insulating material and the electrical connections are made to the brackets and to the contact elements 330d. It is evident from Fig. 7 that rotation of the cams 331 causes the contact elements 333c, 333d, to make and break according to the locations of the high and low points on the cams. The cams 331 located on the shaft 328 carrying gear 329 scalloped and the contacts which they actuate are designated CB1 to CB4 in Fig. 1a. These contacts are termed circuit breakers, and their principal function is to prevent arcing at the brushes SB, PB1, PB2 when the card is sensed. The remaining contacts 333c, 333d are designated CR1 to CR8 in Figs. 1a to 1d and their function is to control the points of closure, opening, and duration of circuits through the various relays, switch mechanisms, and control magnets of the machine.

Three of the cams 331 are located on the lowest shaft 328 (Fig. 3a) and operate contacts involved in the card counting device which is not described herein but is disclosed in Patent No. 2,379,828. A group of seven primary commutators designated PC1 to PC7 (Figs. 1a, 1b, 1c, and 1d) is mounted on the primary shaft 141. Three secondary commutators SC1, SC2, SC3 are mounted on the shaft 139. These commutators are not shown as their specific form is not important and their construction follows well known principles. They are fully described in Patent No. 2,359,670 which, however, shows a fewer number of commutators. The timing of these commutators is shown in Fig. 11a.

XIII. PLUGBOARD

A plugboard, the details of which are not shown, is provided to secure flexibility of operation and is so constructed that the machine may be preset for operation by multi-prong plugs or plug wires. The plugboard is so mounted in the machine that it may be removed and another one like it, but plugged according to a different plan, substituted. The plugboard and the mechanism for locating it in the machine and locking it in place is well known in the art and the arrangement of the plug sockets is substantially identical with the one disclosed in Patent No. 2,379,828. The plug sockets are arranged on the face plate and labeled as shown in Fig. 17 which consists of a plugboard diagram for the operation of matching stencils and checks.

It is contemplated that the machine disclosed herein be provided with a number of plugboards, each one being plugged differently from the others whereby no time need be lost in re-plugging the machine each time it is desired to change the type of operation or operate the machine under control of cards which have the data disposed according to a different card form.

XIV. RECORD COMPARING MECHANISM

The machine is equipped with comparing mechanism which includes two comparing devices that may be utilized for various purposes involving comparison between two numbers punched in two cards to determine equality or inequality. This comparing mechanism may take any suitable form but it is preferred to use the mechanism disclosed in Patent No. 2,359,670. Since this comparing mechanism is now well known in the art, no extended description will be given herein.

Figure 10:
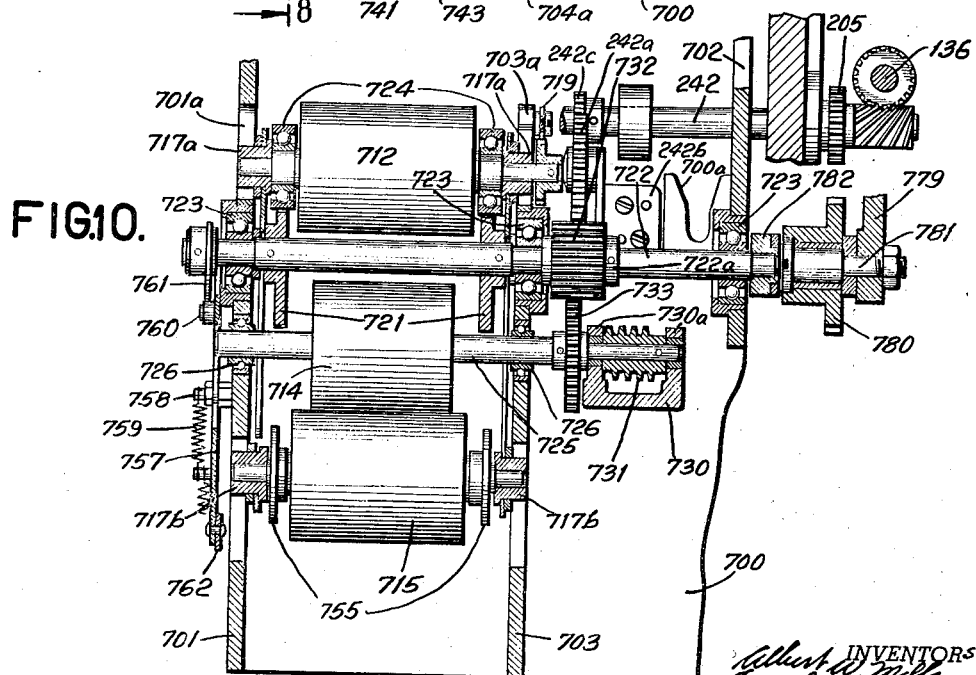
Fig. 10 is a vertical transverse section of the printing mechanism.

In Patent No. 2,359,670 there is shown and described a comparing mechanism in which each comparing unit has sixteen positions, each having a pair of comparing magnets, whereby a total of 32 columns can be compared at once by suitable plugging of the comparing magnets. In this form of comparing mechanism, there is provided a pair of comparing magnets SM1, SM2 and PM1, PM2 (Fig. 1a) for each pair of columns in the records to be compared. Each magnet controls a pawl which is released by the magnet to stop a moving sector at a point depending upon the position of a perforation in the card column. These sectors are shown diagrammatically in Fig. 11b which consists of a mechanical timing chart and the pawls are designated 376 while the sectors are designated 373, 374 to correspond to Patent No. 2,359,670. There are two sets of sectors in each sixteen-position comparing unit and the sectors are paired to correspond with the pairing of the comparing magnets. Each group of sixteen sectors is oscillated by a bail which is caused to oscillate by means of a cam 370 identified in Fig. 10b. This cam allows the bail to swing in synchronism with the passage of the cards past the brushes so that when any comparing magnet is energized its corresponding pawl will interrupt movement of the associated sector at a position representative of the value of the perforation in the card column sensed by a brush connected to the magnet.

Restoring mechanism is provided and includes a restoring magnet for each group of sixteen sectors, these restoring magnets being designated PR1, PR2, PR3, and SR in Fig. 1c. The magnets PR1, PR2 are associated with what has been known as the sequence comparing unit while the magnets PR3 and SR are associated with the selector unit. In the usual use of the machine, the sequence unit is plugged to the primary brushes PB1, PB2, as described in Patent No. 2,359,670 to verify the sequence of the primary cards to detect an error in sequence, such as might be caused by a misplaced card or a reversal in sequence. The selector unit is usually used to compare secondary cards with primary cards and in the present case will be used to compare the perforations in the stencil card with the perforations in the check. When the magnet PR1 is energized, it causes the resetting of those sectors which are controlled by the brushes PB1 to reset while the magnet PR2 similarly controls resetting of the sectors corresponding to the brushes PB2. The magnet PR3 causes the sectors to be reset which correspond to a primary card compared with a secondary card while the magnet SR controls the resetting of sectors which correspond to the secondary card.

For the purpose of manifesting which of two compared numbers is higher or lower or equal to the other, each comparing unit has a switching mechanism which is shown diagrammatically in Fig. 1d above the captions "Sequence unit" and "Selector unit." Each switching unit, with reference to Fig. 1d, has two outer common contact strips 412, 413, in the case of the sequence unit, and two split strips 412a, 412b and 413a, 413b in the case of the selector unit. The switching units also each have a series of central connector blocks or contacts 415 which are normally connected in series, when the comparing unit is in an equal condition by means of switch wipers 421 individual to each pair of magnets and pair of sectors 373, 374. These wipers are operated by elements which couple together two corresponding sectors 373, 374 which are plugged by means of their magnets PM1, PM2 or SM1, SM2 to compare two columns in two cards.

With the arrangement of the contacts 415 shown in Fig. 1d, if all the compared columns are equal, the wiper elements 421 line up and connect the contacts 415, as shown in that figure, and permit an impulse to be transmitted from the line wire W1 through the coil of relay R26 by way of some other magnet, and the plug socket PS41, to the line wire W2 through certain contacts, to thereby signify an equal condition. On the other hand, if, for example, a secondary card which is compared with a primary card is lower in sequence than the primary card, one of the wiper elements 421 in the selector unit will swing to the right (Fig. 1d) and will close a circuit to the common strip 413a, 413b which will extend through relay R24 or through any magnet which may be plugged to the plug socket PS39. The opposite sequence condition, a low primary card, will be manifested by a movement of the same wiper element 421 to the left to close a circuit through the relay R22. The relays R22, R23, R24 may be termed the low primary, equal, and low secondary relays, respectively, for the selector unit. The relay R25 may be termed the high second primary card relay; relay 26 the equal relay, and relay R27 the low second primary relay. In Fig. 1c, the magnets PR1, PR2, PR3, and SR are arranged right to left in the same order as the corresponding sides of the comparing units in Fig. 1d and also in the same relative order as the groups of magnets PM1 and PM2, SM2 and SM1 in Fig. 1a.

The restoring magnets are provided with armature knock-offs to compel relatching of the bails at the end of each oscillation. These knock-offs are controlled by a pair of cams 371a, 371b for each comparing unit the timing of which cams is indicated in Fig. 11b. Each comparing unit has a knock-off mechanism associated with each reset magnet or restoring magnet PR1, PR2, PR3, SR, each of which controls a latch 392 diagrammatically shown in Fig. 11b which engages a tooth 394 on the associated bail. When a number is to be erased from the comparing unit, the corresponding one of the magnets PR1, PR2, PR3 and SR is energized and releases its latch 392 to permit the bail controlling the group of sectors to oscillate and the bail relatches automatically at the end of the restoring operation unless a new number is to be inserted in the comparing unit. After a number has been erased, a new number is always received because the bail starts from the latched position, clears out the old number and swings back to the latched position during which time certain of the magnets PM1, PM2, SM1, SM2 control the sectors to set up a new number. After this number has been so set up, it cannot be cleared from the machine except by energizing the corresponding restoring magnet which also will result in the machine taking a new number automatically.

Each comparing unit is provided with three groups of plug sockets designated PS37, PS38, PS39 for the selector unit and PS40, PS41, PS42 for the sequence unit. In Fig. 17 these groups of plug sockets, of which there are four in each group, are disposed in the upper left hand corner of the plugboard and are identified to the operator of the machine by the captions above the rows of four holes identified by the foregoing plug socket designations. These plug sockets may be connected to various functional controls, such as the feed clutch magnets and restoring magnets, by means of suitable plug wires, as will be made clear hereinafter.

In the following description, it will be understood that the split common strips 412a, 412b and 413a, 413b are connected together by means of plugs PW1 (Fig. 17) shown as heavy curved black lines in Fig. 1d, and that the equal relay R23 is connected to the row of contact elements 415 of the selector unit by another plug PW1. Plugged in this fashion, the selector unit becomes identical with the sequence unit and may be used interchangeably with the latter.

In order to render the switching mechanism of the comparing units operative, plug wires or plugs PW2 (see Fig. 17 also) are inserted between the plug sockets PS43, PS44 and PS45, PS46. This renders the relays R22 to R27 selectively responsive to the switching mechanisms of the comparing units. The denominational arrangement of the switching mechanism for the comparing units is indicated in Fig. 1d by the small numbers 1, 2, 3 . . . 14, 15, 16 on the elements 415 of which 1 denotes the lowest or units order and 16 the highest order.

XV. Machine Control Keys

The machine is provided with a group of four manual controlling keys which consists of the start key STK, the stop key SPK, the runout key ROK, and the error reset key ERK. These keys are mounted at a convenient place at the front of the machine on the top surface of the casting 100. Since these keys are of conventional form, their mechanical structure is not shown but they, with their contacts, are shown in the wiring diagram in Figs. 1c and 1d. The start key and the runout key, each when depressed, closes contacts designated STC1, STC2 in the case of the start key and ROC1, ROC2 in the case of the runout key. The stop key SPK opens contacts SPC when depressed. The error stop reset key closes contacts ERC when depressed.

XVI. Stencil Printing Mechanism

Figure 8:
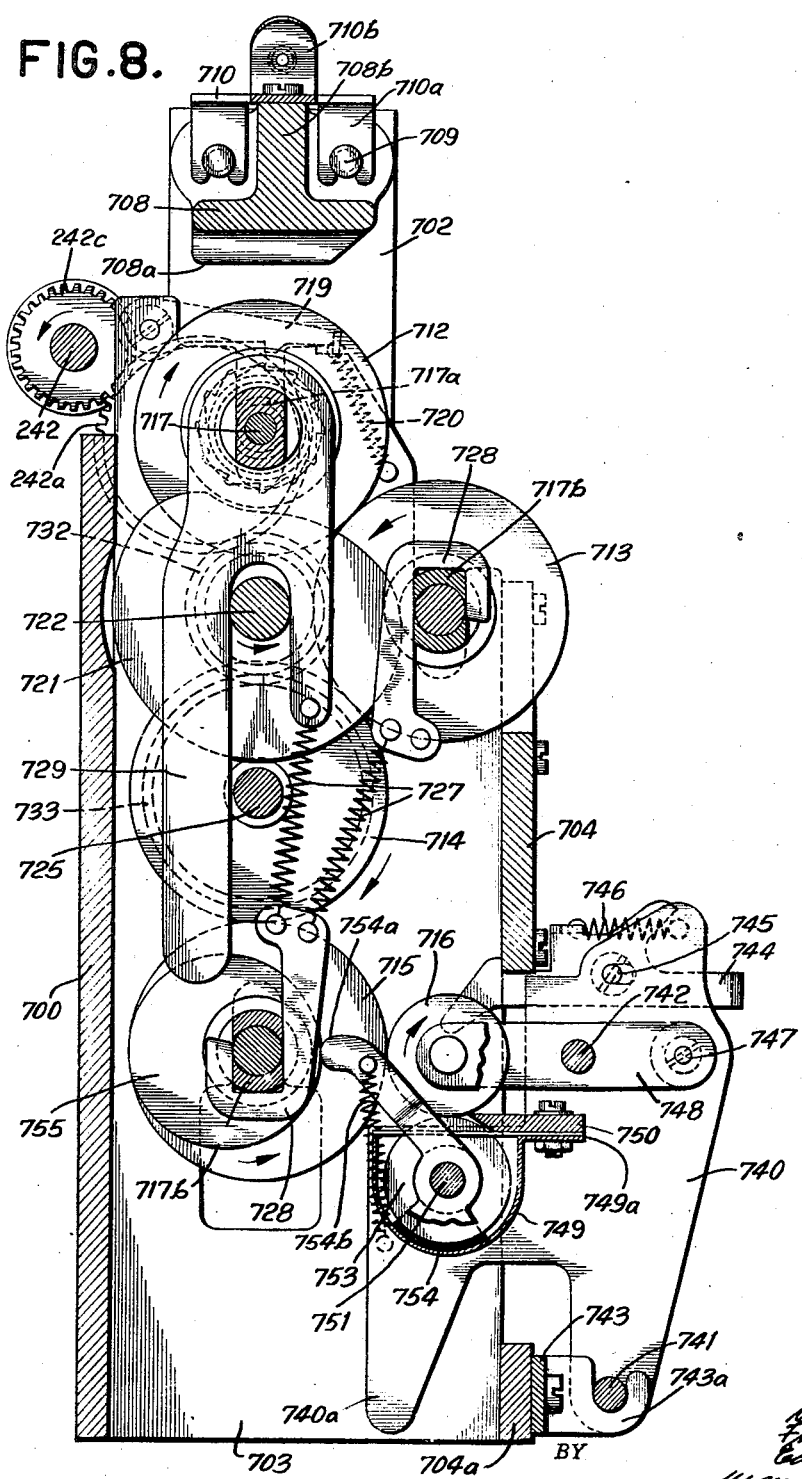
Fig. 8 is a vertical longitudinal section through the printing mechanism.
Figure 9:
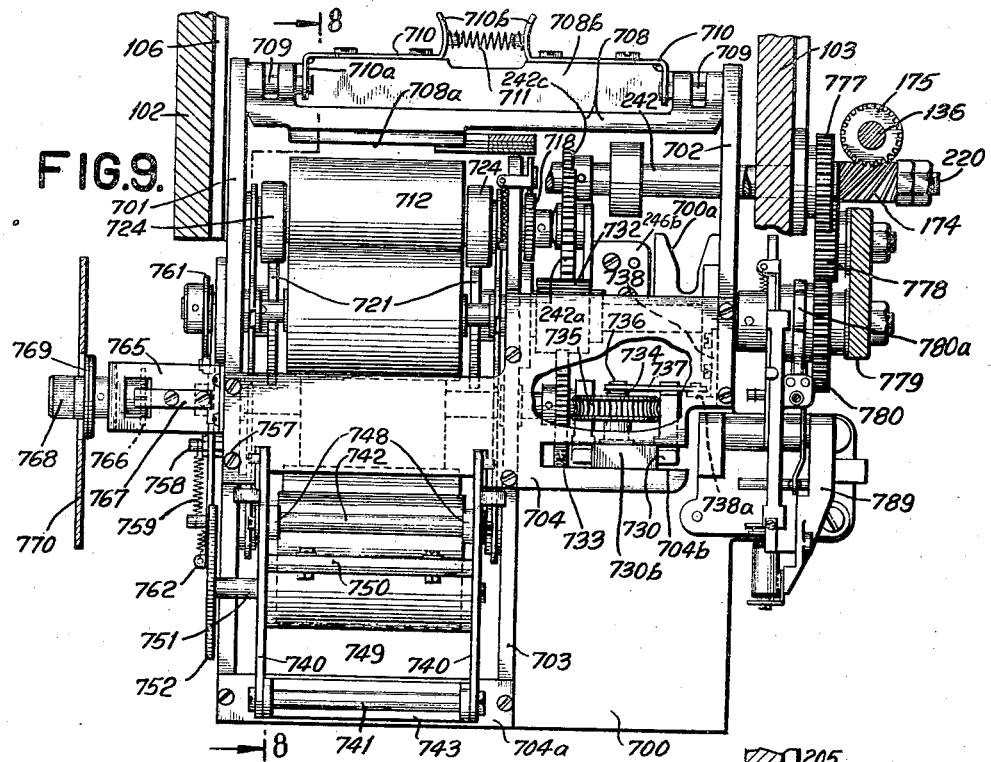
Fig. 9 is a right side elevation of the printing mechanism.

The printing unit consists of a series of ink transfer rollers, an inking roller, an ink reservoir and a printing control clutch mechanism which is located at the printing station and may be attached to and removed from the machine as a unit. This mechanism is supported by a frame which comprises a side plate 700 (Figs. 2, 3b, 4, 8, 9, and 10) to the front and rear vertical edges of which are secured the front plate 701, rear plate 702, and a central plate 703 (see Figs. 9 and 10). The right hand edges of plates 701, 702, 703 are joined by a side plate 704 (Figs. 8 and 9). The rear plate 702 extends only approximately half the height of the plate 701 while the middle plate 703 is a little lower in height than the front plate 701. The front plate 701 and the middle plate 703 are joined at their lower right hand corners by cross bar 704a. A narrow side plate 704 (best shown in Fig. 9) secured to the edges of the plates 701, 702, 703.

This frame is detachably mounted on the right hand face of the central partition plate 104 by means of a bar 705 (Figs. 2 and 3b) secured to a shoulder 704a in plate 704 by means of suitable screws 706. The bar 705 is formed with a ledge overlapping the lower edge of plate 700 between the plates. At the upper end of the plate 700 are formed notches 700a (Figs. 9 and 10) which fit under the heads of studs 707 (Fig. 3b) on the plate 104. By removing the bar 705, the entire printing unit may be allowed to slip downwardly until wider portions of the notches 700a clear the heads of the screws 707. The frame including plate 700 may then be tilted slightly in a counterclockwise direction (Fig. 3) to clear the shoulder 704a and drop downwardly clear of the framework of the machine. The printing unit may be then pulled forwardly out of the machine, clearing the frame 102, it being assumed, of course, that the front part of the machine cabinet is removed for this operation.

The plates 701, 702 extend upwardly above the line of feed of the cards from the secondary hopper, as best shown in Fig. 3b between the left hand ends of plates 102, 103, and support a platen 708 (see Figs. 8 and 9 also) in the form of a casting which has a pad portion 708a having its flat face in the line of feed of the stencil portion of the stencil card. This pad 708a is slightly beveled as shown in Fig. 3b, on the edge nearest the secondary hopper in order to prevent catching the cards from the hoppers in the course of their feed from the eject station.

The platen 708 is removably mounted in the upper ends of the plates 701, 702, the mounting means comprising four bolts 709 (Figs. 3b, 8 and 9) which are slidably mounted in ears formed in the casting 708 and are socketed in suitable holes in the plates 701, 702. The top of casting 708 is formed with a vertical longitudinal rib 708b, on the top edge of which are slidably mounted two bolt actuating slides 710. Each of the slides 710 is formed with two downwardly projecting lugs which are slotted and the ends of the bolts 709 are grooved to receive the slots in the lugs 710a so that each pair of bolts may be withdrawn from the holes in the plates 701, 702 by pressing the slides toward the middle of the platen 708. For this purpose, the slides are formed with finger pieces 710b having pilot studs for a compression spring 711 which urges the slides outwardly (Fig. 9) and projects the bolts 709 into the holes in the plates 701, 702.

As shown in Fig. 3b, a clear space is provided between the feed rollers to enable the platen 708 to be removed while the printing unit is in place in the machine. This must be done before removing the printing unit since blades 306, 307, 308 pass underneath the platen 708. This enables cards which have become buckled or jammed between the feed rollers at the printing station to be removed.

The printing unit includes an inking roller 712 (Figs. 8, 9 and 10) and four ink spreading rollers designated 713 to 716 of which the rollers 712 to 715 are rotatably mounted in the frame plates 701, 703 which the roller 716 is mounted on the removable ink supply unit. The construction of the rollers 712 to 715 is substantially the same.

The impression roller 712 cooperates with the stencil to press ink through the cut-out portions of the stencil forming the letters and is mounted on a shaft 717 (Figs. 3b, 8, 9 and 10) the front end of which is rotatably supported in a bearing 717a consisting of a bushing having diametrically opposite flat sides milled to form a lug which rides in a vertical slot 701a in plate 701. The rear end of the shaft 717 mounted in the same way in slot 703a and is provided with a ratchet 718 with which cooperates dog 719 having a tooth engageable with the teeth of ratchet 718 and actuated in a clockwise direction (Fig. 8) by a spring 720. The slot 703a is open at the top and the dog 719 has a wide lug to which the spring 720 is attached and which lug rests on the top of the plate 703 when the printing roller is in its lowest or retracted position of Fig. 5.

The printing roller is raised into contact with the stencil portion of a stencil card by means of cams 721 (Figs. 8, 9 and 10) which are secured to a drive shaft 722 rotatably mounted in ball bearings 723 in the plates 701, 702, 703. Ball bearings 724 on the shaft 717 have their outer ball races in the planes of the cams 721 so that the ball races act as cam follower rollers for the cams 721. It is evident that when the shaft 722 is rotated one revolution, the roller 712 will be raised into contact with a stencil. Normally the tooth on the dog 719 is clear of the teeth in the ratchet 718 but, when the shaft 722 is rotated, the ratchet 718 will be raised to engage the tooth in the dog 719 to stop rotation of roller 712 which, however, will continue its upward movement until the soft rubber of which the roller is made is flattened against the stencil window. The raised portion 708a of the platen 708 furnishes a backing for both the card to be printed upon and the stencil which previously have been brought into register for this operation.

The rollers 713, 715 are similarly mounted in the plates 701, 703 by means of bushings 717b (Figs. 8 and 10) which ride in slots in the plates 701, 703. The roller 714, however, is mounted on a shaft 725 which is slidably journaled in ball bearings 726 carried by the plates 701, 703. The roller 712 is urged into contact with the roller 713 and the latter and roller 715 are urged into contacts with the roller 714 by means of springs 727 which are anchored to spring hooks 728 and slides 729 shaped to wholly or partly surround the bushing 717a and 717b respectively. The effect of these springs is to press the rollers 712, 713, 715 toward the shaft 725, and the springs nearest the shaft 725, which are anchored to the lowest spring hooks 728 and to slides 729, also hold the ball races of the bearings 724 in engagement with the cams 721.

As will be explained later, shaft 722 is driven by the main shaft 136 through a one-revolution clutch which is controlled by a printing control magnet. This magnet may be placed under control of the comparing units to cause the printing roller 712 to rise and ink through the stencil only when an equality comparison is detected between the stencil and the punched card on which the stencil is to print.

In order to spread the ink more evenly over the rollers, the roller 714 is oscillated axially by a mechanism driven by the shaft 725. For this purpose, the shaft 725 extends into the space between the plates 702, 703 (Figs. 9 and 10) and has freely rotatably mounted thereon a member 730 in the form of a casting having ears 730a in which a worm 731 is journaled, this worm being fixed to the reduced inner end of the shaft 725. The casting 730 is formed with a rectangular projection or lug 730b which is freely slidable in a horizontal slot 740b in the plate 704 so that when the shaft 725 is oscillated axially, the casting 730 may follow its movement but is prevented from rotating about the axis of the shaft 725 although such shaft can turn freely.

Loosely mounted on the shaft 722 by means of a shouldered bushing 722a is a long pinion 732, the larger end of the bushing being pinned to the shaft with the narrow end abutting against the inner ball race of the right hand ball bearing 723 (Fig. 10) whereby the pinion rotates between the ball race and the large end of the bushing. The long pinion 732 meshes with a gear 242a rotatably mounted on a bracket 242b secured to the back plate 700. The gear 242a in turn meshes with a pinion 242c secured to the right hand feed roller 242 (Fig. 3b). The long pinion 732 (Figs. 9 and 10) meshes with a gear 733 secured to the shaft 725 between the casting 730 and the central plate 703. Pivoted on a stud 734 (Fig. 9) on the casting 730 is a worm wheel 735 which meshes with the worm 731 and has a crank pin 736 connected by a link 737 to a pin 738a carried by a bracket 738 secured to the lower edge of the plate 702. It will be remembered that the feed roller 242 is driven by the shaft 136 through the spiral gears 174, 175, as in the case of the other feed rollers, and, since shaft 136 turns continually the train of gears comprising pinion 242c, gear 242a, pinion 732 and gear 733 will continually drive the inking rollers through the shaft 725. Also when the shaft 725 rotates it drives the worm wheel 735 through the train of gearing described above, thereby alternately imparting thrust and tension to the link 737. This causes the casting 730 and hence the shaft 725 and roller 714 to move axially at a slow rate, thus spreading the ink evenly over the rollers 713, 715.

The removable ink supply device includes a framework consisting of side frames 740 (Figs. 8 and 9) joined together by two rods 741, 742. The rod 741 rests in hook-shaped ears 743a formed in the ends of a bracket 743 secured to the right hand face (Fig. 8) of the bar 704a. The upper ends of the side plates 740 are provided with catches 744 (see Fig. 4 also) pivoted by studs 745 which pass through slots in the catches and are hooked over the lower edge of the plate 704 adjacent the plates 701, 703. The catches 744 are actuated in a clockwise direction by springs 746. Due to the slots in the catches 744, the springs 746 also tend to rock the frames 740 counterclockwise (Fig. 8).

Between plates 740 and secured thereto by studs 747 are links 748 (Figs. 8 and 9) which rotatably support the inking roller 716. The tie rod 742 passes through holes in the links 748 (Fig. 8) so that such links are supported horizontally. Secured between the plates 740 is an ink reservoir or pot 749 which has secured thereto a cover plate 749a and a doctor blade 750. A shaft 751 is rotatably supported in the plates 740 and extends forwardly beyond the plate 701, which is cut away for this purpose, and has a ratchet 752 (Figs. 2 and 9) which forms part of the means for rotating the shaft 751. Secured to the shaft 751 (Fig. 8) are a plurality of rollers or disks 753 which do not actually touch the roller 716. When shaft 751 is rotated, ink will be carried on the peripheries of the disks up to the rollers 716. The spacing between the peripheries of the roller 716 and the rollers 753 is less than the thickness of the film of ink which the rollers 753 transport with the result that bands of ink are applied to the rollers 716.

Since the viscosity of the ink varies with temperature the beveled side of the doctor blade 750 is adjusted to not quite touch the rollers 753 and maintain the film of ink thereon of constant thickness and prevent over-charging roller 716 with ink.

Loosely pivoted on the shaft 751 is an ink agitator 754 (Fig. 8) shaped somewhat like a ball which consists of a cylindrical plate, the inside surface of which is concentric with the rollers 753 but does not quite touch such rollers and which also clears the inside cylindrical surface of the ink reservoir 749. This agitator is formed with parallel slots extending longitudinally of the cylindrical plate and has two arms 154a cooperating with cams 755 (Fig. 10) on the shaft on which the roller 715 is mounted, whereby the agitator 754 will be given one oscillation for each complete revolution of the roller 715. Springs 754b attached to the arms 754a hold the arms 754a in contact with cams 755.

Coverplate 149a is slotted to accommodate rollers 753 and prevents dust from settling in the ink reservoir. When it is desired to remove the ink reservoir, it is merely necessary to lift up on the right hand ends (Fig. 8) of the latches 744 and swing the unit clockwise (Fig. 5) until it has been moved far enough to enable the frame 740 to be lifted off the lugs 743a. The side plates 740 are shaped at 740a with legs so that when the ink supply unit is removed, it may be stood in an upright position to replenish the reservoir 749 with ink. Pins 740b (Figs. 4 and 8) limit movement of latches 744.

The ratchet wheel 752 is rotated by mechanism shown in Figs. 2, 9, 10 and 12, mounted on the front face of the plate 701 which mechanism includes an ink regulating control. This mechanism includes a slide 757, the upper end of which is slotted to embrace the shafts 722, 725, being guided by shaft 722, while a slot in the middle of the slide embraces a hexagonal stud 758 having an annular groove therein for further guiding said slide. A spring 759 anchored to a stud carried by the slide and to the stud 758 urges the slide 757 upwardly. The upper end of the slide carries a roller 760 which cooperates with a cam 761 on the shaft 722. Thus, rotation of the shaft causes a vertical reciprocatory movement of the slide 757. At its lower end the slide 757 (Fig. 2) carries a spring actuated pawl 762 engaging the ratchet 751.

For the purpose of adjusting the stroke of the slide 757 to regulate the flow of ink, there is provided a control mechanism which includes a cam 763 (Figs. 2 and 12) mounted on a short shaft 764 journaled in a bracket 765 attached to the plate 701 and in a hole in such plate. Also secured to the shaft 764 is an indexing disk 766 partly projecting through a hole in bracket 765 and having notches cooperating with a rib formed in the free end of a leaf spring 767 (see Fig. 9 also) secured to the side of the bracket. Secured to the forward end of the shaft 764 is a knurled knob 768 to which is attached an indicator disk 769. This disk is of approximately the same diameter as a suitable hole in the cabinet 770 which encloses the machine and is provided with a series of numbers cooperating with a suitable index mark on the cabinet 770 adjacent the hole therein so that by turning the knob 768 any of the numbers on the disk 769 may be brought into registry with the index mark to determining the rate of supply of the ink. Arrows pointing in opposite directions are also engraved on the disk and the words "Heavier" and "Lighter" adjacent the arrows indicate in which direction the knob must be turned to increase or decrease the flow of ink. The slide 757 is provided with a projection 757a (Fig. 12) in the plane of the cam 763 and, by rotating the cam, it is possible to vary the extent to which the slide 757 returns with each rotation of the cam 761. The cam 763 is in the form of an eccentric and when in the position of Fig. 12 allows the slide 757 to travel only about half of its maximum stroke.

Clutch mechanism of conventional form is provided which couples the shaft 722 to the main drive shaft 136 and is mounted on the plate 700 near the rear edge thereof, directly beneath that part of the back plate 103 supported by the plate 104. Secured to the feed roll shaft 220 (Figs. 4 and 9) is a gear 777 which meshes with an idler gear 778 on a stud carried by a plate 779 attached to the main framework of the machine by studs 779a. The idler 778 meshes with a gear 780 rotatably mounted on a stud 781 (see Fig. 10 also) carried by the plate 779 in axial alignment with the shaft 722. The hub of the gear 780 is provided with a notch engageable by a lug on a clutch dog 781 pivotally mounted on a two-arm lever 782 secured to the end of shaft 722. A spring 783 attached to the lever 782 on the opposite side of the shaft 722 to the pivot for the dog 781 tends to urge the dog clockwise (Fig. 4) into engagement with notch in the hub of the gear 780 which is, of course, turning continually since it is driven by shaft 136. Also mounted on the same pivot as the dog 781 is a back lash dog 784 actuated by a spring 785 anchored to lever 780. Insofar as the clutch itself is concerned, it is constructed very similar to the ones which control the feeding of the primary and secondary cards shown at the left in Fig. 4.

Normally, the dogs 781, 784 are prevented from engaging the slot in the hub of the gear 780 by a clutch latch lever 786 (Figs. 4 and 9) pivoted on a short shaft 787 carried by a frame 789 secured to the plate 702. The clutch latch lever 786 is normally urged in a counterclockwise direction (Fig. 4) by spring action. The lever 786 is formed with a latching projection 786a which extends in front of a lug 782a formed in the end of the lever and also is wide enough to engage a somewhat similarly shaped lug formed in the tail of the clutch dog 781 so as to hold the dog 781 in the position of Fig. 4 out of cooperation with the notch in the hub of gear 778. This prevents the shaft 722 from turning and also prevents the clutch dog 781 from engaging the notch to couple gear 778 and shaft 722 together.

Also pivoted on shaft 787 (Figs. 4 and 9) is a rebound dog 789 having a lug 789a extending over the left edge (Fig. 4) of the upper end of the lever 786. A spring 790 anchored to the dog 789 and to the frame 788 urges the dog 789 in a clockwise direction and, through the lug 789a, also tends to urge the lever 785 in the same direction. Pivoted on the shaft 787 is a cam follower lever 791 having a roller 791a engaging a cam 780a formed in the hub of the gear 780. This cam follower lever is actuated by a spring 792 anchored to a pin carried by the frame 788, which spring 792 is superior in tension to spring 790 and tends to urge the lever 791 in a counterclockwise direction (Fig. 4) to engage the roller 791a with the cam formed in the hub of gear 778. The lever 791 is also connected by a spring 793 to a plate 786b secured to the right hand edge of the upper end of the lever 786 and said plate is also provided with a stop screw 794 which engages a lug 791b formed in the lever 791. Thus, the levers 786, 791 tend to move counterclockwise as a unit under the influence of the spring 792 and the cam formed in the hub of the gear 778. Mounted on the frame 788 is a clutch release magnet designated PCM which may be termed the printing clutch magnet since it determines whether or not a printing operation is to take place.

Pivotally mounted at 794 (Fig. 4) is a latch plate 795 having an armature 795a cooperating with the poles of the print control magnet PCM. This plate is urged in a counterclockwise direction by a spring 796 anchored to the same pin as the spring 792. The spring 796 holds the latch plate 795 against a stop lug 797a formed in the frame 797 to which the magnet PCM is attached. The upper end of the latch plate 795 normally lies underneath the end of the latch lever 786 which is notched just below the end of the plate 795 for a purpose which will be made clear hereinafter. Normally, since spring 792 is stronger than spring 796, the former holds the lower end of lever 786 (Fig. 4) adjacent the notch against the end of plate 795 which thus acts as a latch for lever 786.

Once for each revolution of the shaft 136, the cam 780a formed in the hub of gear 778 rocks the lever 791 in a clockwise direction (Fig. 4), thereby tensioning spring 793 and relieving lever 786 of the tension of spring 792. This causes lever 786 to move slightly away from the end of the latch plate 795. If, at this point, the magnet PCM is energized, plate 795 will be actuated and the spring 792 will be permitted to rock the lever 786 in a counterclockwise direction (Fig. 4) when the high point of the cam has moved away from the roller 791a, thereby releasing projection 786a from cooperation with the lug formed in the clutch dog 781. This enables the tooth formed in the clutch dog to enter the notch formed in the hub of the gear 778 whereby the shaft 722 will be driven for at least one revolution. At the end of one revolution, the lug formed in the tail of the clutch dog 781 will again be caught by the projection 786a which will rock the dog out of cooperative relation with the notch in the hub of gear 778. With this arrangement, a very light magnet may be used to release the clutch as it is not called upon to overcome any great force. The end of the latch lever 786 is notched adjacent the end of latch plate 795 to allow the lever 786 to rock clockwise a limited extent when the magnet PCM is energized and the cam 780a is in a favorable position. Pivoted at 798 is a knock-off lever 799 having two arms, one of which cooperates with the side of the latch plate 795 while the other carries an adjustable stop screw 798 engaging the end of the lever 796. The cam 780a on the gears 780 is so located that, just before the end of the revolution of shaft 722, when the lever 782 is about to be relatched, the lever 791 will be rocked clockwise in Fig. 4 to relieve lever 786 from the tension spring 793. The rebound dog 789 yields, tensioning spring 793, as the cam 780a passes into engagement with the lug 786a and snaps behind the latter to prevent rebound of the shaft 722 when the cam 780a is arrested by the lug 786a.

XVII. THE RECORD CARDS

In Fig. 16b is shown a card with control media comprising a typical perforated accounting and statistical card such as is now commonly used in the well known Hollerith system of accounting. Data is recorded in the right hand portion of this card by control media in the form of rectangular perforations disposed in any one of twelve index-point positions, in accordance with custom. This card is the type known as the 80 column card because there is room for eighty columns of perforations. In order to illustrate the utility of the machine disclosed herein, the perforated record shown in Fig. 16b takes the form of a Hollerith bank check in which the name and address of the payee is to be printed in the space provided on the left hand half of the card, by means of the stencil card which is shown in Fig. 16a. Checks of this form have been in use for some time commercially, particularly for payrolls, and are now well known in the art. Usually the card check is perforated only in the right hand half with such data as the date, check number, book number, and, in the case of payroll checks, the man or employee number. When the checks are used in general accounting, the account number for which it is a payment or to which the payment is to be posted also may appear in place of the man number. Usually these checks are perforated on a key punch or similar card perforating machine and the name and address and amount are typed thereon, or the amount may be placed thereon by a suitable check protecting machine.

In the present case, the machine is designed to print the name and address from a stencil card which takes the form shown is Fig. 16a. Conveniently, the stencil may take the form of two layers of paper having matching stencil windows, closed by means of a suitable strip of stencil paper, which may be typed upon in the usual way, to write the name and address or other desired data which is to be printed upon the card check shown in Fig. 16b. The right hand half of the stencil also contains control media in the form of perforations representing some control number which has a definite significance in identifying the stencil. In the present case, the control number consists of the man number, while in other cases the account number of the person or firm, whose name and address is to be printed, may be used. While it is not absolutely essential, the man number or account number may be perforated in the stencil card in the same columns as in the check shown in Fig. 16b.

When the stencil shown in Fig. 16a, and the perforated card check (Fig. 16b) are superposed, the name and address typed on the stencil will register with the space for the name and address on the check. Since in the operation of perforated record controlled machines, like the one disclosed herein, it is usual to feed the cards face downwardly and the "9" index-point positions first, the stencil card of Fig. 16a will be underneath the card of Fig. 16b in passing through the printing station.

While specific forms of perforated record cards have been shown in the present case for the purpose of illustration, it will be understood that the form of the cards, their dimensions, the location, of the stencil windows, and the date which is to be printed by means of the stencil, may be varied to suit the needs of the accounting or statistical system in which the cards are to be employed. In some cases it may not be necessary to place perforations in the cards to be printed upon, as for example, the machines may be used for addressing simple post cards, in which case it might be undesirable or unnecessary to have holes in the card. For example, the machine might be used to print notices of premiums due on life insurance policies where it is the custom of the insurance company to remind policy holders a predetermined period before their quarterly, semi-annual, or annual premiums are due. For this purpose, where notices are to be sent only to certain policy holders, as for example those whose premiums are due quarterly in a certain month, this data may be perforated in the stencil and the stencil selected by means of a multi-column selection operation in a manner to be made clear hereinafter.

XVIII. OPERATION OF THE MACHINE

Section 1.—General operating conditions

In the present section will be described the operation of the machine under various general conditions, such as starting conditions and the stopping conditions, as when one or both of the hoppers become exhausted of cards or the card lever contacts open. In the present section, the operation of the comparing units in selectively controlling feeding of the cards, the distribution of the cards to the various pockets, and printing from stencils will not be treated but will be explained in subsequent sections dealing with specific kinds of operation that the machine can perform. The present section also will describe generally the plugging of the brushes to the comparing units and other things which are more or less basic to all operations.

In the sections dealing with the operation of the machine, a detailed explanation of the plugging necessary for each operation will not be given in order to reduce the size of the specification as much as possible. Instead, the plugging will be indicated by means of the plugboard charts which are shown in Figs. 17a, 17b, etc.

In order to reduce as much as possible repetitious tracing of circuits, the following should be borne in mind in reading the descriptions of operations.

It will be noted by reference to Fig. 1c that once the machine is started in operation and the start relay contacts R17B have closed, the plug socket PS24 will be pulsed or made "hot" once per cycle and therefore any circuit, magnet, or relay which happens to be plugged to the plug socket PS24 will likewise receive an impulse of current. In the majority of cases, when a plug wire is inserted in plug socket PS24, a magnet such as the primary feed magnet will be energized every cycle of the machine. For example, with reference to Fig. 17a which shows the plugging for a very simple sequence checking operation, the plug socket PS24 is plugged directly to plug socket PS23 whereby the primary feed magnet PFM will be energized every cycle of the machine provided, of course, the machine is feeding cards and the relay R17B is maintained energized.

With reference to Fig. 1d, it will be remembered whenever plug wires or double plugs are inserted between one or both of the plug sockets PS43, PS45 and the plug sockets PS44, PS46, pulses of current will be delivered to one or both of the comparing units and must travel through one of the relays R22 to R27, depending upon the condition of the comparing unit which in turn will be dependent upon the numerical relationships between the records compared or the numbers which may be retained in the comparing units. When the numbers are equal, one or the other of relays R23, R26 will be energized. If the relationship of the numbers is such that a secondary card number or the second in order of feed of two compared primary cards is the lower in value, relays R24 or R27, respectively, will be energized. Similarly relays R22 and R25 will be energized when the conditions are the reverse. When a pulse of current is delivered to any of the relays R22 to R27 under one of the three conditions of numerical relationship, the corresponding one of the plug sockets PS37 to PS42 will be pulsed. By inserting plug wires in any of the plug sockets PS37 to PS42 and in any of the plug sockets PS18, PS22, PS23, PS28, PS29; PS33 to PS36, inclusive, PS50, PS51 to PS53, PS57 and PS60, the various feed magnets, restoring magnets, the eject magnet, the reject magnets, selector relays, and the error stop circuit may be energized as desired. This will greatly facilitate an understanding of the operation of the machine with reference to the plug board diagrams and will save much description and repetitious tracing of circuits. For example, with reference to Fig. 17a, bearing in mind that plug socket PS42 is made live each time the sequence unit moves to the low second primary condition, the error stop relays HSR4 and R35P will be energized and it is unnecessary to retract these circuits in detail.

The group of plug sockets designated PS15, PS16, PS17, PS25, PS26, PS27 and PS30, PS31, PS32 enclosed by the dotted rectangle in Fig. 1c and in a box entitled "Basic Setup" in Figs. 17a and up, are known as the basic setup switches and are provided as a convenience to simplify plugging when certain basic card feeding operations are performed which are very common and will be frequently used. In order to plug these switches, double pronged plugs will be used as shown in Fig. 11a which make it possible to interconnect PS16 and PS17, PS26 and PS27, PS31 and PS32 by the simple insertion of the two pronged plugs. The plug board is laid out so that frequent use of these double pronged plugs may be made to avoid obscuring the plug board by dangling wires. These two pronged plugs are used wherever it is necessary to plug between two adjacent plug sockets as shown at the right in Fig. 17a to connect the three hole plug socket PS22 to plug sockets PS35, PS36 to render both comparing units operative.

The first case treated will be the starting of the machine and its stoppage when only the primary side of the machine is to be used for a relatively simple operation which does not require the use of the comparing units. As a basis for commencing the description, it will be assumed that current has been turned on the line wires W1, W2, and the motor has been started in operation, causing contacts CB1 to CB4 and CR1 to CR8 to close in the timed sequence shown in Fig. 11a.

As soon as the current is turned on the line wires W1, W2, the relays R1 to R4 become energized, since the primary and secondary hopper contacts PHC and SHC remain closed when the hoppers are empty. However, as soon as the primary cards are placed in the primary hopper PH, the contacts PHC are thereby opened and deenergize the relays R1, R2 and their contacts remain as in Fig. 1c. On the other hand, the contacts SHC remain closed, since the secondary side of the machine is not being used; consequently, the contacts associated with the relay R3, R4 will take positions the reverse of those shown in Fig. 1c.

The start key STK is now depressed thereby closing the start key contacts STC1, STC2 (Fig. 1c). This initially establishes a circuit as follows: line wire W1, the coil R17P of the start relay, and contacts R12B, R1A, R21B, STC1, SPC, CR7, to line wire W2. At this point it is desired to mention that the start relay, besides its coil R17P, has a second coil designated R17H and both of these coils operate the contacts designated R17A, R17B, R17C. The contacts R17A establish a holding circuit for the coil R17H through contacts CR6 which maintain the circuit for the start relay into the next card cycle. Contacts R17B close and cause the energization of the primary feed magnet PFM by a circuit as follows: line wire W1, magnet PFM, and contacts R2A, R12E, R2B, R1D, HSR4A, R58A, CR1, R17B, to line wire W2.

The energization of magnet PFM causes the primary feed mechanism to start its operation thereby advancing the first card from the primary hopper PH. The first primary card is advanced to a position between the feed rollers 184, 187 during this first card feeding cycle of the machine. However, the card will not advance far enough to close the card lever contacts PCL1, but must continue for another cycle to obtain this effect. Contacts PCL close but have no effect since contact R2A remains closed. Unless the start key ST is held down for another cycle, the feeding of primary cards will stop as the starting relay R17H is held at this time only through contacts CR6 which open near the end of the feed cycle before contacts CR1 can close to impart another impulse to the primary feed magnet PFM.

With the start key still held depressed, the primary feed magnet PFM will receive a second impulse during the following cycle in exactly the same way as before, causing the second primary card to be advanced from the primary hopper and the first primary card to be advanced past brushes PB1, thereby closing the primary card lever contacts PCL1. The contacts PCL2, however, still remain open as the first card stops just under the second pair of feed rollers 184, 187 from the right in Fig. 36. The closure of the contacts PCL1 during the second cycle causes the relay R7 (Fig. 1a) to be energized over a circuit extending from line wire W1 to the coil of relay R7 and contacts PCL1 and CR5, to line wire W2. The contacts R7A (Fig. 1b) close a circuit through the coils of relays R14, R15 as follows: line wire W1, the coils of said relays in parallel, contacts 7A, and commutator PC2, to line wire W2. Contacts R7B close and connect the contact roller PCR1 to the circuit breakers CB1 to CB4 and contacts CR1 to condition the primary brushes PB1 for operation. The second primary card is also advanced during the second cycle to a position between the first pair of feed rollers 184, 187.

Closure of both card lever contacts PCL1, PCL2 is necessary to maintain the feeding of cards, since contacts R17H must be kept closed, even when very simple operations, not requiring the use of the comparing units, are being performed. Start relay coil R17H must be kept energized by means of contacts R17A, R17C alternately, that is, when the circuit through contacts R17A is open, contacts R17C must hold relay R17H. Since relay R13 is still deenergized and contacts R3B are being held open due to lack of secondary cards in hopper SH, a holding circuit for relay R17H can not be established through contacts R17C. Consequently the start key STK must be held down long enough to initiate a third feeding cycle. During the early part of the card feeding third cycle, the card lever contacts PCL2 (Fig. 1a) are closed by the first card, thereby energizing relay R6 by a circuit similar to the one for relay R7. Relay R6 closes its contacts R6A and connects the relays R12, R13 in parallel with relays R14, R15. Contacts R6C close and condition the primary brushes PB2 for sensing cards during the third cycle, the card lever contacts PCL2 closing just before the first primary card starts beneath the brushes PB2. Thus, during this third cycle, card brush circuits, may be established through any of the controls, such as the comparing units or X selectors, which may be plugged to any of the brushes as required by operations subsequently to be described. Since no secondary cards have been fed and the secondary card levers remain inactive, the contacts R5A prevent any circuits from being established through the brushes SB. Although contacts R4B are now closed, commutator SC1 is at rest and no circuits can be established therethrough.

The continuance of feeding of primary cards after the third cycle will depend largely upon the type of operation which the machine is to machine is to perform. The energization of relay R12 causes its contacts R12E (Fig. 1c) to open and R12A to close, thereby interrupting the circuit which extends through these contacts to energize the primary feed magnet PFM during the initial cycles of the machine. It is necessary to have some additional means for energizing the primary feed magnet PFM repeatedly or selectively as required if the feeding of primary cards is to continue. In a very simple case where the operation to be performed merely requires continuous feeding of primary cards, that is, stencils, it is possible to connect the plug socket PS23 to the plug socket PS24 by means of a plug wire whereby the magnet PFM is energized every cycle, provided relay R17H remains energized. In such a simple case it would be also necessary to cause the energization of the eject magnet EM, as the feeding of cards past the printing station is effected by the rollers 218, 219, which rotate only when the eject clutch magnet EM is energized. For this purpose the magnet EM could be rendered operative by a double plug between plug sockets PS18 and PS23. As has been explained hereinbefore, relays HSR3, HSR5 also perform this function. The energization of relay R12 when the card lever contacts PCL2 close causes contacts R12C to close, whereby both magnets EM and PFM may receive impulses over parallel circuits through the contacts R17B, CR1, R58A, HSR4A, the double plug and plug wire, contacts R12C, the coil of magnet EM; also through contacts R14A and magnet PFM. As will be seen later herein, the control of the magnets EM, PFM, and others may also be vested in the comparing units in different ways; in the X selectors R10, R11; or in the selectors R28 to R32.

After the primary lever contacts PCL2 have closed, the feeding of cards is maintained by a test circuit closed once per cycle which causes the feeding of cards to stop in the event that the primary hopper becomes exhausted, when for some reason a primary card fails to feed causing the card lever contacts to remain open, when the full pocket contacts FPC open, or stop key SPK is depressed. The card lever contacts open for a short period of time during each cycle in consequence of the gap between the cards, no means being provided to maintain the card lever relays R6, R7 in energized condition while the gaps in the cards are passing the brushes. This is true of the secondary card lever contacts and the relay R5 which has the same function as the relays R6, R7.

The test circuit extends through the second coil of the start relay designated R17H and the contacts R17C of this relay. As soon as the cards begin to pass the primary brushes PB2, the contacts R13D close. Since contacts R15B are now closed in consequence of the second primary card passing the brushes PB1, a holding circuit will be established as follows: from line wire WI, coil RI7H, and contacts RI7C, FPC, R3E, RIB, R9A, RIE, RI5B, RI3D, R35B, SPC, CR7, to line wire W2. This circuit is opened momentarily once each cycle by the contacts CR7, and also by the contacts RI3D, RI5B which open when the gap between primary cards passes the levers for contacts PCLI, PCL2; however, during this period, contacts CR6 are closed and maintain the circuit for relay coil RI7H through the contacts RI7A. As long as the primary hopper contains cards and the cards continue to feed, the relay coil RI7H will remain continuously energized. Consequently the closed contacts RI7B enable the contacts CRI to repeatedly energize the primary feed magnet PFM and the eject magnet EM.

It is desirable that the comparing units be clear of all numbers when the machine is started in order that errors may not occur due to the accidental retention of a number from a previous run of the machine for some operation involving the use of the comparing units. For this purpose means is provided to always cause the comparing units to be automatically cleared or reset during the first cycle necessary to feed the first primary card and/or the first secondary card to a position in readiness to pass the first set of primary brushes PBI and/or brushes SB. The restoring magnets SR. PRI. PR2. PR3 are provided with plug sockets designated PS23 to PS36 which enable one or more of these magnets to be plugged to various functional controls which will be explained more clearly hereinafter. Ordinarily these magnets will be selectively controlled by the comparing units and will be energized only under certain conditions of equality or inequality of numbers compared, according to the function or operation to be performed. As a general rule, the secondary restoring magnet SR will be connected in parallel with the secondary feed magnet SFM by inserting a double plug between the plug sockets PS28 and PS33. The remaining three restoring magnets PRI, PR2, PR3 will similarly be connected in parallel with primary feed magnet PFM by plugs inserted between the triple plug socket PS22 and the plug sockets PS34. PS35, PS36. Under these conditions the secondary restoring magnet SR will always be energized when the secondary feed magnet is energized, and likewise the three primary restoring magnets PRI, PR2, PR3 will always be energized when the primary feed magnet is energized.

When the starting key STK is depressed, the relays RI8, RI9 are energized in parallel with the starting relay coil RI7p through contacts RI4D, and relay RI8 closes its contacts RI8B to place the coil RI7H in parallel with relays RI7P, RI8, RI9. The contacts RI9A are arranged to place all of the restoring magnets SR, PRI, PR2 PR3 in parallel, whereby all of these magnets will be energized with the first energization of magnet PFM. It is clear that both of the comparing units will be automatically restored before cards can pass any of the brushes. This will take place notwithstanding how the magnets just mentioned may be plugged to any of the functional controls. For instance, if only the sequence unit is to be used, the selector unit will also be automatically cleared and placed in equal condition immediately to avoid any risk of back circuits which might occur due to this unit being left with a number on one or both sides, resulting in such units standing in either of the conditions of inequality or equality which by selective control of various relays might accidently cause back circuits or incorrect operation. As soon as cards pass the brushes PBI or SB, the relays RI4, and/or R8 will be energized and contacts RI4D and/or R8B open to deenergize the relays RI8, RI9. This permits the contacts RI9A to open and restores magnets SR, PRI, PR2, PR3 to selective control by the comparing units or other controls. Contacts RI8B also open and prevent the relays RI8, RI9 from receiving current in parallel with coil RI7H.

As soon as the last card leaves the primary hopper PH, the contacts PHC will close, thereby energizing the relays RI, R2. Contacts Ric close and contacts RIE open but contacts RIC are ineffective since contacts R3B are kept open when the secondary hopper SH is empty. Consequently, when contacts CR6 open and contacts CR7 close. the latter will be unable to maintain the holding circuit for coil RI7H through contacts RI7C and the start relay RI7P—RI7H will be deenergized, opening contacts RI7B to prevent an impulse from being given to the magnet PFM. As a result, the feeding of primary cards will stop at 236° (Fig. 10b) with the leading edge of the last primary card a short distance to the right of the brushes PBI. However, the primary card lever circuits controlled by relays R6, R7 will not be disturbed since, at the time the card feed stops the commutator PC2 will maintain the relays RI2 to RI5 in energized condition.

The energization of relays RI R? causes contacts RIA to open and has the effect of preventing restarting of the machine by means of the start key STK. This is partly due to the fact that there are no cards in the secondary hopper whereby relay R3 as well as relay RI is energized interrupting the circuit including the start key contacts STCI which were initially used to start the machine in operation. The test circuit is also opened at contacts RIB and R3C. It is still possible however. to start the machine by means of the runout key ROK, since the contacts ROCI controlled by this key enable relay RI7H to be energized directly instead of through contacts RI8B. This enables the operator to cause the last cards to be run into the pockets.

If it is desired to continue the operation of the machine, as would be the case where the hopper became exhausted of stencils due to inattentiveness of the operator or his enforced absence from the machine. more cards may be placed in the primary hopper thereby reclosing the primary hopper contacts PHC and reenergizing the relays RI, R2. This causes contacts RIA to reclose and enables restarting of the machine by means of the start key ST by closing contacts STC2 to close the test circuit through contacts RIE. However, it is merely necessary to operate the start key STK once in this case since the machine stopped with primary cards in position to pass the brushes PBI, PB2 and contacts R3E, RIB, R9A, RI5B, RI3D remained closed when the machine stopped.

On the other hand, if it is not desired to continue the operation, the runout key is depressed and held depressed until the last primary card has reached the feed rollers 218, 219 after which the last card will be conveyed to the pocket for which it is destined. It is necessary to hold the runout key depressed as otherwise the opening of the contacts RI5B in consequence of the passage of the last primary card pass the brushes PB1 would stop the machine with the last primary card between brushes PB1, PB2.

The circuits controlled by the hopper contacts PHC, SHC and the card lever contacts are so arranged that the machine can not be started with both hoppers empty but may be operated with one or the other of the hoppers PH, SH empty or with cards in both. Consequently the start circuits are so arranged that either of the primary or secondary feed mechanisms or both may be used and when both are used, the feeding of cards will be selectively controlled in various ways, depending upon the type of operation to be performed.

It will now be assumed that it is desired to use only the secondary side of the machine and that the primary feed mechanism is not to be used. There are definite advantages in using the secondary side of the machine alone. One reason is that the secondary cards may be distributed to any one of the three pockets designated SRJ, SB, MS, respectively, whereas the primary cards can only be distributed to pockets PRJ and MS.

When cards are placed in the secondary hopper SH, relays R3, R4 become deenergized while the relays R1, R2 remain energized. This causes the primary hopper relays R1, R2 to reverse the condition of the contacts shown in Fig. 1c. When the start key is depressed, the relay R17P is energized in much the same way as before, except that the circuit extends through the contacts R3A, R8B instead of through contacts R1A, R12B, otherwise the machine starts in the same fashion. A single secondary card will be fed from the hopper SH and will stop with its leading edge a short distance to the right of the contact roller SCR (Fig. 3b) and to continue the feeding of secondary cards, it is necessary to hold the start key down initially long enough to start a second feeding cycle. The circuit for the secondary feed magnet SFM during the first feeding cycle is established by the closure of contacts CR1. For the purpose of conditioning the machine to feed secondary cards only, in the case of a very simple operation involving continuous feeding, a plug wire may be inserted between plug sockets PS24 and 29, whereby the secondary feed magnet will be energized by a circuit as follows: line wire W1, magnet SFM, contacts R58C, R4A, the plug wire, contacts HSR4A, R58A, CR1 and R17B, to line wire W2. This circuit must be established twice before the first secondary card feeds far enough to close the secondary card lever contacts SCL1. During the first feeding cycle, the card lever contacts SCL close but have no special effect since they are in parallel with contacts R4A which are closed at this time. The closure of contacts SCL1 during the second cycle enables the machine to continue to feed secondary cards until the hopper SH becomes exhausted. In this case, the test circuit for maintaining the relay R17H in energized condition extends through contacts R3C, R9E, R1C, R3B and R13D, all of which remain closed as long as there are cards in the secondary hopper and in the course of feed pass the brushes SB. It will be noted that one less cycle is required to make the test circuit effective to hold the start relay R17H.

When the secondary hopper becomes empty, the secondary hopper contacts SHC close and energize relays R3 R4. The opening of contacts R3A prevents restarting the machine by means of the start key ST, contacts STC1, until cards are placed in the hopper. The opening of contacts R3B prevents the establishment of the test circuit which maintains relay R17H in energized condition and is the cause of the stoppage of the feed. As soon as new cards are placed in the secondary hopper, the relays R3, R4 are again deenergized and the machine is conditioned for restarting by means of the start key STK and contacts STC2. Since the card lever relays R8, R9 are still energized, the relays R18, R19 can not be reenergized when the start key is depressed. Consequently the comparing units will not be automatically cleared and the machine will resume its operation as if no interruption in the feeding of cards had occurred. The contacts R14D associated with primary card lever relay R14 have a similar effect when only primary cards are being fed.

In the event that it is desired to discontinue the particular operation requiring the use of either the primary or the secondary feed mechanism alone or both, the runout key must be depressed to cause the last secondary card to travel far enough to be gripped by the first pocket feed rollers 218, 219 exactly as in the first case described above where only the primary feed mechanism is used.

The circuits of the machine are arranged so that cards must be placed in the one or both hoppers at the start before the machine can be started with the key STK. In other words, if one or both feed mechanisms are to be used, cards must be placed in one of the hoppers before the machine will start. Once the machine has been started in operation, either with one feed or both feeds in use, regardless of which feed is in use, it must be continued in operation in the same manner and if the hopper becomes exhausted while the machine is running, it can not be started again by means of the start key until cards are placed in the hopper which becomes empty. On the other hand, when it is desired to terminate the operation and the hopper becomes exhausted simply because there are no more cards to be treated, it is desirable that the operator be compelled to press the runout key to clear the machine of the last cards which remain in the machine between the hoppers and the eject station at the time the machine stopped. For this purpose, relay R21 is provided and has the following effect.

When the start key is depressed, the closure of contacts STC1 causes the energization of relay R18 and R19 and effects the restoring of the comparing units. Relay R18 is energized and opens its contacts 18A before the contact CR1 can close a circuit through magnets PFM, SFM. Consequently the pickup coil R21P can not be energized during the first cycle of the machine. During the second cycle of the machine, the relay R14 is energized due to the closure of card lever contacts PCL1, thereby deenergizing relay R18. As a result, relay R21P is energized at the beginning of the third cycle and closes its contacts R21A to establish a holding circuit through the holding coil R21H of the same relay. This causes contacts R21B to open and remain open throughout the remainder of the run of the machine. Consequently, no circuits can be established through the coil R17P or the relays R18, R19, even in the event that it might happen that the card lever contacts opened through the creation of one or two card gaps for some reason or other.

When the machine stops through the exhaustion of the hopper, the operator has his choice of doing two things. If operation of the machine is to be continued with more cards, the operator must replenish the hopper which becomes exhausted and then depress the key STK to start the machine through contacts SCT2. If the machine is not to be continued in operation, the operator can not restart the machine by means of the start key STK but must press the runout key. The holding circuit for relay R21H is maintained through the contacts ROC2 of the runout key. When the runout key is depressed, the relay R17H is energized directly and the machine will again feed cards but the key must be held depressed, at least, until the last card has reached the feed rollers 218, 219. The operation of the runout key opens the contacts ROC2 and causes relay R21H to become deenergized. However, this deenergization of relay R21P has no harmful effect during the last cycles necessary to run the remaining cards out of the machine because the relays R1 to R4 will be energized, due to exhaustion of the hoppers the relays R1, R3 are energized, and, even if the operator depressed the start key at the same time as the runout key, it would be impossible to reset the comparing units independently of the selective reset control by the comparing units. Usually, the resetting of the comparing units will be taken care of properly when running out the last cards, due to the selective action of the comparing units. It will be seen that the machine is interlocked in respect to the start key and runout key so that the operator is, for practical purposes, compelled to do the right thing.

The arrangement of the circuits is such that when the machine stops for any reason, the operator must ascertain the reason for the stoppage. For instance, if the machine runs out of cards in either hopper, the machine can not be started until the cards are replenished. If the machine should stop in consequence of an error which caused relay R35 to open the contacts R35B, it can not be restarted through contacts STC1 or STC2, because the contacts R35B are in series with STC2 and the contacts STC1 are in series with contacts R21B. If contacts FPC open when a pocket becomes too full, the pocket must be emptied since contacts FPC are likewise in series with contacts STC2. Therefore, the operator only has left the runout key to enable him to run the last cards out of the machine in the event of an interruption in the feeding of the cards. Sometimes cards jam in the course of feeding, leaving several which must be removed after the jam has been cleared. In such a case the runout key is available for clearing the machine of the last few cards before restarting the run with the condition corrected by putting new cards in the hopper to take the place of the ones which may have become damaged by jamming in course of feed.

It will now be assumed that both feeding mechanisms are to be used and that cards have been placed in both the primary and secondary hoppers. In this case, all of the relays R1 to R4 will be deenergized and the contacts which they control will remain in the condition shown in Figs. 1b and 1c. When the start key is depressed, a circuit will be established as follows: line wire W1, relay R17P, contacts R12B and R1A, or R8B and R3A, all of which are closed, contacts R21B, STC1, SPC, and CR7 to line wire W2. The relays R18, R19 will also be energized in parallel with relay R17P through contacts R14D. Contacts R18B close and connect the coil R17H in parallel with relays R17P, R18, R19. The feeding of both primary and secondary cards commences by a circuit as follows: line wire W1, magnet PFM and contacts R2A, also contacts R58C and magnet SFM, R4A, R9E; contacts R12E, R1D, R2B, RSR4A, R58A, CR1, and R17B to line wire W2. During this initial cycle, the first primary card and the first secondary card will be advanced to positions to the right of the contact rollers PCR1 and SCR, respectively and the card lever contacts SCL, PCL will close. These card lever contacts however, have no effect at the start because they are in parallel with the contacts R2A, and R4A which remain closed as long as cards remain in the hoppers.

Because of the fact that none of the card lever contacts PCL1, PCL2, SCL have closed, the test circuit for relay R17H can not be made and the start key must be held down to continue the feeding of cards for a second cycle. During this second cycle, the first secondary card is fed past the brushes SB and closes the secondary card lever contacts SCL1, thereby energizing relay R5. This causes the relays R8, R9 to be energized, the contacts R9E closing part of the test circuit. Also the first primary card will pass the brushes PB1 and close card lever contacts PCL1 to energize relay R7. Relay R7 in turn causes the energization of relays R14, R15 as described before and relay R15 closes its contacts R15B as a further step in establishing the test circuit. The energization of relays R8, R14 opens the circuit for relays R18, R19.

During the first cycle, relay R19 causes the automatic resetting of the comparing units in the manner previously described, it being understood that one or more of the SR, PR1, PR2, PR3 magnets has been plugged for selective control in such a fashion as to be energized. The contacts R9E associated with the secondary card lever relay R9 also open during the second cycle and prevent a third impulse from being given the magnet SFM in consequence of which the secondary feed stops and will remain stopped until one of the selective controls which are to be effective during the subsequent operation of the machine establishes a circuit to such feed magnet.

Since cards have not yet passed the brushes PB2, the card lever contacts PCL2 remain open and relay contacts R13D likewise remain open to prevent the test circuit from being established to hold relay R17H. Consequently, as was the case in dealing with feeding of primary cards alone, it is necessary to hold the start key down until a third card feeding cycle has commenced during which the contacts PCL2 will close and cause the energization of relays R12, R13. During this cycle, the test circuit for relay R17H will be established as follows: line wire W1, relay R17H, contacts R17C, FPC, R3C, R9E, R1E, R15B, R13D, R35B, SPC and CR7, to line wire W2. Energization of relay R12 will cause contacts R12E to open and stop the feeding of primary cards unless one of the selective controls has been conditioned for some particular operation to continue the feeding of the primary or secondary cards. As will be seen later, the further feeding operations of the machine will depend not upon the start circuits but upon the selective effect of the comparing units or any of the selectors which may have been plugged for some special operation.

In subsequent sections dealing with specific operations, the start circuits will not be described in detail but it will be understood that the starting conditions will be the same as described above and will differ only as to the means by which the impulses of current are given to the magnets PFM and SFM. In some cases, these impulses of current will be given invariably by means of plug wires inserted between plug socket PS24 and plug sockets PS23, PS329; in other cases, the impulses of current will be controlled by the relays R22 to R27 which are associated with the comparing units or by the selector relays R28 to R32 which may be plugged to control the selection of the feed magnets, restoring magnets, and reject magnet in various ways.

Section 2—Sequence verification

In the use of the machine described herein in conjunction with perforated record accounting and statistical systems, the file cards are usually placed in the primary hopper PH when performing the various operations or functions, such as, matching cards, filing cards, and various kinds of card selection operations. Since it is necessary to remove cards from the files by hand for various purposes and refile them by hand, it is desirable that the machine be capable of verifying the sequence of the file cards in order to locate misplaced cards, mispunched cards, and the like. These manual withdrawal and filing operations are usually not sufficient in number to warrant the use of a collating machine as they are for the purpose of verifying errors and obtaining information from a relatively small number of widely scattered record cards. For the work of preparing cards for invoicing operations and other operations where a large number of cards must be withdrawn and for restoring to the files large numbers of cards withdrawn for any purpose, it is more economical to use the collating machine. The occasional withdrawal of cards for inspection and the refiling of these cards by hand results in errors of sequence and these errors must be eliminated by repeatedly checking the files. Provision is made in the present machine for carrying out sequence checking operations in order to automatically eliminate or detect the cards which are misfiled, mispunched, or missing. This operation which is essentially a verifying operation, will be explained in the present section, but it will be understood that it may be performed separately or be combined with other operations of the machine.

One of the simplest sequence checking operations which can be performed by the machine is detection of cards which are out of their proper numerical sequence, such as the error of manually filing a card numbered "99" before a card numbered "98." This type of error is a very common occurrence and the elimination or detection of such misfiled cards when performing any of the operations of the machine requiring the matching or selection of cards is highly important as cards which are not in their proper position interfere with the matching and selection operations.

The sequence unit gets its name from the fact that it is commonly used for the purpose of verifying the sequence of the file cards and, for the moment, it will be considered the only one in use and that its only purpose is to detect cards which are not in numerical order. The sequence unit is rendered effective by inserting plug wires and double plugs as shown in the lower half of Fig. 17a. This renders the comparing magnets PM1 responsive to holes designating the control number sensed by the first set of primary brushes PB1 and magnets PM2 responsive to the holes sensed by the second set of primary brushes PB2. This control number could be the man number punched in columns 71 to 74 of the stencil (Fig. 16a) and check (Fig. 16b) or an account number.

The double plugs in plug sockets PS22, PS35, PS36 render magnets PR1, PR2 effective while those in sockets PS45, PS46 render effective the switch assembly of the sequence unit. It will be assumed that when an error in filing is detected, the machine is to stop to give the operator time to locate the primary card in error and remove it or place it in its proper sequence with the others by hand if that is possible. For this purpose, a plug wire PW1 is inserted between plug sockets PS42 and PS60 (Fig. 17a). This renders the coils of relays HSR4, R35P responsive to a low second primary condition, that is, a condition in which the second of two successively fed primary cards has a lower number than the first, indicating that the sequence of the cards is reversed. It will be understood that the cards are in numerical order by account number but that it is not necessary that there be a card for each number. In other words, there may be gaps in the numbering such as might be caused by removal of cards from the file for some purpose. There may be more than one card per account number also.

For such a simple operation to be carried out separately, it is desirable that the machine feed primary cards continuously and only the primary side of the machine will be in use. Accordingly, a plug wire PW2 (Fig. 17a) may be inserted between plug sockets PS23 and PS24. This will cause the primary feed magnet PFM to be energized once per card cycle as long as cards continue to feed through the machine. It is also desirable that the restoring magnets PR1, PR2 be energized every cycle, since for the purposes of comparison, it is necessary that during each cycle the sequence unit be in readiness to receive numbers from both sets of brushes PB1, PB2. It is for this purpose that double plugs are inserted between plug sockets PS22 and PS35, PS36, respectively. This causes magnets PR1, PR2, and PFM to be energized in parallel once per card cycle.

The cards to be checked are placed in the primary hopper PH face down with the 9's at the left (Fig. 3b) and the machine is started in operation as described above in the simple case first described above in Section 1, considering that the primary feed mechanism alone is in use. After the second cycle, the first two primary cards will be in a position to pass the brushes PB1, PB2 together during the third cycle. As each pair of primary cards which is being compared passes the brushes PB1, PB2 circuits will be set up through the magnets PM1, PM2 and cause the sectors 373, 374 (Fig. 11b) to move to positions representing the values of the respective perforations designating the account number.

A typical circuit for the magnets PM1 is traced in Fig. 1a as follows: line wire W1, a magnet PM1, the plug wire between plug sockets PS1 and PS3, a brush PB1, contact roller PCR1, common brush PCB1, contacts R7B (which are closed during the card sensing portion of the cycle) the circuit breakers CB1 to CB4, and contacts CR3, to line wire W2. A circuit for a magnet PM2 is traced as follows: line wire W1, the magnet PM2, the plug wire between plug sockets PS6 and PS2, brush PB2, contact roller PCR2, common brush PCB2, contacts R6C (closed during the sensing period), circuit breakers CB1 to CB4, and contacts CR3.

In order to simplify the description, these brush circuits will not be traced again hereinafter in dealing with operations in which the comparing units are in use except, in certain special cases, where the circuits may be different. The circuits for the magnets SM1, SM2 may be traced similarly but for a magnet SM1 extends through contact roller PCR2, brush PCB2 and contacts R6C, and for a magnet SM2 extends through contact roller SCR, brush SCB, and contacts R5A.

If it should happen that the two cards compared have the same number, the cooperating pairs of magnets PM1, PM2 will cause the sectors 373, 374 to stop after equal extends of movement and the contact fingers 421 of the sequence unit will remain in a central position. Under these conditions, none of the relays R25, R26, R27 connected with the sequence unit will be energized and magnets PFM, PR1, PR2 will be energized to continue the feeding of primary cards and restore the sectors 373, 374 to zero over a circuit as follows: line wire W1, (Fig. 1c) said magnets in parallel contacts R14A; the plug wire PW2 between plug sockets PS23, PS24; contacts HSR4A, R58A, CR1 and R17B; to line wire W2. Relay HSR3, connected in parallel with magnet PFM, will be energized and will close its contacts HSR3A to cause the energization of the eject magnet EM in parallel with the magnet PFM. The machine will continue feeding for another cycle.

In the event that the second of two primary cards is higher in sequence relationship than the first, which is the proper condition for a file of cards which are in numerical order, the sector 373 corresponding to the magnet PM1 in the highest order of the comparing unit receiving a significant digit will move a lesser extent than the corresponding sector 374 and this will cause the switch member 421 to move to the left in Fig. 1d. This will cause relay R25 to be energized by a circuit from line wire W1, the coil of said relay, the switch assembly of the sequence unit, the plug between plug sockets PS45 and PS46, contacts CR2, and contacts R17B, to line wire W2. The energization of relay R25 has no effect in this case because the basic setup switches are all plugged "off" and no plug has been inserted between the basic setup plug sockets PS31, PS32. The magnets EM, PFM, PR1, PR2, and relay HSR3 will again be energized and the machine will continue to feed primary cards for another cycle.

Provided each pair of cards compared has the same number or the first has a lower number than the second, the machine continues to feed primary cards. However, if it should happen that a card is located out of its proper sequence, such as, a card numbered "99" occurring between cards numbered "97" and "98," the sequence unit will become operative to select the relays HSR4, R35P. During the cycle in which the "99" card is compared with the "97" card, the low first primary card condition will prevail and the machine will continue to feed. During the next cycle, however, the card "99" will be compared with the succeeding card "98" and the sector 373 associated with the magnet PM1 in the tens order of the number will move a greater extent than the corresponding sector 374, controlled by magnet PM2. This will cause the finger 421 to move to the right (Fig. 1d) and establish a circuit as follows: line wire W1, relays HSR4 and R35P in parallel, contacts R34C, the plug wire between plug sockets PS60 and PS42 (Fig. 17a), the right hand side of the switch assembly of the sequence unit (Fig. 1d), the plug between plug sockets PS45, PS46, contacts CR2 and R17B, to line wire W2. Relay R35P closes contacts R35A and thereby energizes the holding coil R35H which is associated with the coil R35P, thus maintaining the relay R35P—R35H in energized condition.

The contacts R35B are located in the test circuit for coil R17H (Fig. 1c) and interrupt this circuit so as to cause the deenergization of the start relay and stop the feeding of cards. Relay HSR4 also opens its contacts HSR4A (Fig. 1c) and prevents an impulse from being given any of the magnets EM, PFM, PR1, PR2. The contacts R17B also open. The energization of the relay coil R35H also causes the error lamp EL (Fig. 1d) to light to warn the operator that the machine stopped because of an error in the sequence of the file cards. It is desirable that an error lamp be provided in order to enable the operator to determine whether the machine stopped from a reversal in sequence, from exhaustion of cards from the primary hopper, failure of a card to feed past the brushes, or because one of the pockets became too full, causing contacts FPC to open.

In order to restart the machine, the operator must depress the error reset key (Fig. 1d) closing contacts ERC. This will energize relay R34, causing contacts R34A to close and establish a holding circuit for relay R34 through commutator PC4. Contacts R34B open and extinguish the error lamp EL and deenergize relay coil R35H. Contacts R34C open and prevent reenergization of the relays HSR4 and R35P, otherwise, since the comparing unit has not yet been reset, the error lamp circuit would be reestablished as soon as the start key is depressed and it would be impossible to restart the feeding of primary cards. The reason for this is that contacts CR2 close before contacts CR1 and relays HSR4, R35 would be reenergized before magnet PFM, PR1, PR2 could be energized. Commutator PC4 is in closed circuit condition when the machine stops feeding primary cards.

The operator may now press the start key and restart the machine in the usual way, taking care, however, if he wishes to remove the card in error, to remove by hand the first two or three cards which fall in the pocket after the machine starts and select the one which was in error and set it aside for later inserting it in its proper place in the file by hand. If the operator wishes, he may allow the machine to run only two or three cycles and then stop it by means of the stop key SPK to give sufficient time to remove the card in error and, if it is not misplaced more than a few cards from its proper place, put it there immediately before resuming the operation of the machine. What will be done in each case will depend upon circumstances, as it is quite possible that the card which stopped the feeding may have been mispunched or may not belong in the particular file which is being checked for sequence.

When the feeding of cards is restarted to continue the operation of the machine, the sequence unit will be reset before the next succeeding pair of cards will be compared. During this cycle, commutator PC6 will interrupt the holding circuit for relay R34 which permits contacts R34B to reclose to condition the machine for detecting the next error. The feeding of cards starts at approximately 226° of the cycle (Fig. 11b) and the restoring of the error detecting circuits to normal and the clearing of the sequence unit will take place before another pair of cards can be compared. The restoration of the sequence unit will prevent reestablishment of a circuit to relay HSR4 during this cycle.

When the machine is used for purposes of printing upon secondary cards through the media of the stencils it is usually highly important that there be no duplicate stencil cards, particularly is this true where the stencil cards are being used to print upon payroll checks as in some systems it might result in two bank checks being made where only one should be present. It is desirable, therefore, that means be provided to at least warn the operator when duplicate stencils occur, irrespective of whether or not the sequence check is being carried on at the same time the sequence unit also may be used to detect duplicate stencils. This is accomplished by inserting the plug wire PW3 between the equal plug socket PS41 of the sequence unit and the error stop plug socket PS60. When two successive stencil cards are correspondingly punched, as, for instance, with the same account number indicating duplication, the sequence unit switching assembly would be set in the central position thereby energizing the error stop relay in the same manner as above, but through the plug wire PW3 instead of through plug wire PW1. The procedure in correcting the error may be the same as described above. This feature may also be used where the stencils are arranged in alphabetical order by the names instead of in numerical order by some convenient control number. In such a case, two identical cards will always be indicated by the fact that there is a duplication of the identifying number, such as an account number or some classification number which will be different for other names and addresses. When the machine is used in this way, the error stop control will be plugged only to the equal plug socket PS41 as obviously in such a file the account numbers would not be in order. It will be understood, of course, that in this last case the machine must be plugged for comparison of the control numbers on successive account numbers.

Section 3.—Print control by "X" holes

One of the simplest printing operations that can be performed with the present machine is the addressing of cards, which conveniently may be of the same size as the card check shown in Fig. 16b but do not necessarily contain any perforations. As an example, it may be desired to send out post card notices of a sale of women's clothing only to women customers of a department store. The stencils conveniently may have the so-called "X" hole, that is a hole in the "11" position in any convenient column, such as column 60, denoting the fact the stencil is related to a female customer. The cards denoting the male customers need not have the "X" hole. It is desirable to print only from these cards having the "X" hole upon post cards placed in the secondary hopper SH with the address side facing down.

The machine is plugged as shown in Fig. 17b by the solid lines, and the stencils need not be in any particular order. The stencils are placed face down in the primary hopper with the lower edge (Fig. 16a) to the left with reference to Fig. 3b. The machine is started as described above, with the condition under which both feed mechanisms are used.

With the plugging arrangement shown in Fig. 17b, the primary feed mechanism will operate continually as long as the primary card hopper is kept supplied with cards and relay R57P is not energized. The secondary feed mechanism will only operate when the printing operation is to take place, which will be signified by the presence of an "11" hole in column 60 of the stencil. As soon as the "X" punched stencil is detected by the brush PB2 for column 40, the relays HSR2, R11 are both energized by a circuit traced as follows: line wire W1, the coils of relays R11, HSR2 in parallel, commutator PC3, the plug wire PW4 between plug sockets PS9 and PS2, the brush PB2 for column 60, contact roller PCR2, brush PcB1, contacts R6C, circuit breakers CB1 to CB4, and contacts CR3, to the line wire W2.

Relay HSR2 closes its contacts HSR2A (Fig. 1b) and establishes a holding circuit through commutator PC2, which is maintained until the beginning of the next card feeding cycle. Relay R11 closes its contacts R11A, thereby establishing a circuit to the stencil printing relay R57P from the plug socket PS24 (Fig. 17b), through the plug wire PW5, the contacts R11A, the plug wire PW6, and the stencil control relay R57P, to line wire W1. The relay R57P has a holding coil R57H (Fig. 1d) and closes contacts R57A to energize the holding coil R57H through commutator PC5. Contacts R57B also close to connect the commutator PC6 to commutator PC5. The commutator PC5 closes the holding circuit through the coil R57H at the very end of the card feeding cycle in wh'ch the primary card containing the "X" hole is fed into the eject station between the feed rollers 206, 207. The commutator PC6 closes during the succeeding card cycle while the primary card containing the "X" hole is being fed from the eject station into the printing station, thereby energizing the relay R58 through contacts PC5 and PC6 in series. The energization of relay R58 takes place early in the cycle in which the stencil having the "X" hole is moved into the printing station and opens contacts R58A, R58C (Fig. 1c) to prevent further impulses to the primary feed magnet PFM and secondary feed magnet SFM. At the same time relay R58 closes contacts R58B, R58D. Commutator PC7 also closes about the same time and holds relay R58 energized through contacts R58D until after contacts CR1 have closed thereby preventing reenergization of magnets PFM, SFM. Later in this same cycle the closure of contacts CR1 causes the printing clutch magnet PCM to be energized through the contacts R58B instead of energizing the primary feed magnet PFM, secondary feed magnet SFM, and eject magnet EM in the usual way through contacts 58A. Failure to energize the eject magnet EM causes the stencil card which has the "X" hole to stop in the printing station directly over the stencil inking roller and underneath the platen.

During the cycle in which a stencil having the "X" hole is sensed and relay R57P energized, parallel circuits are established through the secondary feed magnet SFM and magnet SRM2 by means of plug wires PW7, PW8. As a result, the secondary card which in this case is a post card and is held between eject rollers 208, 209, will be fed directly over the stencil having the "X" hole and likewise will be ultimately stopped in the print station directly above the stencil. This card will pass between the blades 306, 307 because magnet SRM2 has been energized. The commutator PC7 holds the circuit to the relay R58 just long enough to enable the pulse of current to be delivered to the print clutch magnet PCM, but breaks the holding circuit from relay R58 during the next complete rotation of the shaft 136, which is utilized to drive the inking mechanism in consequence of the energization of the magnet PCM.

The inking mechanism now operates as described above to press ink through the stencil and on the mailing card. By the time the inking mechanism completes its cycle, the contacts R58A will reclose, thereby enabling the commutator CR1 to close a circuit to the primary feed magnet PFM. This will cause the feeding of primary cards to be resumed and the eject magnet EM will again be energized in parallel with the primary feed magnet to cause the stencil with the "X" hole and the card above it to be ejected from the printing station. Also a new stencil will be fed which may or may not have an "11" hole. When the "11" hole is absent from all of a succession of stencils, the primary side of the machine merely operates continuously to feed the stencils without effecting printing therefrom.

It may be desired on the other hand to print from all cards which do not have the "11" hole and not to print from stencils having the "11" hole, as for example, in addressing post cards advertising the sale of men's clothing. For this purpose the plug wire PW6 may be shifted, as shown by the dot-dash line in Fig. 17b, so that the stencil control relay R57P normally will be pulsed through contacts R11B every cycle, in which a stencil card is fed. With this arrangement the machine will feed a stencil card and a secondary card in one cycle, in sequence of circuits traced similarly above, stop feeding and print, and then feed a stencil card again. This operation going on continuously as long as no cards pass the brushes PB2 containing an "11" hole. When the card containing the "11" hole is sensed, the "X" selector relay R11 will be energized by a circuit similar to the one traced above and will open the contacts R11B thereby preventing the pulsing of the relay R57P in the manner described above. This will allow only the primary feed magnet PFM and magnet EM to receive pulses of current to continue the feeding for another cycle without printing a card.

Section 4.—Printing from all stencils

Figure 17C:
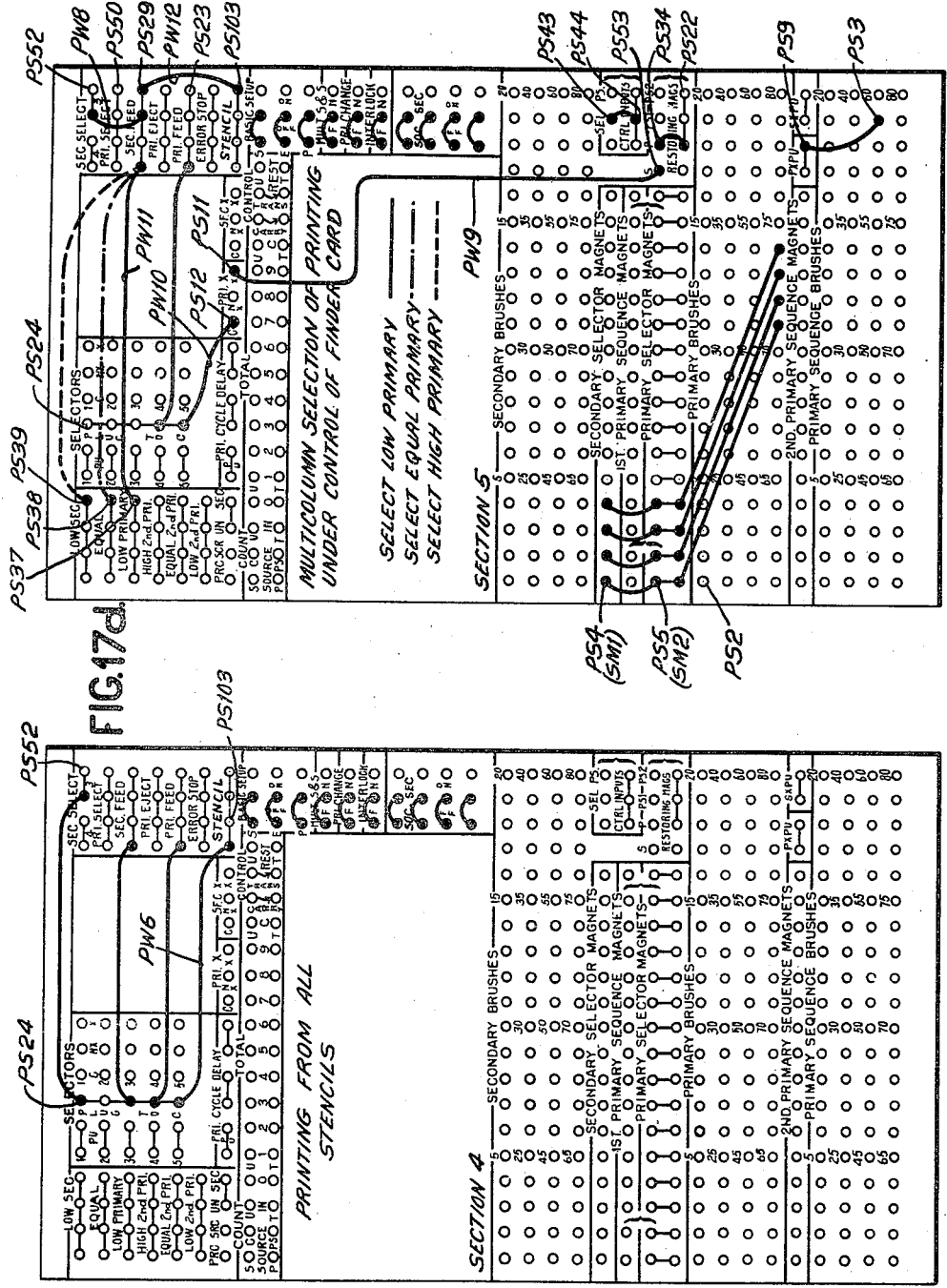

In Fig. 17c there is shown a method of plugging that causes each stencil to print upon a secondary card which conveniently could be a mailing card or an index card. For example, after a file of stencils has been prepared, it might be desired to make a duplicate index file, in cases where the stencils are kept in alphabetical order by names to serve as an alphabetical index file and at the same time it is necessary to have a separate index file in order of account numbers as a convenience. With the arrangement shown in Fig. 17c, the machine will feed both a stencil card and a secondary card together in one cycle during which the stencil control relay R57P will be energized, causing each stencil to print upon a secondary card. The plugging of the stencil control relay R57P is the same in effect as with the dot-dash showing of Fig. 17b. In the present case, the dot-dash plugging arrangement shown in Fig. 17b could be used by withdrawing the plug wire PW4 or by not "X" punching the stencils in column 60.

Section 5.—Print selecting operations using one comparing unit

Either of the comparing units may be used for simple print selecting operations, such as printing from all stencil cards having a predetermined number, all cards above a predetermined number, or all cards below a predetermined number. In Fig. 17d there is shown the plugging of the machine to accomplish each of these three different types of print selection. The solid lines indicate the plugging when it is desired to select all cards below the predetermined number, the dot and dash line shows a change in the plugging to effect the selection of all cards having the same number, while the dotted line shows a change to select all cards above the predetermined number.

For these three operations the file of stencil cards will not be arranged in serial order according to the control numbers which are to be used for purposes of selection. At the head of the file of stencil cards is placed a card with the control number which forms the basis for the selection punched therein in the same columns that such number will appear in the cards to be selected. This first card, which will be called the "finder" card, contains an "X" hole in some columns, such as column 59, and will control the machine to cause the number punched thereon to be entered in, for example, the selector unit. With the plugging shown in Fig. 17d, the restoring magnet SR will be energized over plug wires PW9, PW10 whenever an "X" punched primary card is sensed by the brush PB1 for column 59. The restoring magnet PR3 and the primary feed magnet PFM will be repeatedly energized once per cycle, and, due to the effect of relay HSR3, the eject magnet EM will likewise be repeatedly energized in the manner explained in Section 3.

During the second cycle of the machine, when the "X" punched finder card passes the brush PB1 for column 59, the restoring magnet SR will be energized by a circuit as follows: line wire W1, magnet SR (Fig. 1c), the plug wire PW9 between plug sockets PS33 (Fig. 17d) and plug socket PS11, contacts R11A of primary class selector relay R11, the plug wire PW10 between plug sockets PS12, PS24; contacts HSR4A, R58B, CR1, R17B; to line wire W2. By this means, both sides of the selector unit will be automatically reset as a preliminary to the entry of the number on the finder card therein. The magnet PR3 is automatically energized because the insertion of the double plug which connects plug sockets PS22 and PS34 together places magnet PR3 in parallel with the primary feed magnet PFM which is energized during this cycle to cause the feeding of primary cards.

The control number on the finder card is sensed during the third cycle by the brushes PB2 for columns 71 to 74 and both sets of magnets SM1, SM2 are energized, causing the control number to be entered on both sides of the selector unit, thereby causing the equal condition to occur in this unit. With reference to Fig. 17d, considering only the plug wire PW11 as shown in solid lines, this has no effect with the result that the finder card will be deposited in the pocket MS, none of the magnets PRM, SFM, SRM1 or relay R57P being affected. The magnet PR3 will again be energized in parallel with the magnet PFM during the third cycle. However, the secondary side of the selector unit, that is, the side containing magnets SRM1 will not be restored during the third cycle, since the next or second card, that is, the first stencil card, does not contain an "X" hole in column 68. This card passes brushes PB1 during the third cycle. The control number of the first file card will be sensed by brushes PB2 entered into the restored or primary side of the selector unit, and compared with the number now standing on the secondary side which was entered from the finder card. This takes place during the fourth cycle.

If the number on the first stencil card is the same as on the finder card, the first stencil card will be ultimately fed to the pocket MS without printing because the equal condition will prevail and plug socket PS38 (Figs. 1d and 17d) will be selected without effect. If the number on the first stencil card is higher than the number retained on the secondary side of the selector unit, the low secondary condition will prevail and plug socket PS39 will be selected, also without effect, and such card will be deposited in the pocket MS without printing.

If it should happen, however, that the first file card is lower in number than the finder card, the low primary condition will be created in the selector unit and plug socket PS37 will be made live. This causes a circuit to be established through the comparing unit to plug socket PS37, the plug wire PW11, and magnet SFM, also through plug wire PW12 and relay R57P, to line wire W2. Magnet SRM2 also is energized over plug wire PW13. As a result, a secondary card is fed to the printing station along with the stencil card printed and ejected to pocket SP in the same manner described in Section 3.

If the equal stencil cards are to be selected for printing, plug wire PW11 is shifted to plug socket PS38 as shown by the dot-dash line in Fig. 17d. With this arrangement magnets SFM and SRM2 and the relay R57P will be selected for printing only when a stencil bears the same control number as the finder card. As before, magnet SRM2 will be energized to keep the stencil and secondary card separate in pockets MS and SP, respectively.

The equal condition is created in the selector unit when the finder card passes brushes PB2 and causes an operation of the printing mechanism and the feeding of a secondary card. However, since the finder card has no address in the stencil, or is a plain card, both the finder card and secondary card will merely be deposited in pockets MS and SP, respectively, and may easily be removed. The inking roller will smear the back of the finder card with ink but this does no harm as the ink will be deposited on the front face of the card which faces downwardly and cannot transfer to the first stencil.

If the plug wire PW13 is shifted from plug socket PS38 to plug socket PS39, as shown by the dotted line in Fig. 17d, the magnet SFM and relay R57P will be energized only when the file cards bear a higher number than the finder card; whereby only those cards will be selected for printing which are higher in value than the finder card.

Where the arrangement of the stencil file permits, it is possible to place "X" punched finder cards at the proper places in the file and cause the secondary side of the selector unit to take a new setting representative of a different number. This is due to the fact that the comparing unit is automatically reset on both sides whenever an "X" punched card passes the brushes PB1.

The ability of the machine to receive the number from a punched card makes it unnecessary to provide a presettable multi-column selector which, in a capacity equivalent to the 16 position selector unit with which this machine has been provided, would be extremely bulky and expensive to construct. It is a much simpler operation to punch a finder card on a key punch and insert this card in front of the first file card than to manipulate a multi-column selector device of any of the types heretofore used in practice.

It is possible by means of cross-plugging where necessary, to utilize a balance card or some other card, such as a name card, as a convenient means of inserting the number in the machine when selecting scattered detail cards. If the balance card is perforated with the account number or other control number in the same columns as in the file cards, for instance, the detail cards, no change is necessary in the plugging shown in Fig. 17d of the selector unit other than to insert the plug wire between plug sockets PS9 and PS3 in the proper plug socket PS3 which corresponds to the column containing the "X" hole signifying that the card is a balance card. It may happen, for example, that the number is perforated in columns 6 to 10 in the balance card and in columns 71 to 74 in the stencil cards. In this case, the lower ends of the plug wires between plug sockets PS4 and PS5 may be shifted to the plug sockets PS2 corresponding to brushes PB2 for columns 6 to 10.

During the passage of the finder card past brushes PB2, the control number appearing in columns 6 to 10 on the finder card which, in this case, is a balance card, will be entered into the secondary side of the machine. It may also happen, if the balance card is provided with holes in columns 5 to 10 that a number which has no significance in the present case will also be entered in the primary side of the selector unit. Since this number will be automatically erased from the primary side of the selector unit prior to analysis of the first stencil card by brushes PB2, its presence in the comparing unit will have no harmful effect but will merely control the printing mechanism according to the accidental numerical relationship which it creates, as in the case above discussed with respect to selection of equal cards.

*Section 6.—Printing of matching cards with selection of unmatched stencils and secondary cards*

One of the most important features of the machine described herein is that it is capable of matching the stencils with secondary cards, using the matched stencils to print upon the matching secondary cards, and rejecting, that is, selecting from both the file of stencils and the batch of secondary cards all the unmatched cards and stencils. The machine is plugged as shown in Fig. 17e, including error-stop on duplication of stencils and reversal in their sequence.

This operation may be used to address payroll checks of the form described above. The selection of the unmatched cards in this instance is a desirable verification feature as the absence of a stencil to match a check may mean an error in punching the check as where a check is erroneously punched with the man-number of a discharged employee whose number has not yet been assigned. On the other hand the check may be for a new employee and, by error of omission, a stencil has not yet been made. Also an unmatched stencil may mean either a discharged employee whose stencil has not been removed from the file or a new employee for whom no check was made out. At any rate, even if the unmatched card is not an error, taken by itself, investigation and further special treatment is necessary.

It will be assumed that the stencil cards are numbered as follows: 1, 2, 3, 4, 6, and 7 and that the secondary cards or checks are numbered 1, 2, 4, 5, and 6. It will also be assumed that the initial cycles have been performed and that the first secondary card has passed the brushes SB and has stopped at the eject station and that the first two primary cards have passed the brushes PB1, PB2, respectively and that the first primary card is at the eject station. The third primary card will be in a position to pass the brushes PB1 during the fourth cycle of the machine provided the primary feed mechanism is operative. During the third cycle of the machine, the first primary card will have passed the brushes PB2 and the control number 1 will be entered on the primary side of the selector unit.

During the third cycle of the machine the first primary card numbered 1 will be compared with the first secondary card numbered 1 and fed to the eject position, the secondary card having reached this position during the second cycle of the machine. The equal condition will be created in the selector unit and a circuit will be traced as follows to energize the primary feed magnet. Line wire W1, magnet PFM, contacts R14A, the plug between plug sockets PS26, PS27, the plug between plug sockets PS19, PS20, contacts R23A of the equal relay R23 which is energized when the equal condition is created in the selector unit, and contacts HSR4A, R58A, CR1, R17B to line wire W2. The relay HSR3 is likewise energized in parallel with magnet PFM by closure of contacts HSR3A and will cause the eject magnet EM to be energized. The closure of contacts R23B has no effect because contacts R15A are open in consequence of the fact that there are primary cards in course of feed. The eject magnet EM will also be energized by a circuit extending from line wire W1, magnet EM, contacts R12C, the eject basic setup switch E, and contacts R23A, HSR4A, R58A, CR1, R17B, to line wire W2.

The second primary card is numbered 2, whereas the first primary card is numbered 1. While the equal condition will be created in the selector unit, a high second primary condition will be created in the sequence unit, causing relay R25 to be energized as well as relay R23. The latter also has the effect described above of energizing the primary feed magnet and the eject magnet EM, causing the primary feed to continue in operation. Additionally, the closure of contacts R25A causes the secondary feed magnet to be energized during the third cycle over a circuit as follows: line wire W1, magnet SFM, contacts R9B, the secondary basic setup switch S, contacts R25A, R26B, R23B, HSR4A, R58A, CR1, and R17B, to line wire W2. Thus, the primary and secondary feed mechanisms now operate together and the second secondary card numbered 2 and the second primary card numbered 2 will be fed to the eject station during the fourth card feeding cycle whereby the first secondary card, numbered 1, and the first primary card, also numbered 1, are fed together, one over the other, to the printing station.

The same condition prevails again during the fourth card feeding cycle since the third primary card is numbered 3 with the result that the second primary and second secondary cards numbered 2 will be fed together to the printing station. During the fifth card feeding cycle, the two cards numbered 2 are fed from the eject station, the third secondary card numbered 4 will be compared with the third primary card numbered 3 which causes the low primary card condition to be created in the selector unit and the high second primary condition be again created in the sequence unit because of the fact that the third primary card numbered 3 is followed by the fourth primary card numbered 4. This time the relays R22 and R25 are energized together. Contacts R22B close and cause the energization of magnet PFM by a circuit as follows: line wire W1, magnet PFM, contacts R14A, the primary basic setup switch, contacts R22B, HSR4A, R58A, CR1, and R17B, to line wire W2. No circuits can be established through the secondary feed magnet, notwithstanding the closure of contacts R25A, because of the fact that the contacts R23B remain open. Thus the secondary feed stops and the primary feed continues. As a result the third primary card numbered 3 will be fed from the eject position during the sixth cycle and the fourth and fifth primary cards numbered 4 and 6 will be compared with each other and the third secondary card numbered 4 during this cycle. This again causes the secondary cards to resume feeding because of the equal condition in the selector unit and the change in the primary card numbers from 4 to 6.

During the seventh cycle the fifth primary card numbered 6 will be compared with the fifth secondary card numbered 5 and the low secondary condition in the selector unit will be created while the low first primary condition will be created in the sequence unit because of the fact that the sixth primary card is numbered 7. This is the reverse of the conditions in the comparing units set up during the fifth cycle and results in the feeding of secondary cards and stopping the feeding of primary cards. The low secondary condition in the comparing unit causes the selection of relay R24 and the energization of the secondary feed magnet alone by a circuit as follows (Fig. 1c): line wire W1; relay HSR5 and magnet SFM in series parallel with contacts R58C; contacts SCL, the basic setup switch S, and the contacts R24A, HSR4A, R58A, CR1, R17B, to line wire W2. The magnet EM is energized by a circuit in parallel with the secondary feed magnet SFM through contacts HSR5 to the contacts HSR5A. This enables the card or cards in the printing station to be fed out of said station. The primary feed mechanism will not operate because the contacts R22A, R22B, R23A, R23B are open.

During the eighth cycle the fifth secondary card numbered 6 will be compared with the fifth primary card of the same number and the equal condition will again prevail to feed both primary and secondary cards during the ninth cycle.

Up to the present point only the card feeding operations have been described to show the selective action of the comparing units in controlling the feeding alone according to the sequence relationships between the cards. During the third, fourth, sixth and eighth cycles the equal condition was created in the selector unit in consequence of the fact that the first, second, fourth, and fifth primary cards matched the first, second, third, and fifth secondary cards with the result that these cards were fed in pairs to the printing station. During these same cycles the stencil control relay R57P was also energized in parallel with the primary and secondary feed magnets in consequence of the plug wire between the equal plug socket PS38 of the selector unit and the plug socket PS103. This causes a print cycle to intervene between the third and fourth, fourth and fifth, sixth and seventh, and eighth and ninth card feeding cycles, respectively. The manner in which the feeding of cards is temporarily interrupted and the printing mechanism operates has already been described in previous sections and need not be explained further hereinafter.

In consequence of the plug wire between the plug sockets PS24 and PS52 the magnet SRM2 is energized every cycle of the machine for card feeding or printing to cause the secondary cards to become deposited in pocket SP while the primary cards normally become deposited in the pocket FS. This energization of the magnet SRM2 of course has no effect unless a secondary card is fed from the eject station during the cycle following the energization of the magnet SRM2 which, of course, only occurred during the third, fourth, sixth, and eighth cycles and also during the seventh cycle in consequence of the low secondary condition. This takes care of the equal cards and results in their being deposited separately in the pockets MS and SP during the fifth card cycle.

The low primary condition of the fifth cycle also causes the magnet PRM to be selected in consequence of the plug wire between the plug sockets PS37 and PS50 whereby the primary card numbered 3 will be deflected to the pocket PRS. On the other hand, during the seventh cycle the low secondary condition similarly selects the magnets SRM1, in consequence of the plug wire between the plug sockets PS39 and PS51. It will thus be seen that the equal cards and the unmatched cards are all filed in separate pockets and the unmatched cards may be removed and investigated to ascertain the reason for their failure to match. Under the assumed condition of the present section of printing upon payroll checks, the normal ideal condition would be for each check to have a stencil since theoretically payroll checks should be only made out for employees actually on the payroll and for each employee there should be a stencil. However, in consequence of the necessity for removing and filing cards by hand and the possibility of errors in punching the cards, it will happen that some of the stencils will not match checks, and some of the checks, on the other hand, will not match stencils, requiring investigation.

This same scheme of operating the machine might also be used for addressing checks for accounts payable where there should be only one card representing the amount payable on the account, as where a summary card is punched to show the credit balance of the individual accounts payable and checks should not be made out to accounts which have already been paid, on the other hand, a stencil should have been made out for the name of the payee to go on the check which has been prepared to pay a known account payable. Other applications with modifications will readily appear to those skilled in the art of applying perforated account systems.

Under some conditions, it might not be desired to reject the unmatched stencil as there may be a legitimate reason for not matching all of the stencils. For example, the punched checks may be used as pulling cards to save the labor of addressing them separately on the typewriter where a general stencil file of all addresses is kept. It may be the case that a business organization keeps a general stencil file of addresses in numerical order by some form of identification number, such as an account number, and when a group of them must be paid, or some item must be mailed to them as by enclosure in window envelopes, cards such as checks punched with the control numbers, may be utilized to select the stencils for printing names, addresses or other matter upon the cards used for selection purposes. In such a case there will, as a matter of course, be a large number of unmatched stencils and it would not be desirable to reject these stencils as it would get them out of order in the file and then they would only have to be put back again in the same order. It might be desirable, however, to reject the unmatched secondary cards because of the fact that the card was not matched would tend to indicate that there is a gap in the stencil file which should be filled. In such a case, the plug wire to the plug socket PS50 can be removed to prevent rejection of unmatched stencils. In other cases the plug wire to plug socket PS52 may be removed or both may be removed, whereby only part selection or no selection of unmatched cards will be obtained.

*Section 7.—Print selection between limits*

It is possible, by using both comparing units, to select for printing all stencil cards between two limits. It will be understood that the stencil cards are not in numerical order according to the numbers to be selected as obviously it would be a simple matter to select all cards between two limits in a file in numerical order. The control numbers will appear in the cards in columns 61 to 65. A finder card is placed at the head of the first group of file cards in the hopper PH and this finder card has the lower limit perforated in columns 61 to 65 and the upper limit in columns 76 to 80. This card also has an X hole in, say column 59, which is utilized, as in the case of Fig. 17d, to control the resetting of the sectors 373 of both comparing units. Sectors 374 will be reset every cycle. The machine is plugged as shown in Fig. 17f which involves the use of split plug wires to connect the brushes PB2 in columns 61 to 65 to the magnets PM1 and SM2 and contacts R11A to magnets SR and PR2. By means of the double plug sockets PS5, the magnets SM1 are also plugged for control by the brushes PB2 for columns 61 to 65. The brushes PB2 for columns 76 to 80 are plugged to magnets PM2. For a clearer understanding of the plugging, two different sections of the comparing units are utilized in order to avoid complication of the plugging in Fig. 21c. In other words positions 12 to 16 of the selector unit and positions 4 to 8 of the sequence unit have been utilized for their reception of the numbers from the cards. If desired, positions 12 to 16 of the sequence unit could be used but it would be difficult to clearly show the plugging in Fig. 17f. The important condition which must be met is that the finder card must have two separate control number fields.

It will be remembered that with reference to Fig. 17d, it was stated that after a number has been entered in any section of a comparing unit, it will stay in that section until the unit is reset and numbers can not be reinserted until the section has been reset. It will be noted in Fig. 17f that three sets of magnets of the two comparing units are all controlled by brushes PB2 for columns 61 to 65. It will be seen, therefore, that in the beginning the number which has the lower limit will be read from columns 61 to 65 on the card into both sides of the selector unit and on one side of the sequence unit. At the same time, the upper limit will be read into the remaining side of the sequence unit from columns 76 to 80 on the finder card. When the finder card passes brushes PB1, the primary side of the selector unit (corresponding to magnets SM2) and the first primary side of the sequence unit (corresponding to magnets PM2) will be reset automatically in consequence of the energization of magnets PR2, PR3, by closure of contacts R11A of primary X selector relay R11. The circuit for magnets PR2, PR3 is established from the plug socket PS24 through the contacts R11A of relay R11 and the split plug wire to the plug sockets PS34, PS35, and magnets PR2, PR3. This insures that the sides of the comparing units which are to receive the upper and lower limits, respectively, will be clear at the time the finder card passes brushes PB2. The magnets SR and PR1 will also be energized owing to the double plug and the plug wire which connects the plug sockets PS36, PS33 to the triple plug socket PS22. During subsequent cycles of the machine, the primary X selector relay R11 will not be again energized, consequently the sections of the sequence and selector units which initially receive the upper and lower limits will not be reset. Thus the pulsing of the magnets PM2, SM2 during subsequent cycles of the machine will have no effect.

When the finder card passes brushes PB2, the control number appearing in columns 61 to 65 of this card will be entered in both comparing units by the energization of magnets SM1, PM1. This creates the equal condition in the selector unit and, in any case, since the selector unit is plugged to respond only to a low primary condition, the primary reject magnet PRM will not be energized and the finder card will be deposited in pocket MS. When a card passes brushes PB2 which has a control number between the limits established by the finder card, the selector unit will assume a low primary condition and the sequence unit the low second primary condition. This causes both of the relays R30 and R32 to be energized, closing their contacts R30A, R32A. This enables a circuit to be established to the secondary feed magnet SFM, relay R57P, and magnet SRM2 from the plug socket PS24 through the contacts of both relays in series to plug sockets PS29, PS103, PS52, with the result that the stencil card which is between limits will print upon a secondary card during the ensuing printing cycle.

During each cycle, including the cycle in which the finder card passes brushes PB2, the magnets SR and PR1 will be energized to clear the associated halves of the two comparing units of the control number entered therein from columns 61 to 65 of the stencil card. Magnets PR2, PR3, however, will not be energized since the contacts R11A are now open. When stencil cards are sensed which do not come between the limits established, one of the comparing units may assume the equal condition or there may be a combination such as a high second primary and a low secondary condition. Under these circumstances, magnet PRM can not be energized and such stencil cards will follow the finder card into pocket MS.

With the plugging arrangement of Fig. 17g, which is somewhat similar to that shown in Fig. 17f, insofar as the plugging to the comparing units and the restoring is concerned, may be utilized to select cards according to either of two control numbers. In this case, it is not necessary to use any of selector relays R28 to R32, but plug wires are inserted between the equal plug sockets PS38, PS41 and the plug socket PS50. Insofar as the operation of the machine is concerned, the preliminary cycles of the machine to reset the comparing units and enter the two control numbers in the comparing units will be the same. However, when a stencil card passes brushes PB2 which agrees in respect to the control number holes with either of the numbers entered in the comparing units by the finder card, an equal condition will be created in one of the comparing units with the result that the magnets SFM, SRM2 and relay R57P will be energized and such stencil card will print upon a secondary card.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a stencil printing machine, a printing station; a plurality of separate feeding mechanisms each for feeding a separate collection of records, said feeding mechanisms conveying the records of all the collections to said printing station past a common distribution point, each collection of records having records which may correspond to records present in another collection, one of said collections comprising printing records adapted to print upon the records of another collection; a record distributing mechanism for distributing all the records from all the collections, a plurality of record sensing means for sensing respectively, designations in a record from one collection and designations in two successive records of another of said collections, prior to their delivery at the common distribution point; means controlled by the sensing means for comparing a record from one collection with a record from another collection and for comparing two successive records of one of said collections, means at the printing station and controlled by the comparing means for causing the printing record to print upon the other of two corresponding printing and non-printing records, and controlled by the comparing means for controlling the distributing means to cause the records of one collection which correspond to records of another collection to have separate destinations from non-corresponding records of said collections, and to determine separate destinations for the non-corresponding records of the respective collections, and means to prevent feeding of records when two successive compared records correspond.

2. In a stencil printing machine, printing mechanism, means to feed a plurality of separate collections of records containing data designations to a common distribution point, one of said collections including printing members; a series of record receiving stations including at least three stations, a series of sorting blades leading from the common distribution point to the respective stations, past the printing mechanism, means to selectively operate the blades whereby to cause records from each collection having a predetermined relationship to records of the other collection to become deposited in predetermined pockets and the remaining records of the respective collections to become deposited in a pocket separate from the pockets for the records having the predetermined relationship; a series of groups of electrical sensing devices each group for sensing the designations in the records of one of said collections, record comparing means including a plurality of separate groups of members each variably settable to numerical values and including a plurality of groups of magnets each for controlling the setting of one of said members, each group of magnets being controlled by a group of sensing devices, and electrical switching means associated with and controlled by the groups of settable elements, said switching means being selectively settable by said members to indicate identity and two kinds of sequence relationships between the records compared; a series of magnets for selectively controlling the operation of the printing mechanism and blade operating means, a system of relays controlled by the switching means for selectively controlling said magnets; and manually selectively settable circuit completing means for connecting said magnets to said switching means and said relays to predetermine the effect of the switching means upon said magnets, said switching means being settable in combinations to predetermine the printing and distribution of the records under control of designations in the records from the respective collections.

3. In an address printing machine, a series of record receiving stations comprising three or more stations, a common feed mechanism for conveying records and printing devices from a common distribution point to any one of said stations, distributing means located at said common distribution point and including a plurality of control magnets each for determining a predetermined distribution of the devices or records; means to feed a plurality of separate collections of records, consisting of printing devices and records receiving impressions from said devices to the distributing means, each feeding means including a feed magnet for starting and stopping the feeding means with which it is associated; comparing means comprising two units, each unit including two series of elements each element settable to represent a numerical value, each unit including a series of comparing magnets each associated with one of said elements to control the setting thereof in accordance with the numerical value, and including means controlled by the comparing magnets for setting said elements individually to represent a single value; a plurality of sets of electrical sensing brushes one set for sensing successively the records of one collection and two sets for sensing together two successive records of another collection, means to selectively connect the respective series of comparing magnets to said sensing brushes, means for printing by means of the printing devices on the records receiving impressions including a printing magnet for rendering the printing means operative, a system of relays for selectively closing circuits to the magnets associated with the distributing mechanism, address printing means, and the feed mechanism, respectively; and manually selectively settable switching means for placing said control, feeding, and printing magnets under the control of the comparing means and relays, said switching means being settable combinationally in a plurality of ways according to prearranged plans to variably control the printing and distribution of the records from the several collections to said stations.

4. In an address machine, a plurality of receiving stations, distributing mechanism common to said stations and normally operative to cause all records to become deposited in predetermined stations, means to feed a collection of address printing records to said distributing means, means to feed a collection of impression receiving records to the distributing means, means to compare designations on each record of one collection with designations on a record of the other collection to detect identity relationships between the records of one collection and the records of the other collection, means to compare the designations of each record of a predetermined one of the collections with the designations on the succeeding record of the same collection to detect a reversal in sequence in said predetermined one of the collections, means to impress address printing records upon the impression receiving records, selectable control means selectively controlled by both comparing means to selectively cause operation of the impressing means, the distributing means, and the feeding means to enable the address printing records and the impression receiving records to be fed into separate predetermined stations according to the sequence of their respective designations, said comparing means being operative, when an odd record occurs in one collection for which there are no corresponding designations in a record of the other collection, to control the distributing means through the selective control means to cause said odd record to become deposited in a station separate from the predetermined stations, and operative when an address printing record is found to be identical with an impression receiving record to cause an operation of the impressing means, and means controlled by the comparing means for stopping the feeding of records to the stations when the sequence of the predetermined one of the collections of records is reversed.

5. In an address printing machine, impression means, a plurality of record receiving stations, record distributing mechanism common to said stations and normally operative to cause all records to become deposited in predetermined stations, means to feed a file of address printing records to said distributing means, means to feed a collection of records to be impressed past the impression means to the distributing means, means to compare designations on each file record with designations on each record to be impressed to detect identity relationships between the file records and the records to be impressed, means to compare the designations on each file record with the designations on the succeeding file record to detect a change in designations in the file records; and selective control means controlled by both comparing means for selectively causing operation of the impression means, the distributing means, and the feeding means to enable the identical file records and the records to be impressed to be fed together to the predetermined stations past the impression means according to the sequence of their respective designations and also cause an operation of the impression means, said comparing means being operative, when an odd record occurs in said file or collection for which there are no corresponding designations in a record from said collection or file, to control the selective control means to render the distributing means operative to cause said record to be filed to become deposited in one of two stations separate from the predetermined stations.

6. In an address printing machine, a printing station, means to feed to said station a set of printing devices identified by control number designations, data retaining means having separate sections for receiving two numbers denoting upper and lower numbers of selection and for receiving numbers from the printing devices, means to enter in the retaining means the limits of selection; means to compare the numbers entered from the printing devices with both limits, said means being adapted to manifest the fact that each number entered is or is not within said limits, means to print from printing devices fed by said feeding means, means controlled by the comparing means for causing the printing means to operate to print by means of each printing device within the limits of selection, a second feeding means for feeding to said station records to be imprinted, and means controlled by the comparing means for causing an operation of the second feeding means for each record within the limits of selection.

7. In an address printing machine, means to feed a set of records identified by control number designations, data retaining means having several sections for receiving two numbers denoting upper and lower numbers of selection and for receiving numbers from the records, means to enter in the retaining means the limitations of selection; means to compare the numbers entered from the records with both limits, said means being adapted to manifest the fact that each number entered is or is not within said limits; means to print from records fed by said feeding means, and means controlled by the comparing means for causing the printing means to operate to print from each record lying between the limits of selection, a second record feeding means, and means controlled by the comparing means for causing an operation of the second feeding means to feed to the printing means a record for each record selected.

8. In a machine of the class described, the combination of two record feeding mechanisms, one of said mechanisms for feeding printing records containing control number designations, means to impress the printing records on records fed by the other feeding mechanism, a plurality of data retaining devices, means to enter in said devices two numbers to be selected, means controlled by said records for entering in both said devices the control number from each card fed by the first feeding mechanism, comparing means for comparing the numbers in said devices with the control number designations to ascertain when any number entered under control of the records is the same as either of the numbers to be selected, and means controlled by the comparing means for causing an operation of the second feeding means each time a number on a record corresponds to one of the numbers to be selected and also causing an operation of the impressing means.

9. In a stencil printing machine, means to feed a collection of stencils; means to feed a collection of articles to receive impressions from said stencils, said stencils and said articles having designations which identify certain of the stencils with certain of the articles to be printed upon by the stencils; distributing means associated with each feeding means for determining a plurality of designations for both the stencils and articles respectively, means to guide the stencils and articles to a common printing station, means to compare the designations on the stencils with the designations on the articles to detect correspondence in said designations, means controlled by the comparing means for causing the feeding means to feed corresponding stencils and articles to the printing station and to control the distributing means to cause the non-corresponding stencils and articles to have separate and different destinations from the corresponding stencils and articles and means controlled by the comparing means for effecting an impression of a stencil upon the corresponding article when said corresponding stencil and article are fed to the printing station.

10. In a stencil printing machine; a stencil receptacle and a receptacle for articles which are to receive impressions from said stencils, said stencils and articles having identifying indicia which match certain stencils with the articles upon which they are to make impressions; a plurality of receiving stations associated with each receptacle, separate feeding means for feeding the articles and the stencils from their respective receptacles to the receiving stations, distributing mechanism for determining the distribution of the articles and stencils respectively to their receiving stations, impression taking means common to both feeding means past which said articles and said stencils move in parallel paths in transit from the receptacles to said receiving stations, comparing means for comparing the indicia on the stencils with the indicia on the articles to detect correspondence or non-correspondence between said stencils and articles prior to their reaching the impression taking means and distributing means and capable of detecting the correspondence or relative sequence between a stencil and an article with which it is compared; and means controlled by said comparing means for controlling the distributing means, feeding means, and impression taking means to cause non-corresponding stencils and articles to be received by different stations from the stations for the corresponding articles and stencils, and for causing an impression by the impression means of a corresponding stencil upon the corresponding article.

11. In a stencil printing machine, a printing station having an impression member and means to operate said member; means to feed a collection of stencils past said printing station, means to feed a collection of articles which are to receive impressions from said stencils past said printing station, each feeding means including a clutch for rendering it operative and a magnet for controlling each clutch, said operating means also including a driving clutch for rendering the impression member operative and a magnet for controlling said clutch; means to compare designations identifying stencils with designations identifying the articles including switching means for selecting said magnets, said comparing means being operative to selectively close a circuit to one or the other of the feed clutch magnets without selecting the other magnet upon a disagreement between the stencil and article identifying designations to cause a non-agreeing stencil or article, according to which is smaller, to be fed past the impression member without printing being effected and to close circuits to all of said magnets when the designations on an article agree with the designations on the matching stencil.

12. In a stencil printing machine, means to feed a collection of stencils having data designations representing numbers past a printing station, means to feed articles which are to receive the impressions from said stencils past said printing station, means to sense said designations in the stencils; means to receive and store a number identifying certain of the stencils, including means controlled by the sensing means for setting up said number during a preliminary cycle prior to the feeding of the stencil; impression taking mechanism located at the printing station for effecting impressions of the stencils on the articles, means controlled by said storing means for causing an operation of the impression taking means, and manually selectively settable means for determining whether the impression taking means is to be operated upon a coincidence of the data in the stencil with the number set up in said device or above or below said number in numerical value.

ALBERT W. MILLS.
FRANK J. FURMAN.
EDWARD J. RABENDA.